(12) United States Patent
Kaminski et al.

(10) Patent No.: US 11,822,100 B2
(45) Date of Patent: Nov. 21, 2023

(54) LIQUID LENS CONTROL SYSTEMS AND METHODS

(71) Applicant: CORNING INCORPORATED, Corning, NY (US)

(72) Inventors: Jann Paul Kaminski, Santa Barbara, CA (US); Raymond Miller Karam, Santa Barbara, CA (US); Dragan Pikula, Horseheads, NY (US); Daniel Ohen Ricketts, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 168 days.

(21) Appl. No.: 16/500,627

(22) PCT Filed: Apr. 5, 2018

(86) PCT No.: PCT/US2018/026281
§ 371 (c)(1),
(2) Date: Oct. 3, 2019

(87) PCT Pub. No.: WO2018/187587
PCT Pub. Date: Oct. 11, 2018

(65) Prior Publication Data
US 2020/0096678 A1 Mar. 26, 2020

Related U.S. Application Data

(60) Provisional application No. 62/511,286, filed on May 25, 2017, provisional application No. 62/511,264, (Continued)

(51) Int. Cl.
*G02B 3/14* (2006.01)
*G02B 3/00* (2006.01)
(Continued)

(52) U.S. Cl.
CPC .............. *G02B 3/14* (2013.01); *G02B 3/0006* (2013.01); *G02B 26/004* (2013.01); *G02B 27/646* (2013.01)

(58) Field of Classification Search
CPC ...... G02B 3/14; G02B 3/0006; G02B 26/004; G02B 27/646; G02B 26/005; G02B 3/12; G02B 13/0075
See application file for complete search history.

(56) References Cited

U.S. PATENT DOCUMENTS 7,359,124 B1 4/2008 Fang et al.
7,388,705 B2 6/2008 Onuki et al.
(Continued)

FOREIGN PATENT DOCUMENTS

CN 101052897 A 10/2007
CN 102203546 A 9/2011
(Continued)

OTHER PUBLICATIONS

International Search Report and Written Opinion of the International Searching Authority; PCT/US2018/026281; dated Nov. 7, 2018; 20 Pages; European Patent Office.
(Continued)

*Primary Examiner* — Balram T Parbadia
*Assistant Examiner* — Gabriel A Sanz
(74) *Attorney, Agent, or Firm* — Tamika A. Crawl-Bey

(57) ABSTRACT

Control systems for liquid lenses can use feedback control using one or more measured parameters indicative of a position of the fluid interface in the liquid lens. Capacitance between a fluid and an electrode in the liquid lens can vary depending on the position of the fluid interface. Current mirrors can be used for making measurements indicative of the capacitance and/or the fluid interface position. The liquid lens can be calibrated using the measurements indicative of
(Continued)

capacitance and/or fluid interface position as the voltage is driven across an operational range. A control system can use pulse width modulation (PWM) for driving a liquid lens, and a carrier frequency for the PWM signals can be varied to control power consumption in the liquid lens. The slew rate can be adjustable to control power consumption in the liquid lens.

13 Claims, 23 Drawing Sheets

Related U.S. Application Data filed on May 25, 2017, provisional application No. 62/482,149, filed on Apr. 5, 2017.

(51) Int. Cl.
*G02B 26/00* (2006.01)
*G02B 27/64* (2006.01)

(56) References Cited

U.S. PATENT DOCUMENTS

| | | | |
|---|---|---|---|
| 7,567,395 B2 | 7/2009 | Yuan | |
| 7,612,947 B2 | 11/2009 | Helwegen et al. | |
| 7,612,948 B2 | 11/2009 | Immink et al. | |
| 8,366,001 B2 | 2/2013 | Craen et al. | |
| 8,400,558 B2 | 3/2013 | Berge et al. | |
| 8,517,270 B2 | 8/2013 | Komi | |
| 9,109,876 B2 | 8/2015 | De Boer et al. | |
| 9,201,174 B2 | 12/2015 | Karam et al. | |
| 9,723,198 B2 | 8/2017 | Park et al. | |
| 9,804,302 B2 | 10/2017 | Chin et al. | |
| 10,097,742 B1 | 10/2018 | Moon et al. | |
| 2002/0176148 A1 | 11/2002 | Onuki et al. | |
| 2002/0176748 A1* | 11/2002 | Carter | E21B 33/038 405/224.2 |
| 2007/0047942 A1 | 3/2007 | Chang et al. | |
| 2007/0165159 A1 | 7/2007 | Lee et al. | |
| 2007/0248350 A1* | 10/2007 | Baker | G03B 37/04 396/322 |
| 2008/0204891 A1 | 8/2008 | Tallaron et al. | |
| 2009/0009881 A1 | 1/2009 | Helwegen et al. | |
| 2009/0135484 A1 | 5/2009 | Weber et al. | |
| 2009/0185280 A1 | 7/2009 | Helwegen et al. | |
| 2009/0231537 A1 | 9/2009 | Yamamiya | |
| 2009/0302197 A1 | 12/2009 | Uchino et al. | |
| 2010/0040355 A1 | 2/2010 | Craen et al. | |
| 2010/0295987 A1* | 11/2010 | Berge | H04N 5/23212 348/360 |
| 2011/0075257 A1* | 3/2011 | Hua | H04N 13/322 359/464 |
| 2011/0211262 A1 | 9/2011 | Craen et al. | |
| 2013/0094094 A1 | 4/2013 | Yeh | |
| 2014/0268361 A1 | 9/2014 | Nunnink et al. | |
| 2014/0355128 A1 | 12/2014 | Tsai et al. | |
| 2015/0049391 A1 | 2/2015 | Depfenhart | |
| 2015/0187242 A1* | 7/2015 | Yoshizawa | G09G 3/3611 345/690 |
| 2015/0271386 A1 | 9/2015 | Schneider | |
| 2016/0097948 A1 | 4/2016 | Chin et al. | |
| 2018/0175870 A1 | 6/2018 | Fisher et al. | |
| 2019/0278051 A1 | 9/2019 | Moon | |
| 2019/0361322 A1 | 11/2019 | Moon et al. | |
| 2019/0383135 A1 | 12/2019 | Hill, III | |

FOREIGN PATENT DOCUMENTS

| | | |
|---|---|---|
| CN | 104780302 A | 7/2015 |
| CN | 106125268 A | 11/2016 |
| EP | 2071367 A1 | 6/2009 |
| EP | 2223171 A1 | 9/2010 |
| JP | 2004-093266 A | 3/2004 |
| JP | 2009-054491 A | 3/2009 |
| JP | 2014-228764 A | 12/2014 |
| TW | 200813487 A | 3/2008 |
| TW | I378265 B | 12/2012 |
| TW | 201350923 A | 12/2013 |
| WO | 2005/052654 A1 | 6/2005 |
| WO | 2006/048187 A1 | 5/2006 |
| WO | 2006/054198 A1 | 5/2006 |
| WO | 2007/080521 A1 | 7/2007 |
| WO | 2007/147863 A1 | 12/2007 |
| WO | 2009/011385 A1 | 1/2009 |
| WO | 2009/074684 A1 | 6/2009 |
| WO | 2010/061300 A1 | 6/2010 |
| WO | 2011/052770 A1 | 5/2011 |
| WO | 2018/187587 A2 | 10/2018 |
| WO | 2018187578 A2 | 10/2018 |
| WO | 2018187591 A2 | 10/2018 |

OTHER PUBLICATIONS

Sun et al; "Observation and Optical Implications of Oil Dewetting Patterns in Electrowetting Displays" ; J. Micromech. Microeng. 18 (2008) pp. 1-8.

Taiwanese Patent Application No. 107112100, Office Action dated Jun. 4, 2021, 2 pages (English Translation Only); Taiwanese Patent Office.

Chinese Patent Application No. 201880037536.7, Office Action dated Mar. 3, 2021; 13 pages (5 pages of English Translation and 8 pages of Original Document); Chinese Patent Office.

Japanese Patent Application No. 2019-555036, Office Action, dated Apr. 6, 2022, 11 pages (05 pages of English Translation and 06 pages of Original Copy); Japanese Patent Office.

\* cited by examiner

LIQUID LENS CONTROL SYSTEMS AND METHODS

CROSS-REFERENCE TO RELATED APPLICATIONS

This application claims the benefit of priority under 35 U.S.C. § 371 of International Application No. PCT/US2018/026281, filed on Apr. 5, 2018, which claims the benefit under 35 U.S.C. § 119(e) of U.S. Provisional Patent Application No. 62/482,149, filed Apr. 5, 2017, and titled LIQUID LENS FEEDBACK AND CONTROL; U.S. Provisional Patent Application No. 62/511,286, filed May 25, 2017, and titled LIQUID LENS FEEDBACK AND CONTROL; and U.S. Provisional Patent Application No. 62/511,264, filed May 25, 2017, and titled LIQUID LENS CONTROL SYSTEMS AND METHODS. The entire contents of each of the above-identified applications are hereby incorporated by reference herein and made part of this specification for all that they disclose.

INCORPORATION BY REFERENCE

U.S. Pat. No. 9,201,174, issued Dec. 1, 2015, and titled LIQUID LENS ARRAYS, is hereby incorporated by reference in its entirety.

BACKGROUND

Field of the Disclosure

Some embodiments of this disclosure relate to liquid lenses, including control systems and control methods for liquid lenses. Some embodiments relate to electrical feedback and control systems, calibration, and adjustment.

Description of the Related Art

Although various liquid lenses are known, there remains a need for improved liquid lenses.

SUMMARY OF CERTAIN EMBODIMENTS

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various embodiments disclosed herein can relate to a liquid lens system, which can include a liquid lens having a chamber, a first fluid contained in the chamber, and a second fluid contained in the chamber. The first fluid and the second fluid can be immiscible to form a fluid interface between the first fluid and the second fluid. The liquid lens can include a plurality of electrodes insulated from the first and second fluids. The plurality of electrodes can be disposed at a corresponding plurality of locations in the liquid lens. The liquid lens can include a common electrode in electrical communication with the first fluid. The liquid lens can be configured such that a position of the fluid interface is based at least in part on voltages applied to the plurality of electrodes and the common electrode. The system can include a signal generator configured to supply voltage pulses to the plurality of electrodes and to the common electrode. The signal generator can be configured to apply independent phase delays to the voltage pulses supplied to the corresponding plurality of electrodes, to produce independent root means square (RMS) voltages between the common electrode and the corresponding plurality of electrodes. The system can include sensor circuitry, which can have a plurality of sampling capacitors corresponding to the plurality of electrodes, and a plurality of current mirrors configured to mirror currents delivered to the corresponding plurality of electrodes. The plurality of current mirrors can be configured to direct the mirrored current to the plurality of sampling capacitors. The sensor circuitry can include a plurality of voltage detectors configured to detect voltage values for the plurality of sampling capacitors, and the detected voltage values can be indicative of capacitance values between the first fluid and the corresponding plurality of electrodes. The system can include a controller configured to adjust the phase delays applied to the voltage pulses supplied to the plurality of electrodes based at least in part on the detected voltage values.

The plurality of electrodes can include four electrodes disposed at four corresponding quadrants of the liquid lens. The sensor circuitry can include a plurality of sample switches between corresponding sampling capacitors and current mirrors. The sensor circuitry can include a plurality of discharge switches coupled to the plurality of sampling capacitors. The plurality of discharge switches can have closed states and open states. The closed states of the discharge switches can couple the corresponding sampling capacitors to ground for discharging the plurality of sampling capacitors. The liquid lens system can include at least one temperature sensor configured to measure a temperature in the liquid lens. The controller can be configured to adjust the phase delays based at least in part on the measured temperature. The controller can be configured to overdrive at least one of the RMS voltages.

Various embodiments disclosed herein can relate to a liquid lens system, which can include a chamber containing a first fluid and a second fluid. The first fluid and the second fluid can be immiscible to form a fluid interface between the first fluid and the second fluid. The system can include a first electrode insulated from the first and second fluids, a second electrode in electrical communication with the first fluid, and a signal generator configured to supply a voltage differential between the first electrode and the second electrode. The system can include a lens sensor configured to make a measurement and output a value that is indicative of a position of the fluid interface.

The lens sensor can be configured to output a voltage value that is indicative of a capacitance between the first fluid and the first electrode. The liquid lens system can include a controller configured to adjust the voltage differential supplied by the signal generator based at least in part on the value output by the lens sensor. The system can include a temperature sensor configured to measure a temperature of the liquid lens. The controller can be configured to adjust the voltage differential supplied by the signal generator based at least in part on the measured temperature. The signal generator can be configured to provide a first voltage waveform to the first electrode and to provide a second voltage waveform to the second electrode. The second voltage waveform can have a phase delay relative to the first voltage waveform. A controller can be configured to change the phase delay based at least in part on the value output by the lens sensor. The lens sensor can include a sampling capacitor, a current mirror configured to mirror a current delivered to the second electrode and to direct the mirrored current to the sampling capacitor, and a voltage detector configured to read a voltage value for the sampling capacitor. The lens sensor can include a sample switch between the current mirror and the sampling capacitor. The lens sensor can include a discharge switch having a closed state and an open state. The closed state can couple the sampling capacitor to ground for discharging the sampling capacitor. The liquid lens system can include an additional electrode that is insulated from the first fluid and the second fluid and positioned at a different location in the liquid lens than the first electrode. The signal generator can be configured to supply an additional voltage differential between the first electrode and the additional electrode. The system can include an additional lens sensor configured to make a measurement and output a value that is indicative of a capacitance between the first fluid and the additional electrode. The signal generator can overdrive the voltage differential between the first electrode and the second electrode.

Various embodiment disclosed herein can relate to a method of operating a variable focus lens. The method can include receiving target focal parameters, determining an first value for a voltage signal based at least in part on the target focal parameters, generating the voltage signal, delivering the voltage signal to an electrode of a variable focus lens, mirroring a current of the voltage using a current mirror, delivering the mirrored current to a charge sensor, providing a reading from the charge sensor to a controller, and determining, using the controller, a corrected voltage signal value based at least in part on the reading from the charge sensor. In some embodiments, delivering the mirrored current to a charge sensor can include opening a discharge switch to cease discharging of a sampling capacitor and closing a sample switch to couple the current mirror to the sampling capacitor.

Various embodiments disclosed herein can relate to a method of making a liquid lens system. The method can include providing a liquid lens having a chamber containing a first fluid and a second fluid. The first fluid and the second fluid can be immiscible to form a fluid interface between the first fluid and the second fluid. The liquid lens can have a first electrode insulated from the first and second fluids and a second electrode in electrical communication with the first fluid. The method can include electrically coupling the first electrode and the second electrode to circuitry. The circuitry can include a signal generator configured to supply a voltage differential between the first electrode and the second electrode and a lens sensor configured to make a measurement and output a value that is indicative of a position of the fluid interface.

Various embodiments disclosed herein can relate to a method of calibrating a liquid lens. The method can include applying a first voltage to a liquid lens. The liquid lens can include a chamber, a first fluid contained in the chamber, and a second fluid contained in the chamber. The first fluid and the second fluid can be immiscible to form a fluid interface between the first fluid and the second fluid. The liquid lens can include a first electrode, an insulating material that insulates the first electrode from the first and second fluids, and a second electrode in electrical communication with the first fluid. Applying a first voltage between the first electrode and the second electrode can position the fluid interface at a first position. The method can include determining a first value indicative of a first capacitance between the first fluid and the first electrode when the first voltage is applied to the liquid lens. The method can include applying a second voltage to the liquid lens to position the fluid interface at a second position, where the second voltage is different than the first voltage. The method can include determining a second value indicative of a second capacitance between the first fluid and the first electrode when the second voltage is applied to the liquid lens, where the second value is different than the first value. The method can include determining a slope based on the first voltage, the first value, the second voltage, and the second value and setting one or more lookup table values based at least in part on the slope.

The method can include applying a third voltage to the liquid lens and determining a third value indicative of a third capacitance between the first fluid and the first electrode when the third voltage is applied to the liquid lens. The method can include determining an offset value based at least in part on the first voltage, the first value, the second voltage, the second value, the third voltage, and the third value. The method can include determining the one or more lookup table values based at least in part on the offset value and the slope.

The method can include determining a voltage value associated with an transition point on a plot having a first axis that has the first voltage, the second voltage, and the third voltage and a second axis that has the first value, the second value, and the third value. The transition point can be at the intersection between a first linear plot line and a second linear plot line. The first linear plot line can extend through a first point representing the first voltage and the first value and through a second point representing the second voltage and the second value. The second linear plot line can be parallel to the first axis and can extend through a third point representing the third voltage and the third value. The method can include determining a voltage value associated with an transition point by varying the voltage applied to the liquid lens, monitoring values indicative of the capacitance between the first fluid and the first electrode, and identifying the voltage value where the values indicative of the capacitance transition between substantially equal values to substantially linearly changing values. The method can include populating the lookup table to have the voltage value associated with the transition point to correspond to a rest state for the fluid interface of the liquid lens. The voltage value associated with the transition point can correspond to a setting of no optical power for the liquid lens, in some embodiments. The method can include applying an additional voltage to the liquid lens, and the additional voltage can be high enough to provide substantially saturated capacitance between the first fluid and the first electrode when the additional voltage is applied to the liquid lens. The method can include determining an additional value indicating that substantially saturated capacitance exists between the first fluid and the first electrode when the third voltage is applied to the liquid lens. At least one of the first value and the second value comprises a sensor voltage value output by sensor circuitry.

Various embodiment disclosed herein can relate to a method of calibrating a liquid lens. The method can include applying a plurality of voltages to position a fluid interface of a liquid lens at a plurality of positions, determining, using an lens sensor, a plurality of values indicative of the plurality of positions of the fluid interface of the liquid lens, and setting one or more calibration parameters for the liquid lens based at least in part on a mathematical relationship between the plurality of voltages and the plurality of values.

Setting one or more calibration parameters can include determining values for a lookup table. Setting one or more calibration parameters can include determining a transfer function. The lens sensor can be configured to output voltage values that are indicative of capacitance between the first fluid and the first electrode. The method can include determining a slope and an offset based at least in part on the plurality of voltages and the plurality of values and determining the one or more calibration parameters based at least in part on the slope and the offset. The liquid lens can include a chamber, a first fluid contained in the chamber, and a second fluid contained in the chamber. The first fluid and the second fluid can be immiscible to form the fluid interface between the first fluid and the second fluid. The liquid lens can include a first electrode, an insulating material that insulates the first electrode from the first and second fluids, and a second electrode in electrical communication with the first fluid. The liquid lens is configured such that the position of the fluid interface is based at least in part on voltages applied between the between the first electrode and the second electrode. The liquid lens can include a plurality of first electrodes insulated from the first and second fluids. The plurality of electrodes can be disposed at a corresponding plurality of locations in the liquid lens. The voltage can be a direct current (DC) voltage or an alternating current (AC) root means square (RMS) voltage.

Various embodiments disclosed herein can relate to non-transitory computer-readable storage having computer-readable instructions that are configured to cause a liquid lens system to perform any of the methods disclosed herein. Various embodiments disclosed herein can relate to a liquid lens system comprising a liquid lens and a controller configured to calibrate the liquid lens by performing any of the calibration methods disclosed herein.

The controller can be configured to operate the liquid lens system and to calibrate the liquid lens upon an initialization of the liquid lens system, upon a start-up of the liquid lens system, upon a setting change, upon a user command, and/or periodically. The controller can be configured to calibrate the liquid lens is part of a dedicated calibration system configured to calibrate liquid lenses to be used with separate controllers for operating the liquid lens systems.

Various embodiments disclosed herein can relate to a method for calibrating a liquid lens system. The method can include providing a liquid lens having an operational voltage range, coupling the liquid lens to a controller, and setting an operational voltage range for the controller based at least in part on the operational voltage range of the liquid lens.

The liquid lens can have a chamber, a first fluid contained in the chamber and a second fluid contained in the chamber. The first fluid and the second fluid can be immiscible to form a fluid interface between the first fluid and the second fluid. The liquid lens can include a first electrode, an insulating layer that insulates the first electrode from the first and second fluids, and a second electrode in electrical communication with the first fluid. The liquid lens can be configured such that the position of the fluid interface is based at least in part on voltages applied between the between the first electrode and the second electrode. The operational voltage range for the controller can be determined based at least in part on a thickness of the insulating layer. The insulating layer can include a parylene material. The operational voltage range can be selected from a set of pre-set ranges.

Various embodiments disclosed herein can relate to a method for electrically adjusting a liquid lens system. The method can include applying a plurality of test voltages to the liquid lens, measuring one or more properties of the liquid lens at the plurality of test voltages, determining an operational voltage range of the liquid lens from a first voltage to a second voltage based at least in part on the one or more measured properties. The method can include based at least in part on the operational voltage range, writing to a lookup table so that a first value of a control signal is associated with a first lens setting and a second value of the control signal is associated with a second lens setting. The method can include setting at least one of a gain or offset of a voltage generator such that the voltage generator is configured to output a voltage signal having the first voltage when the control signal has the first value, and to output the voltage signal having the second voltage when the control signal has the second value.

All values for the control signal can cause the voltage generator to generate voltages ranging from the first voltage to the second voltage. The method can include providing the voltage signal to an electrode. The voltage signal can be an alternating current signal having a voltage of the voltage signal is a root-mean-squared (RMS) voltage.

Various embodiments disclosed herein can relate to a system for electrically adjusting a liquid lens. The system can include a voltage generator configured to generate a voltage signal having a plurality of voltage values based on a plurality of control values received by the voltage generator. A minimum voltage value and a maximum voltage value can be determined, at least in part, by at least one of a gain and an offset. The system can include a lookup table storing information indicating relations between at least two of the plurality of control values, a plurality of focus lengths achieved by the plurality of control values, and a plurality of voltages that that cause the liquid lens to achieve the plurality of focus lengths. The system can include one or more processors configured to determine an operational range of the liquid lens. The operational range can include at least one of the range of focus lengths, and the plurality of voltages. The operational range can be determined based at least in part on an analysis of an indication of an amount of charge on an electrode of a liquid lens that resulted from an application of a test voltage to the electrode.

At least one of the gain and the offset can be set based at least in part on the analysis of an indication of an amount of charge on an electrode of a liquid lens that resulted from an application of a test voltage to the electrode. The gain and the offset of the voltage generator can be configured such that a range of voltages output by the voltage generator can cause the liquid lens to operate within the operational range. An electrode can be configured to receive the voltage signal generated by the voltage generator. A resolution of the control signal can be divided among the range of focus lengths that can be selected for the liquid lens through a user interface.

Various embodiments disclosed herein can relate to a method for electrically adjusting a liquid lens. The method can include applying a plurality of test voltages to the liquid lens, measuring one or more properties of the liquid lens, determining an operational voltage range of the liquid lens from a first voltage to a second voltage, and setting a full control range of a voltage generator to correspond to the operational range of the liquid lens.

A change in a voltage can cause a substantially linear change in a capacitance between an electrode and a liquid in the liquid lens. The voltage can be within the operational voltage range, and the voltage can be applied to the electrode. Setting the full control range of the voltage generator to correspond to the operational range of the liquid lens can include adjusting a gain of a voltage generator. Setting the full control range of the voltage generator to correspond to the operational range of the liquid lens can include adjusting a voltage offset of a voltage generator. The voltage generator can be configured to receive a digital control signal that can include a fixed number of bits. A full range of combinations of the bits can cause the voltage generator to generate voltages within the operational range. The test voltages can be alternating current root mean squared voltages. The operational voltage range can be determined, based at least in part, on a capacitance response at a zero crossing point. The operational voltage range can be determined based on at least one of a ramp up point, a beginning of a linear region, and/or a transition point between the ramp up point and the beginning of a linear region. The one or more properties of the liquid lens can be affected by a thickness of an insulating material in the liquid lens. The plurality of test voltages can include a plurality of differential voltage signals delivered to a plurality of electrodes at different locations in the liquid lens.

Various embodiments disclosed herein can relate to a liquid lens camera system, which can include an imaging sensor. The camera system can be configured to use the imaging sensor to produce images having a first image setting and to produce images having a second image setting. The second image setting can have a lower image quality than the first image setting. The system can have a liquid lens including a chamber, a first fluid contained in the chamber, and a second fluid contained in the chamber. The first fluid and the second fluid can be immiscible to form a fluid interface between the first fluid and the second fluid. The liquid lens can have a first electrode insulated from the first and second fluids and a second electrode in electrical communication with the first fluid. The liquid lens can be configured such that a position of the fluid interface is based at least in part on voltages applied between the first electrode and the second electrode. The system can have a signal generator configured to apply voltages between the first electrode and the second electrode using pulse width modulation (PWM). The system can have a controller configured to receive a first indication to produce one or more images having the first image setting, apply a first PWM switching frequency to the liquid lens for the one or more images having the first image setting, receive a second indication to produce one or more images having the second image setting, and apply a second PWM switching frequency to the liquid lens for the one or more images having the second image setting. The second PWM switching frequency can be slower than the first PWM switching frequency.

The first image setting can include a first resolution, and the second image setting can include a second resolution that is lower than the first resolution. The first image setting can include enabled optical image stabilization, and the second setting can include disabled optical image stabilization. The first PWM switching frequency can be between 5 kHz and 50 kHz. The second PWM switching frequency can be between 0.5 kHz and 5 kHz. The controller can be configured to apply a first slew rate to the liquid lens using the signal generator for the one or more images having the first image setting, and to apply a second slew rate to the liquid lens using the signal generator for the one or more images having the second image setting. The second slew rate can be lower than the first slew rate.

Various embodiments disclosed herein can relate to a mobile electronic device that has a liquid lens camera system as disclosed herein, and a battery configured to power the mobile electronic device including powering the liquid lens camera system. The mobile electronic device can have a low power consumption mode of operation. The controller can receive the second indication to produce the one or more images having the second image setting when the mobile electronic device is in low power consumption mode.

Various embodiments disclosed herein can relate to a mobile electronic device comprising a camera system or liquid lens as disclosed herein. In some embodiments, the mobile electronic device can be a mobile phone. The mobile electronic device can be configured to run a first application that uses the liquid lens camera system to produce the one or more images having the first image setting. The module electronic device can be configured to run a second application that uses the liquid lens camera system to produce the one or more images having the second image setting. The controller can apply the first PWM switching frequency for the first application and the second PWM switching frequency for the second application.

The liquid lens system can include a liquid lens, a signal generator configured to apply voltage pulses to the liquid lens at a carrier frequency, and a controller configured to vary the carrier frequency of the voltage pulses applied to the liquid lens. The liquid lens can include a chamber, a first fluid contained in the chamber, and a second fluid contained in the chamber. The first fluid and the second fluid can be immiscible to form a fluid interface between the first fluid and the second fluid. The liquid lens can have a first electrode insulated from the first and second fluids and a second electrode in electrical communication with the first fluid. The liquid lens can be configured such that a position of the fluid interface is based at least in part on voltages applied between the first electrode and the second electrode.

The signal generator can be configured to use pulse width modulation (PWM) to apply voltages to the liquid lens. The controller can be configured to receive a first indication of a first image parameter, apply a first carrier frequency to the liquid lens to produce one or more images having the first image parameter, receive a second indication of a second image parameter, apply a second carrier frequency that is different than the first carrier frequency to the liquid lens to produce one or more images having the second image parameter. The second carrier frequency can be lower than the first carrier frequency. The second image parameter can have a lower-quality image setting than the first image parameter. The controller can be configured to vary a slew rate for the voltage pulses applied to the liquid lens using the signal generator. A faster slew rate can be applied to a faster carrier frequency. A slower slew rate is applied to a slower carrier frequency. The liquid lens system can include a camera module that has one or more fixed lenses, and an imaging sensor. Various embodiments disclosed herein can relate to a mobile electronic device that includes any of the liquid lens systems disclosed herein. Various embodiments disclosed herein can relate to a mobile phone comprising any of the liquid lens systems disclosed herein.

Various embodiments disclosed herein can relate to a liquid lens system, which can include a chamber containing a first fluid and a second fluid. The first fluid and the second fluid can be substantially immiscible to form a fluid interface between the first fluid and the second fluid. The liquid lens system can include a first electrode insulated from the first and second fluids, a second electrode in electrical communication with the first fluid, a signal generator configured to supply a voltage differential between the first electrode and the second electrode, and a lens sensor configured to make a measurement and output a value that is indicative of a position of the fluid interface. In some embodiments, the signal generator can be configured to provide a first voltage waveform to the first electrode and to provide a second voltage waveform to the second electrode, and the second voltage waveform can have a phase delay relative to the first voltage waveform. In some embodiments, the lens sensor can include a sampling capacitor, a current mirror configured to mirror a current delivered to the second electrode and to direct the mirrored current to the sampling capacitor, and a voltage detector configured to read a voltage value for the sampling capacitor.

In some embodiments, the signal generator can be configured to provide the first voltage waveform to the first electrode and to provide the second voltage waveform to the second electrode, and the second voltage waveform can have the phase delay relative to the first voltage waveform, and the lens sensor can include the sampling capacitor, the current mirror configured to mirror the current delivered to the second electrode and to direct the mirrored current to the sampling capacitor, and the voltage detector configured to read the voltage value for the sampling capacitor. The lens sensor can be configured to output a voltage value that is indicative of a capacitance between the first fluid and the first electrode. The liquid lens system can include a controller, which can be configured to adjust the voltage differential supplied by the signal generator based at least in part on the value output by the lens sensor. The liquid lens system can include a temperature sensor configured to measure a temperature of the liquid lens. A controller can be configured to adjust the voltage differential supplied by the signal generator based at least in part on the measured temperature. The liquid lens system can include a temperature sensor configured to measure a temperature of the liquid lens, and a heating element. A controller can be configured to apply heat to the liquid lens using the heat element based at least in part on the measured temperature. A controller can be configured to change the phase delay based at least in part on the value output by the lens sensor. The lens sensor can include a sample switch between the current mirror and the sampling capacitor. The lens sensor can include a discharge switch having a closed state and an open state. The closed state can couple the sampling capacitor to ground for discharging the sampling capacitor. The signal generator can overdrive the voltage differential between the first electrode and the second electrode. The liquid lens system can include an additional electrode that is insulated from the first fluid and the second fluid and positioned at a different location in the liquid lens than the first electrode. The signal generator can be configured to supply an additional voltage differential between the second electrode and the additional electrode. The system can include an additional lens sensor configured to make a measurement and output a value that is indicative of a capacitance between the first fluid and the additional electrode and/or a fluid interface position at the additional electrode. The liquid lens system can include four electrodes disposed at four corresponding quadrants of the liquid lens. The four electrodes can be insulated from the first fluid and the second fluid.

Some embodiments disclosed herein can relate to a method of operating a variable focus lens. The method can include receiving target focal parameters, determining an first value for a voltage signal based at least in part on the target focal parameters, generating the voltage signal, delivering the voltage signal to an electrode of a variable focus lens, mirroring a current of the voltage using a current mirror, delivering the mirrored current to a charge sensor, providing a reading from the charge sensor to a controller, and determining, using the controller, a corrected voltage signal value based at least in part on the reading from the charge sensor.

Delivering the mirrored current to a charge sensor can include opening a discharge switch to cease discharging of a sampling capacitor and closing a sample switch to couple the current mirror to the sampling capacitor. The variable focus lens can include a chamber containing a first fluid and a second fluid. The first fluid and the second fluid can be substantially immiscible to form a fluid interface between the first fluid and the second fluid. A first electrode can be insulated from the first and second fluids. A second electrode can be in electrical communication with the first fluid. The liquid lens can include circuitry having a signal generator configured to supply a voltage differential between the first electrode and the second electrode and a lens sensor configured to make a measurement and output a value that is indicative of a position of the fluid interface.

Various embodiments disclosed herein can relate to a liquid lens that includes a chamber containing a first fluid and a second fluid. The first fluid and the second fluid can be substantially immiscible to form a fluid interface between the first fluid and the second fluid. The liquid lens can have a first electrode insulated from the first and second fluids and a second electrode in electrical communication with the first fluid. The liquid lens can be configured such that a position of the fluid interface is based at least in part on voltage applied between the first electrode and the second electrode. In some embodiments, a temperature sensor can be configured to measure a temperature in the liquid lens.

The liquid lens can include a controller configured to adjust the voltage applied between the first electrode and the second electrode based at least in part on the measured temperature. The temperature sensor can be embedded in the liquid lens. In some embodiments, the liquid lens can include a heating element configured to apply heat to the liquid lens. The heater can be embedded in the liquid lens. A controller can be configured to operate the heating element to apply heat to the liquid lens based at least in part on the measured temperature.

Various embodiments disclosed herein can relate to a method of calibrating a liquid lens. The method can include applying a first voltage to a liquid lens. The liquid lens can include a chamber, a first fluid contained in the chamber, and a second fluid contained in the chamber. The first fluid and the second fluid can be substantially immiscible to form a fluid interface between the first fluid and the second fluid. The liquid lens can include a first electrode, an insulating material that insulates the first electrode from the first and second fluids, and a second electrode in electrical communication with the first fluid. Applying the first voltage between the first electrode and the second electrode can position the fluid interface at a first position. The method can include determining a first value indicative of the first position of the fluid interface, and applying a second voltage to the liquid lens to position the fluid interface at a second position. The second voltage can be different than the first voltage. The method can include determining a second value indicative of the second position of the fluid interface. The second value can be different than the first value. The method can include determining a slope based on the first voltage, the first value, the second voltage, and the second value and setting one or more calibration parameters based at least in part on the slope.

The first value can be indicative of a first capacitance between the first fluid and the first electrode when the first voltage is applied to the liquid lens. The second value can be indicative of a second capacitance between the first fluid and the first electrode when the second voltage is applied to the liquid lens. Setting the one or more calibration parameters can include setting one or more lookup table values. The one or more calibration parameters can include a gain value. The method can include applying a third voltage to the liquid lens and determining a third value indicative of a third position of the fluid interface when the third voltage is applied to the liquid lens. The method can include determining an offset value based at least in part on the first voltage, the first value, the second voltage, the second value, the third voltage, and the third value. The method can include setting the one or more calibration parameters based at least in part on the offset value and the slope. The method can include determining a voltage value associated with an transition point on a plot having a first axis that has the first voltage, the second voltage, and the third voltage and a second axis that has the first value, the second value, and the third value. The transition point can be at the intersection between a first linear plot line and a second linear plot line. The first linear plot line can extend through a first point representing the first voltage and the first value and through a second point representing the second voltage and the second value. The second linear plot line can be parallel to the first axis and extends through a third point representing the third voltage and the third value. The method can include determining a voltage value associated with a transition point by varying the voltage applied to the liquid lens, monitoring values indicative of the capacitance between the first fluid and the first electrode, and identifying the voltage value where the values indicative of the capacitance transition between substantially equal values to substantially linearly changing values. The method can include setting a calibration parameter to associate the voltage value for the transition point with a resting state for the fluid interface of the liquid lens. The method can include applying an additional voltage to the liquid lens. The additional voltage can be high enough to provide substantially saturated capacitance between the first fluid and the first electrode when the additional voltage is applied to the liquid lens. The method can include determining an additional value indicating that substantially saturated capacitance exists between the first fluid and the first electrode when the third voltage is applied to the liquid lens. At least one of the first value and the second value can include a sensor voltage value output by sensor circuitry.

Various embodiments disclosed herein can relate to a method of calibrating a liquid lens. The method can include applying a plurality of voltages to position a fluid interface of a liquid lens at a plurality of positions, determining, using a lens sensor, a plurality of values indicative of the plurality of positions of the fluid interface of the liquid lens, and setting one or more calibration parameters for the liquid lens based at least in part on a mathematical relationship between the plurality of voltages and the plurality of values.

Setting one or more calibration parameters can include determining values for a lookup table. Setting one or more calibration parameters can include determining a transfer function. The lens sensor can be configured to output voltage values that are indicative of capacitance between the first fluid and the first electrode. The method can include determining a slope and an offset based at least in part on the plurality of voltages and the plurality of values, and determining the one or more calibration parameters based at least in part on the slope and the offset. The liquid lens can include a chamber, a first fluid contained in the chamber and a second fluid contained in the chamber. The first fluid and the second fluid can be substantially immiscible to form the fluid interface between the first fluid and the second fluid. The liquid lens can include a first electrode, an insulating material that insulates the first electrode from the first and second fluids, and a second electrode in electrical communication with the first fluid. The liquid lens can be configured such that the position of the fluid interface is based at least in part on voltages applied between the first electrode and the second electrode. The liquid lens can include a plurality of first electrodes insulated from the first and second fluids. The plurality of first electrodes can be disposed at a corresponding plurality of locations in the liquid lens. The voltage can be a direct current (DC) voltage or an alternating current (AC) root means square (RMS) voltage.

Various embodiments disclosed herein can relate to non-transitory computer-readable storage having computer-readable instructions that are configured to cause a liquid lens system to perform any of the methods disclosed herein. A liquid lens system can include a liquid lens and a controller configured to calibrate the liquid lens by performing any of the calibration methods disclosed herein. The controller can be configured to operate the liquid lens system and to calibrate the liquid lens upon an initialization of the liquid lens system, upon a start-up of the liquid lens system, upon a setting change, upon a user command, and/or periodically. The controller can be configured to calibrate the liquid lens as part of a dedicated calibration system configured to calibrate liquid lenses to be used with separate controllers for operating the liquid lens systems.

Various embodiments disclosed herein can relate to a method for calibrating a liquid lens system. The method can include applying a plurality of test voltages to the liquid lens, measuring one or more properties of the liquid lens at the plurality of test voltages, determining an operational voltage range of the liquid lens based at least in part on the one or more measured properties, and setting an operational voltage range for a controller based at least in part on the determined operational voltage range of the liquid lens.

The liquid lens can include a chamber, a first fluid contained in the chamber and a second fluid contained in the chamber. The first fluid and the second fluid can be substantially immiscible to form a fluid interface between the first fluid and the second fluid. The liquid lens can have a first electrode, an insulating layer that insulates the first electrode from the first and second fluids, and a second electrode in electrical communication with the first fluid. The liquid lens can be configured such that the position of the fluid interface is based at least in part on voltage applied between the between the first electrode and the second electrode. The operational voltage range for the controller can be determined based at least in part on a thickness of the insulating layer. The insulating layer can include a parylene material. The operational voltage range for the controller can be selected from a set of pre-set ranges. The method can include setting a full control range of the controller to correspond to the operational voltage range of the liquid lens. A change in a voltage can cause a substantially linear change in a capacitance between an electrode and a liquid in the liquid lens. The voltage can be within the operational voltage range, and the voltage can be applied to the electrode. Setting the operational voltage range for the controller can include adjusting a gain value. Setting the operational voltage range for the controller can include adjusting a voltage offset. The controller can be configured to produce a digital control signal comprising a fixed number of bits, and a full range of combinations of the bits can cause a voltage generator to generate voltages within the operational voltage range of the liquid lens. The test voltages can be alternating current root mean squared voltages. The operational voltage range of the liquid lens can be determined based at least in part on a capacitance response at a zero crossing point, such as where the liquid lens has no optical power. The operational voltage range of the liquid lens can be determined based on at least one of a ramp up point, a beginning of a linear region, and/or a transition point between the ramp up point and the beginning of a linear region. The plurality of test voltages include a plurality of differential voltage signals delivered to a plurality of electrodes at different locations in the liquid lens. The operational range of the liquid lens can be determined to be from a first voltage to a second voltage. The method can include setting the operational range for the controller can cause all control signals from the controller to produce voltages ranging from the first voltage to the second voltage.

Various embodiments disclosed herein can relate to a system for electrically adjusting a liquid lens. The system can include a voltage generator configured to generate voltage signals based at least in part on control values, a gain value, and an offset value. The system can include one or more processors configured to determine an operational voltage range of the liquid lens based at least in part on an analysis of indications of amounts of charge on an electrode of a liquid lens that resulted from application of test voltages to the electrode. The one or more processors can be configured to set the gain and offset value based at least in part on the determined operation al voltage range of the liquid lens.

The system can include a lookup table storing information indicating relations between the plurality of control values and a plurality of voltages within the operational voltage range of the liquid lens. The gain and the offset of the voltage generator can be configured such that a range of voltages output by the voltage generator causes the liquid lens to operate within the operational voltage range. A resolution of the control signal is divided among a range of focus lengths that can be selected for the liquid lens through a user interface.

Various embodiments disclosed herein can relate to a liquid lens camera system, which can include an imaging sensor. The camera system can be configured to use the imaging sensor to produce images having a first image setting and to produce images having a second image setting. The second image setting can have lower image quality than the first image setting. The system can include a liquid lens having a chamber, a first fluid contained in the chamber, and a second fluid contained in the chamber. The first fluid and the second fluid can be substantially immiscible to form a fluid interface between the first fluid and the second fluid. A first electrode can be insulated from the first and second fluids, and a second electrode can be in electrical communication with the first fluid. The liquid lens can be configured such that a position of the fluid interface is based at least in part on voltages applied between the first electrode and the second electrode. The system can include a signal generator configured to apply voltages between the first electrode and the second electrode using pulse width modulation (PWM). A controller can be configured to receive a first indication to produce one or more images having the first image setting, apply a first PWM switching frequency to the liquid lens for the one or more images having the first image setting, receive a second indication to produce one or more images having the second image setting, and apply a second PWM switching frequency to the liquid lens for the one or more images having the second image setting. The second PWM switching frequency can be slower than the first PWM switching frequency.

The first image setting can include a first resolution, and the second image setting can include a second resolution that is lower than the first resolution. The first image setting can include enabled optical image stabilization, and the second setting can include disabled optical image stabilization. The first PWM switching frequency can be between 5 kHz and 50 kHz. The second PWM switching frequency can be between 0.5 kHz and 5 kHz. The controller can be configured to apply a first slew rate to the liquid lens using the signal generator for the one or more images having the first image setting and can apply a second slew rate to the liquid lens using the signal generator for the one or more images having the second image setting. The second slew rate can be lower than the first slew rate.

Various embodiments disclosed herein can relate to a mobile electronic device, which can include a liquid lens camera system and a battery configured to power the mobile electronic device, such as including powering the liquid lens camera system. The mobile electronic device can have a low power consumption mode of operation. The controller can receive the second indication to produce the one or more images having the second image setting when the mobile electronic device is in low power consumption mode. The mobile electronic device can be a mobile phone. The mobile electronic device can be configured to run a first application that uses the liquid lens camera system to produce the one or more images having the first image setting. The module electronic device can be configured to run a second application that uses the liquid lens camera system to produce the one or more images having the second image setting. The controller can apply the first PWM switching frequency for the first application and the second PWM switching frequency for the second application.

Various embodiments disclosed herein can relate to a liquid lens system, which can include a liquid lens, a signal generator configured to apply voltage pulses to the liquid lens at a carrier frequency, and a controller configured to vary the carrier frequency of the voltage pulses applied to the liquid lens based at least in part on an image parameter or device parameter.

The liquid lens can include a chamber, a first fluid contained in the chamber, and a second fluid contained in the chamber. The first fluid and the second fluid can be substantially immiscible to form a fluid interface between the first fluid and the second fluid. A first electrode can be insulated from the first and second fluids. A second electrode can be in electrical communication with the first fluid. The liquid lens can be configured such that a position of the fluid interface is based at least in part on voltages applied between the first electrode and the second electrode. The signal generator can be configured to use pulse width modulation (PWM) to apply voltages to the liquid lens. The controller can be configured to receive a first indication of a first image parameter, apply a first carrier frequency to the liquid lens to produce one or more images having the first image parameter, receive a second indication of a second image parameter, apply a second carrier frequency that is different than the first carrier frequency to the liquid lens to produce one or more images having the second image parameter. The second carrier frequency can be lower than the first carrier frequency. The second image parameter can have a lower-quality image setting than the first image parameter. The controller can be configured to vary the carrier frequency of the voltage pulses applied to the liquid lens based at least in part on an image quality setting. The controller can be configured to vary the carrier frequency of the voltage pulses applied to the liquid lens based at least in part on an image resolution. The controller can be configured to vary the carrier frequency of the voltage pulses applied to the liquid lens based at least in part on an indication of a video or still image. The controller can be configured to vary the carrier frequency of the voltage pulses applied to the liquid lens based at least in part on an indication of a preview image or captured image. The controller can be configured to vary the carrier frequency of the voltage pulses applied to the liquid lens based at least in part on whether optical image stabilization is enabled or disabled. The controller can be configured to vary the carrier frequency of the voltage pulses applied to the liquid lens based at least in part on an indication of the application used to request an image. The controller can be configured to vary the carrier frequency of the voltage pulses applied to the liquid lens based at least in part on battery capacity. The controller can be configured to vary the carrier frequency of the voltage pulses applied to the liquid lens based at least in part on whether a low power consumption mode is enabled or disabled. The controller can be configured to vary the carrier frequency of the voltage pulses applied to the liquid lens based at least in part on whether an external power supply is supplying power. The controller can be configured to vary a slew rate for the voltage pulses applied to the liquid lens using the signal generator. In some embodiments, a faster slew rate can be applied to a faster carrier frequency, and a slower slew rate can be applied to a slower carrier frequency. The slew rate and the carrier frequency can be independently controlled.

A camera module can include one or more fixed lenses, and an imaging sensor, and a liquid lens system as disclosed herein. A mobile electronic device can include the liquid lens systems disclosed herein. A mobile phone can include the liquid lens systems disclosed herein.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF CERTAIN EMBODIMENTS

Liquid Lens System

Figure 1A:
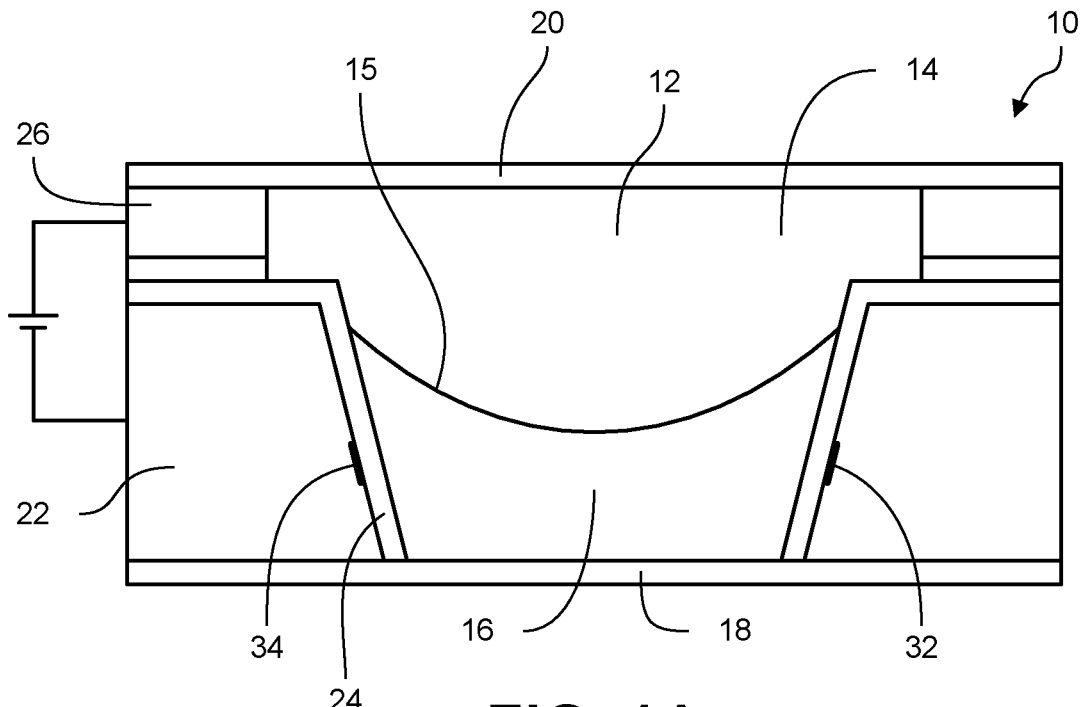
FIG. 1A is a cross-sectional view of an example embodiment of a liquid lens shown in a first state.

FIG. 1A is a cross-sectional view of an example embodiment of a liquid lens 10. The liquid lens 10 of FIG. 1A, as well as the other liquid lenses disclosed herein, can have features that are the same as or similar to the liquid lenses disclosed in the '174 patent, and can be made using techniques similar to those disclosed in the '174 patent. The liquid lens 10 can have a cavity 12 that contains at least two immiscible fluids (e.g., liquids), such as first fluid 14 and a second fluid 16, forming a fluid interface 15. The first fluid 14 can be electrically conductive and the second fluid 16 can be electrically insulating. The first fluid 14 can be a polar fluid, such as an aqueous solution, in some embodiments. The second fluid 16 can be an oil, in some embodiments. The first fluid 14 can have a higher dielectric constant than the second fluid 16. A lower window 18, which can include a transparent plate, can be below the cavity 12, and an upper window 20, which can include a transparent plate, can be above the cavity 12. A first at least one electrode 22 can be insulated from the fluids 14 and 16 in the cavity 12 by an insulation material 24. A second electrode 26 can be in contact with the first fluid 14.

Figure 1B:
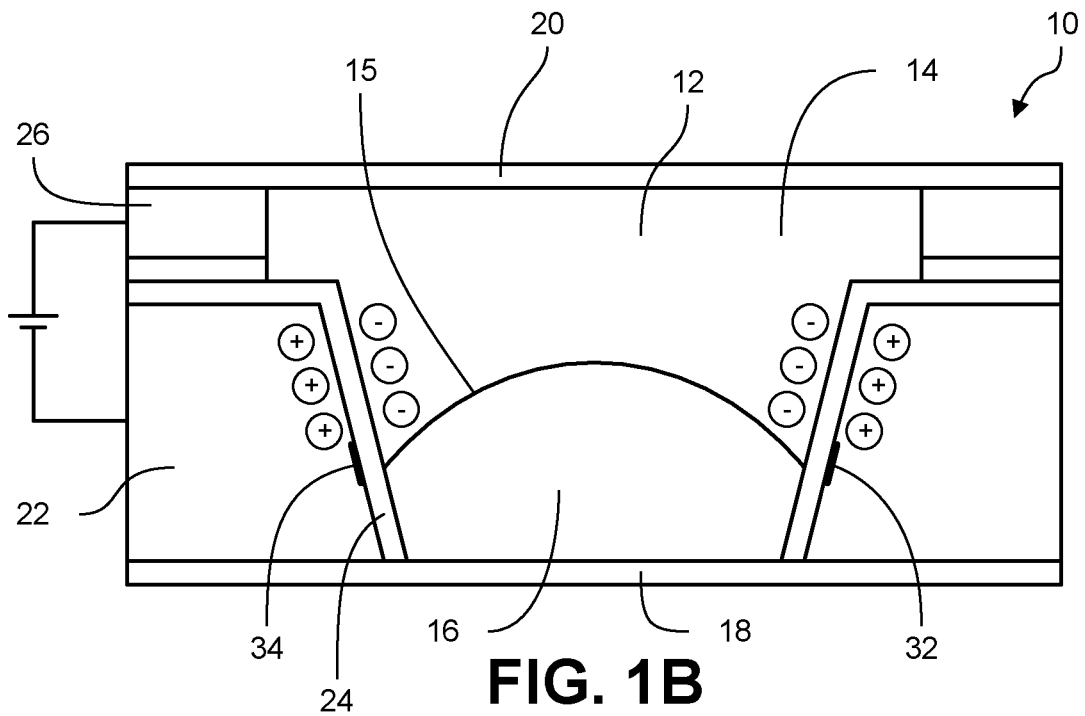
FIG. 1B is a cross-sectional view of the example embodiment of a liquid lens in a second state where a voltage is applied to the liquid lens.

Voltages can be applied between the electrodes 22 and 26 to control the shape of the fluid interface 15 between the fluids 14 and 16, such as to vary the focal length of the liquid lens 10. FIG. 1A shows the liquid lens 10 in a first state where no voltage is applied between the electrodes 22 and 26, and FIG. 1B shows the liquid lens 10 in a second state where a voltage is applied between the electrodes 22 and 26. The chamber 12 can have one or more side walls made of a hydrophobic material. For example the insulating material 24 can be parylene, which can be insulating and hydrophobic. When no voltage is applied, the hydrophobic material on the side walls can repel the first fluid 14 (e.g., an aqueous solution) so that the second fluid 16 (e.g., an oil) can cover a relatively large are of the side walls to produce the fluid interface 15 shape shown in FIG. 1A. When a voltage is applied between the first electrode 22 and the first fluid 14 via the second electrode 26, the first fluid 14 can be attracted to the first electrode 22, which can drive the location of the fluid interface 15 down the side wall so that more of the side wall are is in contact with the first fluid 14. The fluid interface 15 can be driven to various different positions by applying different amounts of voltage between the electrodes 22 and 26.

When a voltage is applied, the first electrode 22 and the first fluid 14 can form a capacitor (e.g., similar to a parallel plate capacitor, where the first fluid 14 operates as one of the parallel plates), and the capacitance can increase as the first fluid 14 covers more area of the side wall (e.g., effectively forming a larger parallel plate). Accordingly, the position of the fluid interface 15 on the side wall can be determined from a measurement that is indicative of the capacitance between the first electrode 22 and the first fluid 14. The voltage applied between the electrodes 22 and 26 can be adjusted based on the measurement that is indicative of the capacitance to position the fluid interface at a location (e.g., a location configured to provide a focal length specified by a camera system). For example, a camera system can provide a command to set the liquid lens 10 at a particular focal length, and a voltage can be applied to the liquid lens 10. A measurement can be taken that is indicative of the capacitance between the first electrode 22 and the first fluid 14. If the measurement indicates that the capacitance is below a value that corresponds to the particular focal length the system can increase the voltage applied. If the measurement indicates that the capacitance is above the value that corresponds to the particular focal length, the system can decrease the voltage applied. The system can make repeated measurements and adjustments to the voltage to hold the fluid interface 15 at the position that provides the particular focal length. Various embodiments disclosed herein relate to measurement systems for taking measurements that are indicative of the capacitance between the first electrode 22 and the first fluid 14, and to feedback control systems that adjust signals to the liquid lens based at least in part on the measurements. In some embodiments, the capacitance between the first electrode 22 and the first fluid 14 can be determined indirectly, such as based on the amount of charge delivered to the first electrode 22, as discussed herein.

In some embodiments, the capacitance between the electrode 22 and the first fluid 14 can depend on temperature. For example, a dielectric constant of the insulating material 24 (e.g., parylene) can change as the temperature changes, which can affect the capacitance. In some embodiments, the liquid lens 10 can include a temperature sensor 32 configured to measure a temperature in the liquid lens 10. The system can account for the measured temperature when adjusting the signals to the liquid lens 10 based on the measurements relating to capacitance. In some embodiments, the temperature sensor 32 can be embedded in the liquid lens 10. For example, the temperature sensor 32 can be disposed between two layers of the liquid lens construction. A conductive lead can extend from the embedded location of the temperature sensor 32 to a periphery of the liquid lens 10, such as for providing and/or receiving signals from the temperature sensor. The temperature sensor 32 can comprise a thermocouple, a resistive temperature device (RTD), a thermistor, an infrared sensor, a bimetallic device, a thermometer, a change of state sensor, a semiconductor-based sensor (e.g., a silicon diode), or another type of temperature sensing device.

In some embodiments, the liquid lens 10 can include a heating element 34, which can be used to control the temperature in the liquid lens 10. For example, a liquid lens 10 can have a response rate that reduces dramatically below a threshold temperature (e.g., freezing). In some embodiments, the heating element 34 can be embedded in the liquid lens 10. For example, the heating element 34 can be disposed between two layers of the liquid lens construction. A conductive lead can extend from the embedded location of the heating element 34 to a periphery of the liquid lens 10, such as for providing and/or receiving signals from the heating element 34. The heating element 34 can comprise a resistive heater, a capacitive heater, an inductive heater, a convective heater, or another type of heater. The system can operate the heating element 34 based at least in part on signals received from the temperature sensor 32. The system can measure the temperature and use the heating element 34 to warm the liquid lens if the temperature is below a threshold value. The system can use feedback control to control the temperature using the temperature sensor 32 and the heating element 34.

Figure 2A:
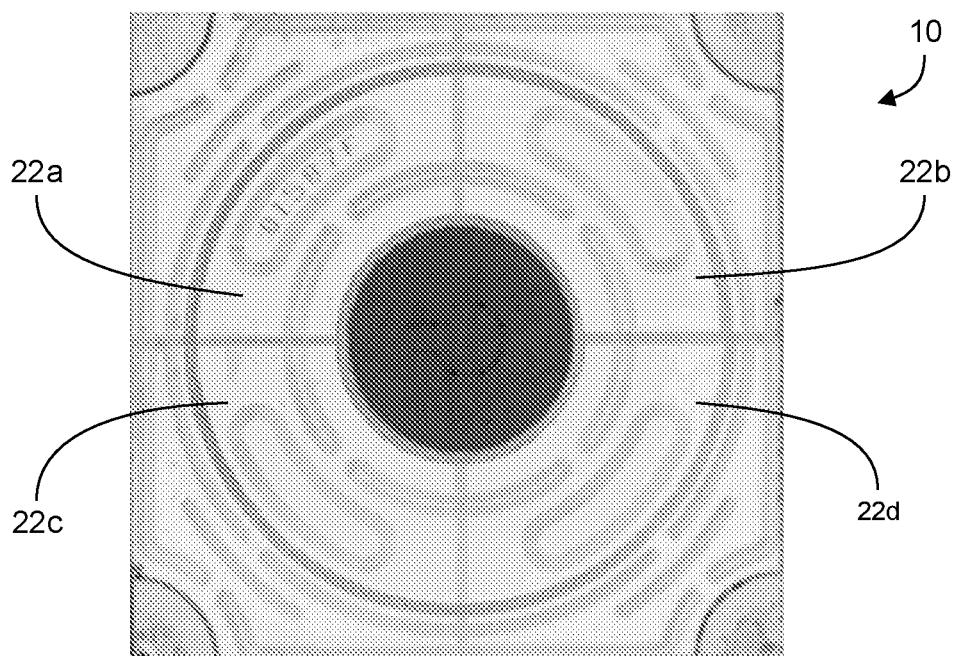
FIG. 2A is a plan view of an example embodiment of a liquid lens.
Figure 2B:
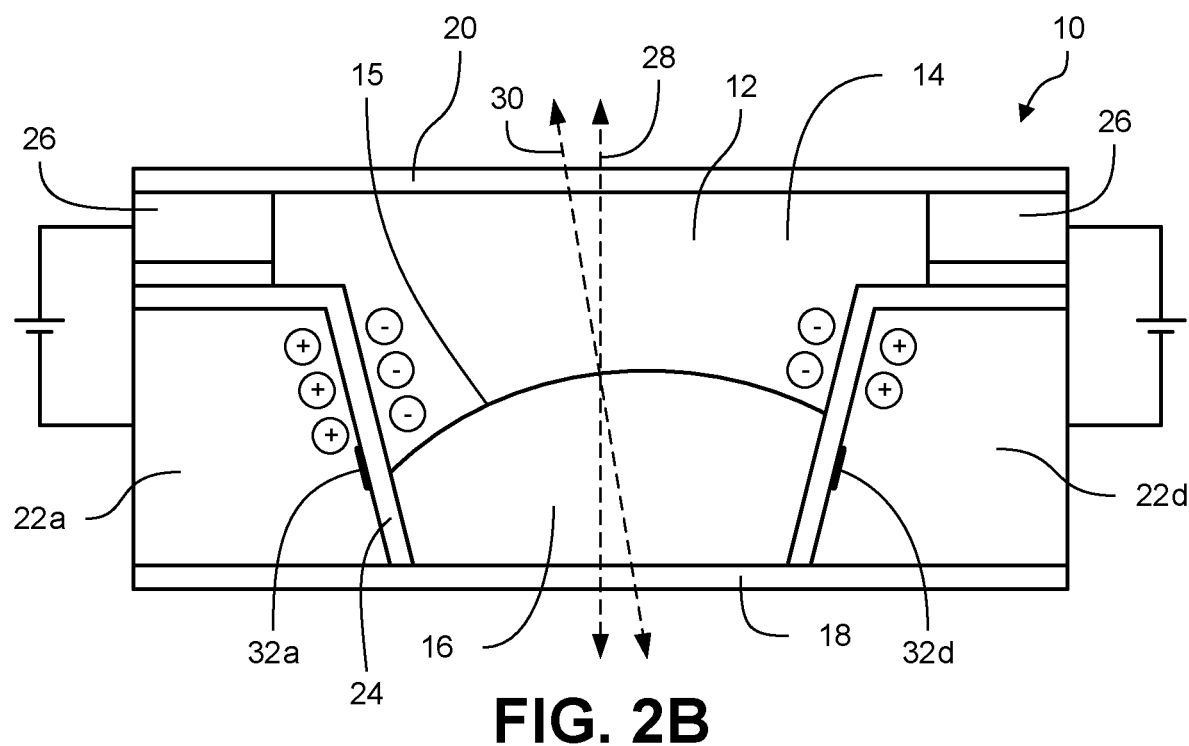
FIG. 2B is a cross-sectional view taken through two electrodes of an example embodiment of a liquid lens.

FIG. 2A shows a plan view of an example embodiment of a liquid lens 10. In some embodiments, the first at least one electrode 22 can include multiple electrodes 22 positioned at multiple locations on the liquid lens 10. The liquid lens 10 can have four electrodes 22a, 22b, 22c, and 22d, which can be positioned in four quadrants of the liquid lens 10. In other embodiments, the first at least on electrode 22 can include various numbers of electrodes (e.g., 1 electrode, 2 electrodes, 4 electrodes, 6 electrodes, 8 electrodes, 12 electrodes, 16 electrodes, or more). The electrodes 22a-d can be driven independently (e.g., having the same or different voltages applied thereto), which can be used to position the fluid interface 15 at different locations on the different quadrants of the liquid lens 10. FIG. 2B shows a cross-sectional view taken through the electrodes 22a and 22d. If more voltage is applied to the electrode 22a than to the electrode 22d, the fluid interface 15 can be pulled further down the sidewall at the quadrant of the electrode 22a, which can cause the optical axis 30 of the fluid interface 15 to tilt relative to the longitudinal axis 28 of the liquid lens 10. This tilt can be used by the camera system to provide optical image stabilization, off-axis focusing, etc. In some cases different voltages can be applied to the electrodes 22a-d to compensate for forces applied to the liquid lens 10 so that the liquid lens 10 maintains on-axis focusing. The liquid lens 10 can have temperature sensors 32a and 32d corresponding to each of the electrodes, or a single temperature sensor for the liquid lens 10 can be used.

Example Feedback and Control Systems

Figure 3A:
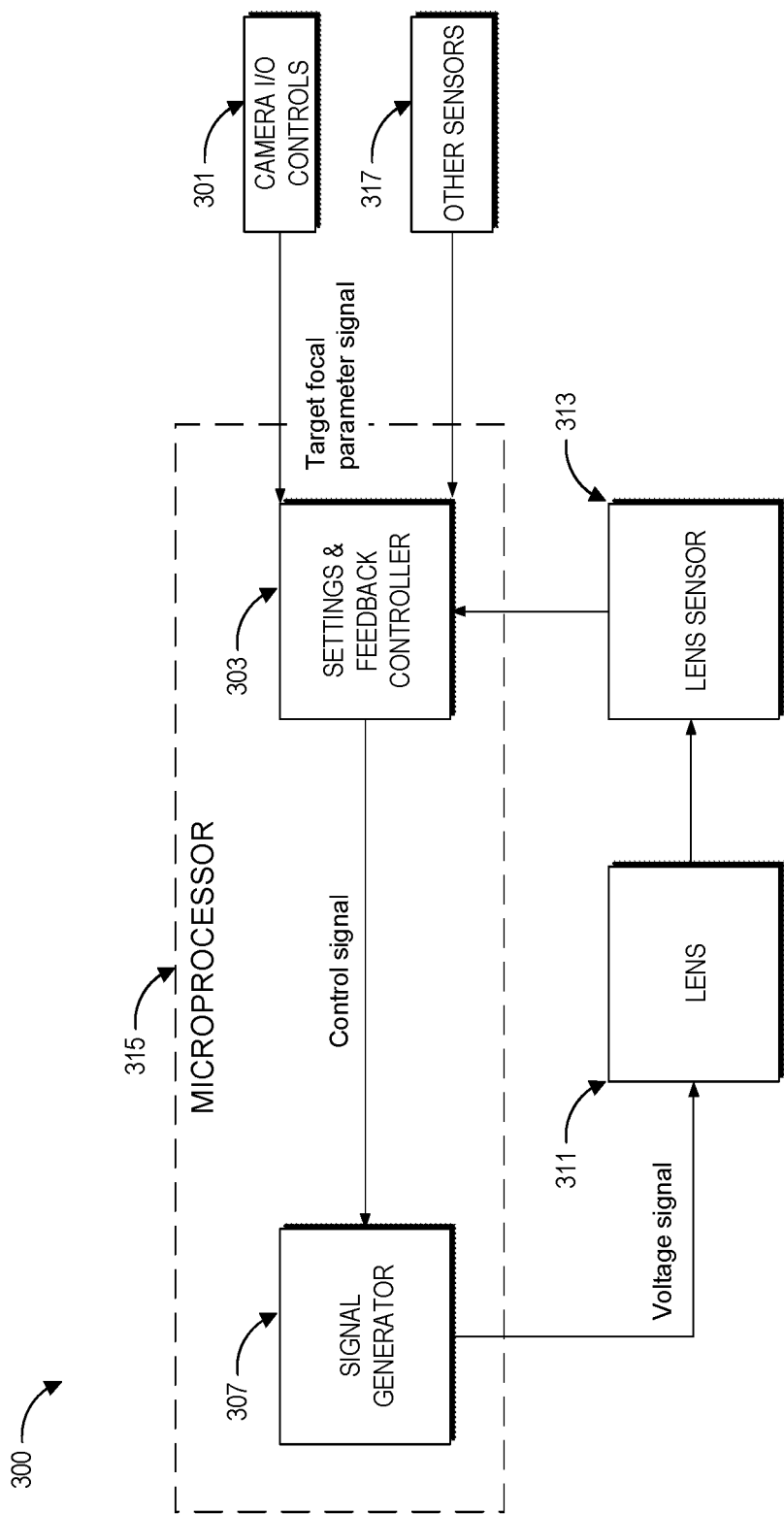
FIG. 3A is a block diagrams of an example embodiment of a system for lens feedback and control.
Figure 3B:
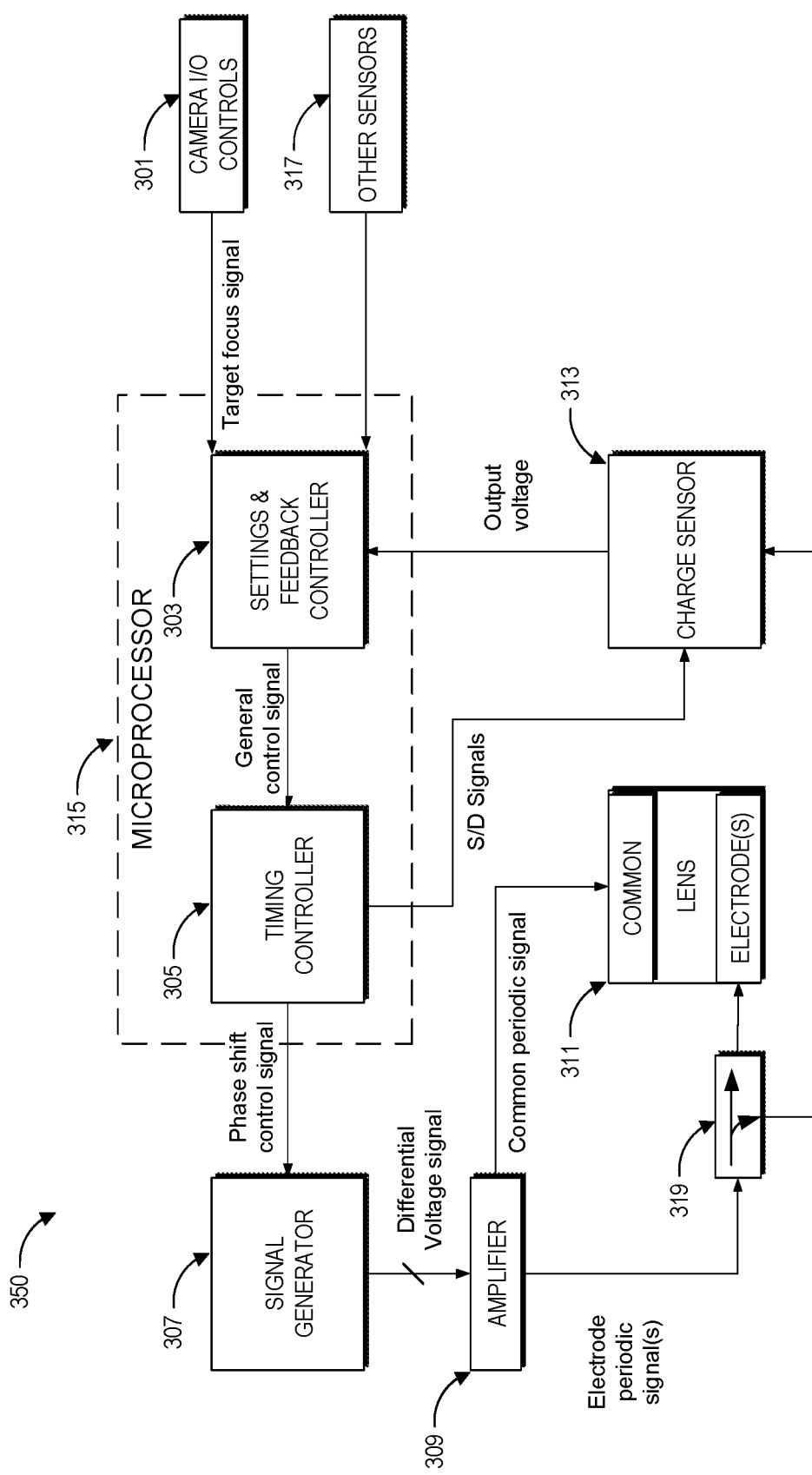
FIG. 3B is a block diagrams of an example embodiment of a system for lens feedback and control.

FIG. 3A and FIG. 3B show example block diagrams 300, 350 of systems for lens feedback and control. FIGS. 3A and/or 3B can include camera input/output ("I/O") controls 301, a settings and feedback controller 303, a timing controller 305, a signal generator 307, an amplifier 309, and a lens 311 such as a liquid lens, a charge sensor 313, other sensors 317, and current mirror 319. Some portions of the control system, such the settings and feedback controller 303 and the timing controller 305, can be implemented in a microprocessor 315.

With reference to FIG. 3A, the camera I/O controls 301 can be used to indicate or set focal parameters such as a focal length for the lens 311 and/or to set a focal direction for the lens 311. This can happen, for example, when a user increases or decreases a distance to an imaging target, changes the zoom of the camera, etc. In some embodiments, the camera can enable off-axis focusing where the focal direction of the lens 311 is angled relative to the longitudinal axis of the lens 311 (e.g., as can be seen in FIG. 2B). In some embodiments, an optical image stabilization system can provide focal parameters, such as to compensate for vibrations by adjusting the focal direction of the lens 311. It should be understood that adjusting the focal parameters can include adjusting the focal length and/or focal direction. The camera I/O controls 301 can provide a signal indicating the target focal length or other focal parameters to the settings and feedback controller 303. In some embodiments, a camera may send the target focal parameter signal based on autofocus, zoom, or some other system or event.

The settings and feedback controller 303 can determine how to adjust the lens 311 in order to achieve the target focal parameters (e.g., focal length). This can include, for example, referring to a lookup table of voltages to apply to the lens in order to cause the lens provide a target focal length. This can additionally or alternatively include using an algorithm or equation to determine the voltage to apply. The settings and feedback controller can also account for additional variables, such as temperature, motion, orientation, gravity, acceleration, distance, etc. measured by other sensors 317 such as a thermometer, a gyroscope, laser or other distance sensor, etc. In some embodiments, if a focal parameter is changed more than a threshold amount, the controller 303 can overdrive the change in voltage so that the fluid interface of the liquid lens 311 moves more quickly to the new position for the new focal parameter. For example, for an increase in voltage, the controller 303 can initially select a voltage that is higher than the voltage value that would be used to hold the fluid interface at the position for the new focal parameter, and the overdriven voltage can then be reduced as the fluid interface approaches the new position. For a decrease in voltage, the controller 303 can initially select a voltage that is less than the voltage value that would be used to hold the fluid interface at the position for the new focal parameter, and the overdriven voltage can be raised as the fluid interface approaches the new position.

The signal generator 307 can receive control signals from the settings and feedback controller 303 and can generate one or more voltage signals to be provided to the lens 311. In some embodiments, a single processor (e.g., microprocessor 315) can include both the settings and feedback controller 303 and the signal generator 307. In various embodiments, one or more properties of the voltage signals are generated based at least in part on the control signal. The property can include a frequency, phase, voltage amplitude, pulse width, shape, or RMS voltage. In various embodiments, the signal generator 307 can generate any type of voltage signal that affects the focus of the lens 311. In some embodiments, the voltage signals can include multiple oscillating voltage signals that can be applied to electrodes of the lens 311, and adjusting a phase delay between the oscillating voltage signals can change a root mean square (RMS) voltage differential applied to the lens 311. In some embodiments, the voltage signals can include a plurality of differential voltage signals delivered to a plurality of electrodes at different locations on the lens 311. In some embodiments, the voltage signal can be a periodic signal that has an amplitude and/or pulse width as properties affected by the control signal. In some embodiments, the voltage signal can be a DC signal having a DC voltage affected by the control signal. Although various embodiments disclosed herein discuss pulse width modulation using phase delay between voltage signals provided to the liquid lens, various other suitable pulse width modulation system could be used.

The voltage signal can be applied to the lens 311 and can affect the focal parameters (e.g., focal length and/or focal direction) of the lens 311, as discussed herein. The lens can be a liquid lens. For example, the liquid lens 311 can have a plurality of immiscible fluids (e.g., liquids) that form a fluid interface that is positionable by applying a voltage to the lens 311.

Despite applying a controlled voltage signal to the lens 311, in some instances the lens 311 may not achieve the designated focal properties. There can be some amount of error. A number of factors can affect the shape and/or position of the lens, and some factors might not be accounted for when generating the voltage signal. Movement of the liquid lens can affect the positions of the fluids therein. Furthermore, imperfections in component manufacturing and/or performance may cause non-negligible effects. Additionally, the focal properties of a lens 311 may be affected by hysteresis such that the response of the lens 311 (e.g., the shape and/or position of the fluid interface) to the voltage signal may be different based on a previous state of the lens 311. In some embodiments, feedback can be used to account for error and make adjustments to the lens 311 (e.g., to the shape and/or position of the fluid interface).

It can be difficult to directly measure the shape and/or position of the fluid interface in a liquid lens 311. Liquid lenses can be designed very small to facilitate portability (e.g., a lens in a smartphone). However, the shape and/or position of the lens can be indirectly determined through the capacitance of components on the lens. As previously described with respect to FIG. 1B, an electrode can be positioned close to and insulated from a first fluid in a liquid lens. The electrode and first fluid can effectively act as a capacitor. As the first fluid changes shape and/or position in response to electromagnetic forces from a voltage applied at the electrode, the effective capacitor plate area formed by the first fluid changes. Therefore, the capacitance of the effective capacitor is indicative of the shape and/or position of the fluid interface.

The lens sensor 313 can be configured to make a measurement that is indicative of a capacitance of the lens, wherein the capacitance is indicative of a shape and/or position of the fluid interface in the lens. In some embodiments, the lens sensor 313 could measure (e.g., directly measure) the position of the fluid interface of the liquid lens. The lens sensor 313 can be a charge sensor, as discussed in connection with some embodiments herein, or other sensor type. The lens sensor 313 could be an integral component of the liquid lens or of the liquid lens system. Or the lens sensor 313 could include outside sensor components that are external to the liquid lens system, or a combination of integral and external sensor components. In some implementations, the lens sensor 313 can indirectly measure the capacitance based on the amount of charge delivered to an electrode of the lens 311. The total amount of charge on the electrode of the effective capacitor formed in the liquid lens 311 can be determined by:

$$Q_{tot} = C_{lens} V_{Signal} \qquad \text{Eq. 1}$$

where $Q_{tot}$ is the total amount of charge, $C_{lens}$ is the capacitance of the effective capacitor formed by the electrode and liquid in the lens, and $V_{signal}$ is the voltage of the voltage signal applied to the electrode. $V_{signal}$ can be a known quantity when the voltage of the voltage signal is constant or is set by the control signal. In some embodiment, the lens sensor 313 can be a charge sensor that generates a signal based on the total charge applied to the electrode of the liquid lens 311, as discussed in more detail herein.

The lens sensor 313 can provide a signal that is indicative of $C_{lens}$ to the feedback controller 303. The feedback controller 303 can determine, based on the signal indicative of $C_{lens}$, whether or not the fluid interface in the liquid lens 311 is positioned to cause the lens 311 to have the specified focal properties (e.g., to focus on the imaging target). The feedback controller 303 can then determine any feedback adjustments and accordingly adjust the control signal to cause the signal generator 307 to change a property of the voltage signal to cause the lens 311 to more closely focus on the focus target. In some embodiments, the feedback response can initially be an overdriven response to cause the lens to focus more quickly on the focus target. Overdriving the signal to the lens 311 can be especially beneficial when a focal parameter has changed such that the fluid interface in the liquid lens needs to move significantly to a new position in the liquid lens 311.

With reference to FIG. 3B, the example system 350 can include features similar to system 300. The settings and feedback controller 303 can receive target focal parameters from the camera I/O controls 301, and/or measurements from other sensors 317. Based on the target focal parameters and/or the measurements, the settings and feedback controller 303 can determine one or more voltages (e.g., differential RMS voltages) to apply to electrodes of the lens 311 in order to cause the lens 311 to focus with the focal parameters. The settings and feedback controller 303 can provide general control signals to a timing controller 305. The timing controller 305 can provide a number of timing signals to various subsystems. This can include sample and discharge signals to the charge sensor (e.g., for opening and closing the sample and discharge switches as discussed herein). This can also include phase shift control signals to the signal generator 307.

The signal generator 307 can generate voltage signals (e.g., differential voltage signals), which can include one or more electrode periodic signal and a common periodic signal. The phase of the one or more electrode periodic signals can be shifted by a phase shift amount as compared to the common periodic signal. The phase shift amount can be controlled, at least in part, by the phase shift control signal. Accordingly, one or more differential voltage signals applied to the lens 311 can produce one or more RMS voltages to corresponding one or more electrodes, and the one or more RMS voltages can be controlled, at least in part, by the phase shift control signal.

The voltage signals can be amplified by one or more amplifiers 309 to a known voltage. The common periodic signal can be provided to a common node on the lens 311. The common periodic voltage signal can be provided to the first fluid of the liquid lens 311 (e.g., via the electrode 26 of FIGS. 1A-2B). The electrode periodic voltage signals can be provided to electrodes(s) of the lens 311 (e.g., to the electrode 22 of FIGS. 1A-1B or to the electrodes 22a-d of FIGS. 2A-2B).

The one or more electrode periodic signals can be provided through one or more current mirrors 319 to the lens 311. The one or more current mirrors 319 can provide a mirror of the current of the one or more electrode periodic signals to one or more charge sensors 313. The one or more charge sensors 313, can each include a sampling capacitor.

Upon activation of the sampling signal from the timing controller 305, the sampling capacitor can receive the mirrored current. An analog to digital converter of the charge sensor can then read the voltage of the sampling capacitor and provide an output voltage reading to the settings and feedback controller 303. Upon activation of a discharge signal from the timing controller 305, the sampling capacitor can be discharged.

The voltage of the sampling capacitor can be indicative of an amount of charge on the sampling capacitor, and the amount of charge on the sampling capacitor can be indicative of a capacitance of $C_{lens}$ (e.g., the capacitance between the first fluid 14 and the electrode 22, as discussed in connection with FIG. 1B). The relationships can be described by the equations:

$$Q_{tot} = C_{sample} V_{out} \qquad \text{Eq. 2}$$

where $Q_{tot}$ is the total amount of charge on the sampling capacitor, $C_{sample}$ is the capacitance of the sampling capacitor, and $V_{out}$ is the voltage across the sampling capacitor. The sampling capacitor can have a known $C_{sample}$. Because the same mirrored current is provided to both the sampling capacitor and to the effective capacitor in the lens 311 for the same amount of time, the total amount of charge goes to both the sampling capacitor and to the effective capacitor in the lens 311. Eq. 1 and Eq. 2 can be set equal to each other and solved.

$$C_{sample} V_{out} = C_{lens} V_{Signal} \qquad \text{Eq. 3}$$

$$V_{out} = \frac{V_{signal}}{C_{sample}} C_{lens} \qquad \text{Eq. 4}$$

Accordingly, the output signal $V_{out}$ indicates the capacitance $C_{lens}$ when $C_{sample}$ and $V_{signal}$ are known.

The settings and feedback 303 controller can use $V_{out}$ or $C_{lens}$ to determine if the lens 311 is focused with the target focal parameters or if adjustment to the lens 311 is needed. In some embodiments, it can require less computation to use $V_{out}$, so in some embodiments the calculation of the value for $C_{lens}$ can be omitted. $V_{out}$ can be compared to an expected value based on the focal parameters and/or input from the other sensors 317. The expected value can be derived from a look up table or a formula or algorithm. If $V_{out}$ is too high, then the settings and feedback controller 303 can reduce the voltage (e.g., the RMS voltage) of the differential voltage signal. If $V_{out}$ is too low, then the settings and feedback controller 303 can increase the voltage (e.g., the RMS voltage) of the differential voltage signal.

The feedback process can be repeated to achieve the target focal parameters and/or to maintain the target focus parameters, such as when the lens changes orientation with respect to gravity. When the settings and feedback controller 303 provides a corrective general control signal, the corrective general control signal can be initially overdriven, such as to move the fluid interface more quickly to a new position.

In various embodiments, any combination of digital and or analog circuitry can be used. For example, a microprocessor 315 can be used as a timing controller 305 and/or settings and feedback controller 303, or the microprocessor 315 can perform any other system function in FIG. 3. In various embodiments, different parts of the system, such as the signal generator 307, the amplifier 309, the charge sensor 313, or any other part of FIG. 3, can be implemented in analog circuitry or mixed analog/digital circuitry.

Example Schematic Diagram

Figure 4A:
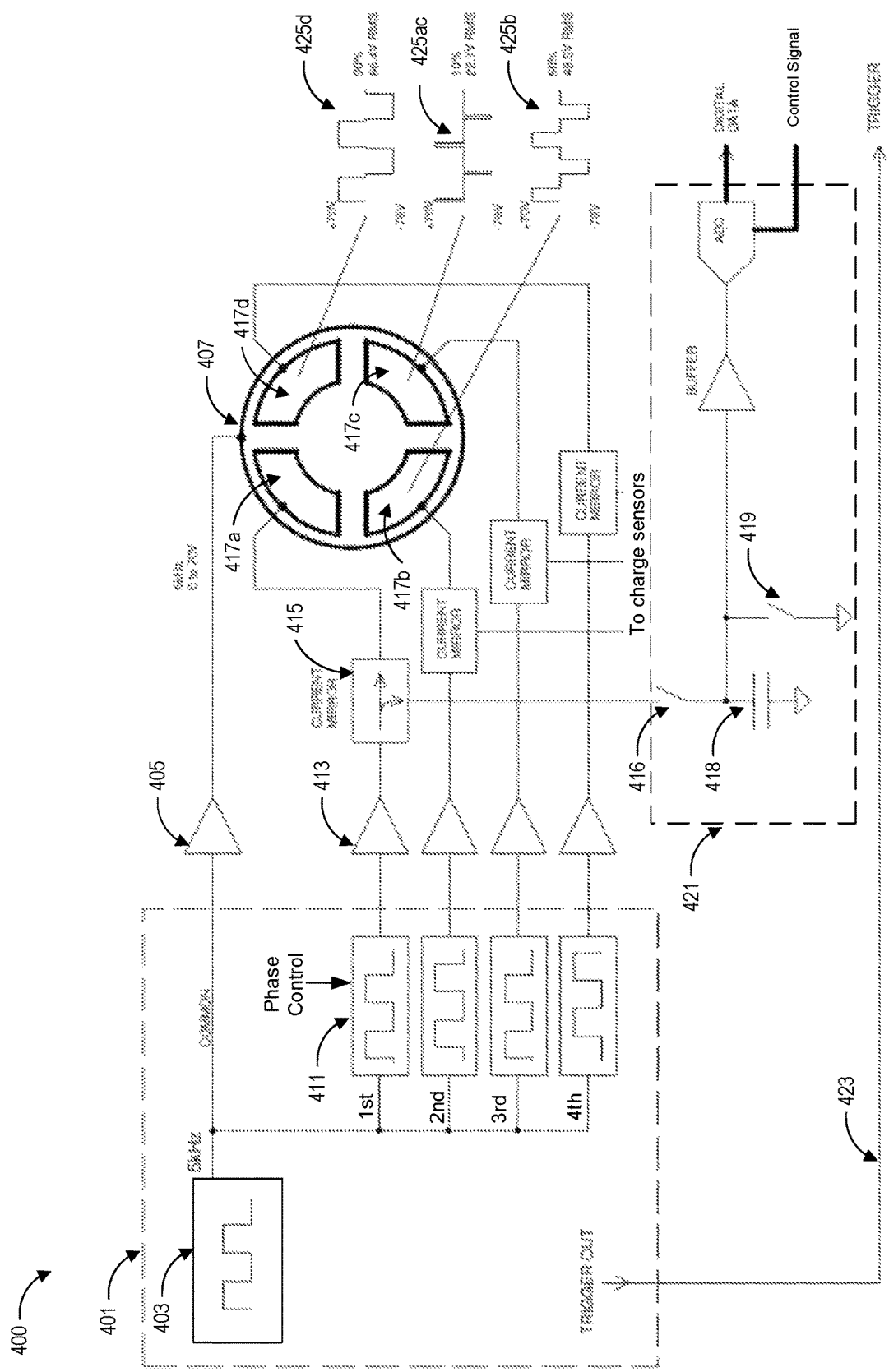
FIG. 4A shows an example embodiment of a lens feedback and control system for a four electrode liquid lens.

FIG. 4A shows an example schematic diagram 400 of a lens feedback and control system for a four electrode liquid lens, which can be similar to or the same as the liquid lens 10 of FIGS. 2A-2B. The schematic diagram 400 provides an example implementation of parts of the control systems shown in FIGS. 3A and 3B. A signal generator 401 can includes a waveform generator 403 and a four phase shifters 411. The schematic diagram also includes an amplifier 405 for a common voltage signal provided to a common node 407 of the liquid lens, respective amplifiers 413 for first, second, third, and fourth electrode voltage signals provided to respective electrodes 417a-417d on the liquid lens, respective current mirrors 415 for the respective electrode voltage signals, and respective charge sensors 421 coupled to the respective current mirrors. Only one charge sensor 421 is shown in FIG. 4A for simplicity, but it will be understood that the system includes three additional charge sensors 421 that receive current from the respective three additional current mirrors 415. The charge sensors 421 can include a sampling switch 416, a sampling capacitor 418, and a discharge switch 419. The charge sensor 421 can include a buffer, and an analog to digital converter ("ADC"). A trigger line 423 can provide a trigger signal (e.g., output from the signal generator 401).

The signal generator 401 can include a waveform generator 403. In the example shown, the waveform is a 5 kHz square pulse waveform. However, in various embodiments, the waveform can be any periodic, AC, DC, or other signal. The waveform can have a sinusoidal, saw tooth, or other shape. The waveform could have a different frequency than the embodiment shown in FIG. 4A. In some embodiments, the waveform can have a frequency that is faster than the response rate of the liquid lens so that the position of the fluid interface in the liquid lens does not respond to the individual pulses of the waveform. For example, the waveform can have a frequency that is 3×, 5×, 7×, 10×, 15×, 20×, 50×, or more faster than the response rate of the liquid lens. An output of the waveform generator 403 can be coupled to an amplifier 405. An output waveform from the waveform generator 403 can be used as the common voltage signal (e.g., applied to the first fluid, as discussed in FIGS. 1B and 2B).

The output of the amplifier 405 can be coupled to a common node 407 of the liquid lens. In some embodiments, the common node can be a first fluid in the liquid lens or an electrode in the liquid lens that is in electrical communication with the first fluid. The common differential signal is amplified through amplifier 405 to have a 70V amplitude and provided to the common node 407 of the liquid lens. In various embodiments, the amplifier can provide different amounts of amplification and/or up to different voltages, as appropriate for the particular implementation.

The output of the waveform generator 403 is also used to provide first, second, third, and fourth electrode voltage signals, which can be provided to the electrodes 417a-d of the liquid lens. The output of the waveform generator 403 can be coupled to a first phase shifter 411. A first differential voltage signal can be phase shifted by a phase shifter 411. The amount of phase shift can be controlled by a phase control signal, which can be provided by a timing controller or settings and feedback controller as disclosed in connection with FIGS. 3A and 3B. The output of the phase shifter 411 can be coupled to an amplifier 413. The phase shifted first voltage signal can be amplified by the amplifier 413. The amplifier 413 can amplify the phase shifted first differential voltage signal by the same amount as amplifier 405, which is 70V in this example, or other amounts in various embodiments.

The output of the amplifier 413 can be provided through a current mirror 415 to the first electrode 417a. There can be a differential voltage between the amplified, phase shifted first differential voltage signal and the common differential voltage signal as a result of the phase shift. Accordingly, one or more of the fluids (e.g., liquids) in the liquid lens can be affected by the differential voltage and change its shape and/or position, thereby affecting the focal properties of the lens. In some embodiments, a relatively short phase delay can result in relatively short pulse widths for the differential voltage, which can result in a relatively low RMS voltage. The relatively short phase delay applied to the voltage signals delivered to electrodes 417a and 417c can produce the voltage differential waveform 425ac shown in FIG. 4A, which in this example generates an RMS voltage of 22.1V. A relatively long phase delay can result in relatively long pulse widths for the differential voltage, which can result in a relatively high RMS voltage. The relatively long phase delay applied to the voltage signal delivered to the electrode 417d can produce the voltage differential waveform 425d shown in FIG. 4A, which in this example generates an RMS voltage of 66.4V.

The current mirror 415 can be coupled to a charge sensor 421. The current mirror 415 can provide a mirror of the amplified, phase shifted first differential voltage signal to a sampling capacitor 418. During a sampling period, the sampling switch 416 can be closed, coupling the current mirror 415 to the sampling capacitor 418, while the discharge switch is open. The sampling capacitor 418 can have sufficient capacitance and/or the sampling period can be sufficiently short so that the sampling capacitor 418 does not become saturated by the current delivered to the sampling capacitor 418 during the sampling period. The sampling capacitor 418 can be coupled through a buffer to the ADC, which can provide a digital output indicative of the analog voltage across the sampling capacitor 418. A timing signal can be provided to the ADC to cause the ADC to make a reading. The ADC can communicate with a microprocessor, for example, through a control signal (e.g., a serial peripheral interface (SPI) bus). As discussed in connection with FIGS. 3A and 3B, a controller adjust the phase delay applied by the phase shifter 411 to the electrode signal based on the output of the charge sensor 421. By monitoring the position of the fluid interface on each of the four quadrants and adjusting the phase delay based on that feedback, the shape of the fluid interface can be controlled to implement the target focal parameters (e.g., focal length and or focal tilt).

During a discharge period, the discharge switch 419 can be closed, causing any accumulated charge on the sampling capacitor 418 to discharge to ground. During the discharge period, the sampling switch 416 can be open.

It will be understood that the teachings and disclosure with respect to the first electrode voltage signal can be applied to the second, third, and fourth electrode signals, and in various embodiments, any number of differential signals with respect to any number of reference signals. The second, third, and fourth differential signals can be respectively phase shifted, respectively amplified, provided to respective electrodes in the lens, respectively mirrored, provided to respective charge sensors, and a voltage can be respectively measured.

FIG. 4A shows differential voltage waveforms 425AC, 425B, 425D corresponding to the electrodes 417a-d of the liquid lens. The first, second, third, and fourth differential signals can be controlled independent from each other. Accordingly, there can be independent differential voltages between each of the four quadrant electrodes 417a-417d and the common node 407, shown as differential voltage waveforms 425C, 425B, 425D. In the example, the first and third differential voltage signals are phase shifted by the same amount and result in waveform 425AC. A slight phase shift with respect to the common differential signal causes brief peaks and troughs to appear in the differential voltage waveform 425AC where the first/third differential voltage signal and the common differential voltage do not overlap. Accordingly, a small RMS voltage results, which is about 22.1V in this example. In the example, the second differential voltage signals is phase shifted by about 90 degrees and result in waveform 425B. A quarter phase shift with respect to the common differential signal causes the peaks and troughs of moderate duration to appear. Accordingly, a medium RMS voltage results, which is about 49.5V in this example. In the example, the fourth differential voltage signal is phase shifted by almost 180 degrees and result in waveform 425D, causes peaks and troughs with longer duty cycles to appear. Accordingly, a large RMS voltage results, which is about 66.4V in this example.

In various embodiments, different voltage control schemes can be used. For example, the respective differential voltage signals can have their amplitudes adjusted instead of phase. As another example, the duty cycle of the respective differential voltage signals can be adjusted. Although the example shows four signals and four electrodes, any number of signals and electrodes can be used to apply voltages to the lens.

Figure 4B:
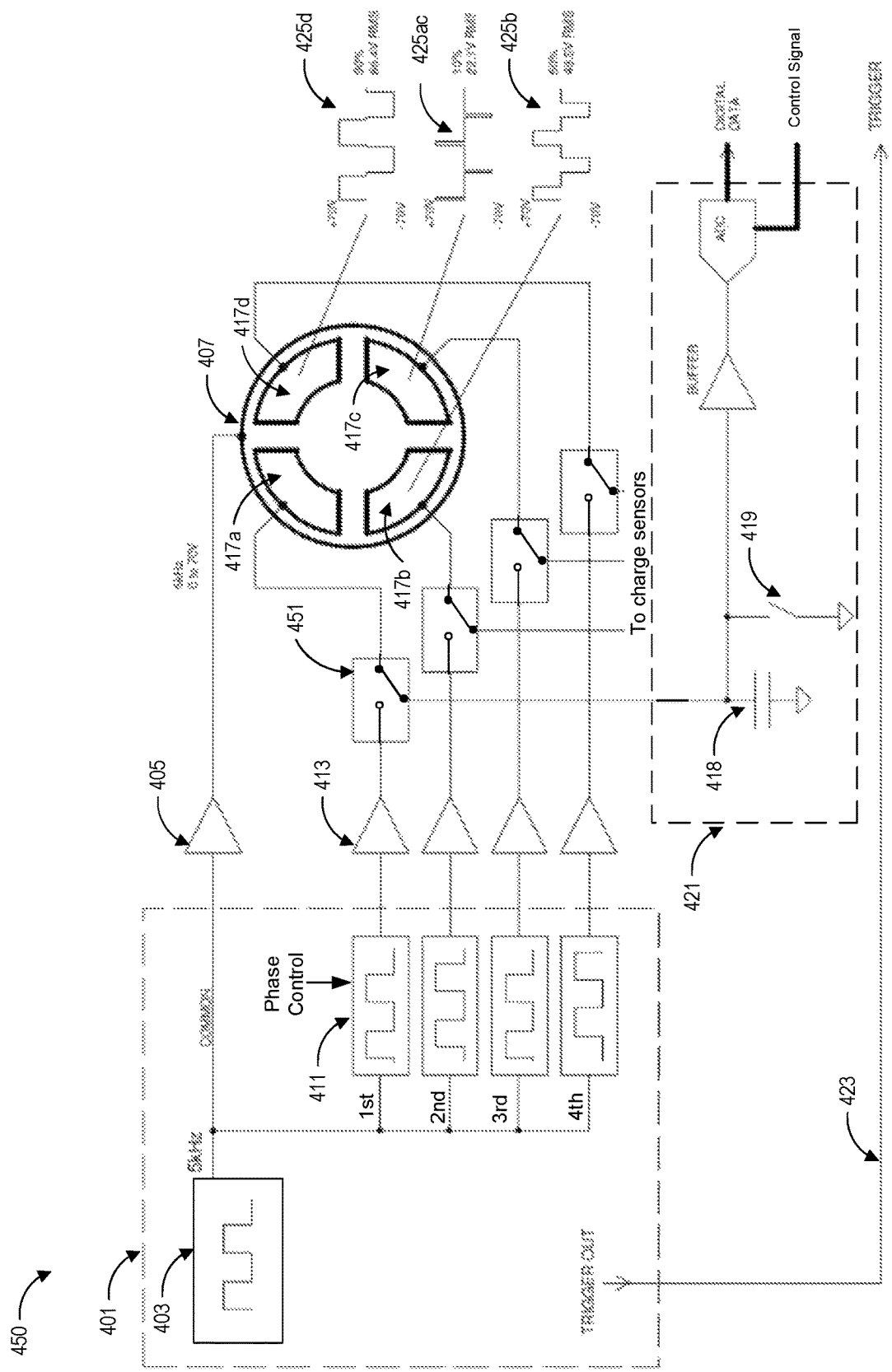
FIG. 4B shows another example embodiment of a lens feedback and control system for a four electrode liquid lens.

FIG. 4B shows a schematic diagram 450 of another example embodiment of a lens feedback and control system for a four electrode liquid lens. The implementation of FIG. 4B is similar to the implementation of FIG. 4A, but the approach of FIG. 4B uses a different charge sensor configuration. Although not discussed in detail herein, many details discussed in connection with FIG. 4A can apply also to FIG. 4B. The example embodiment of FIG. 4B can use switches 451 to toggle between first states and second states. The first states (e.g., not shown in FIG. 4B) can be configured to charge the effective capacitors formed between the electrodes 417a-d and the conductive fluid of the liquid lens. The second states (e.g., shown in FIG. 4B) can be configured to at least partially discharge those effective capacitors and direct the discharged current to sensing circuitry (e.g., to the charge sensors 421). For example, the switch 451 can be configured to couple the output of the amplifier 413 to the first electrode 417a in the first state, thereby applying voltage to the electrode 417a. The switch 451 can toggle to the second state, which is shown in FIG. 4B, to provide a connection between the first electrode 417a and the charge sensor 421. During a sampling period, the switch 451 can couple the charge sensor 421 to the first electrode 417a (e.g., in the second state), thereby causing a representation of the charge on the electrode 417a to be provided to the sampling capacitor 418. A voltage for the sampling capacitor can be measured by the ADC. In some embodiments, the switch 451 can be in the first state to decouple the sampling capacitor 418 from the first electrode 417a while the ADC makes a reading. In various embodiments, other switch configurations can be used to sample and hold a voltage for the ADC to measure. The sample period for the embodiment of FIG. 4B can be later than shown in FIG. 5, so that the switch 451 toggles to the second state at a time after a voltage differential has been applied to charge the effective capacitor on the liquid lens. The discharge and reading periods can also occur later than shown in FIG. 5 for the embodiment of FIG. 4B. Although only one charge sensor 421 is shown in FIG. 4B, charge sensors 421 can be included for each of the electrodes 417a-d, and can operate according to the discussion herein. It should be noted that in some instances the switches 451 and the current mirrors 415 can be considered part of the corresponding charge sensors 421.

The capacitance of the effective capacitor on the liquid lens can be measured or otherwise determined in other manners. For example, phase synchronous detection of capacitance can be used. A high frequency (e.g., MHz) low amplitude voltage oscillation signal can be combined with the voltage signal provided to the electrode of the liquid lens. By measuring the difference of the input oscillation signal to the output oscillation signal (e.g., the phase and amplitude changes in the oscillation signal), the capacitance can be determined. In some embodiments, peak detection of capacitance can be used. In some embodiments capacitance differencing, resistance capacitance (RC) tank, or phase shift detection approaches can be used to determine the capacitance. In some embodiments, an RC decay approach can be used to determine the capacitance. In some embodiments, a frequency spectrum analysis or heterodyne approach can be used to determine the capacitance.

Timing Diagram

Figure 5:
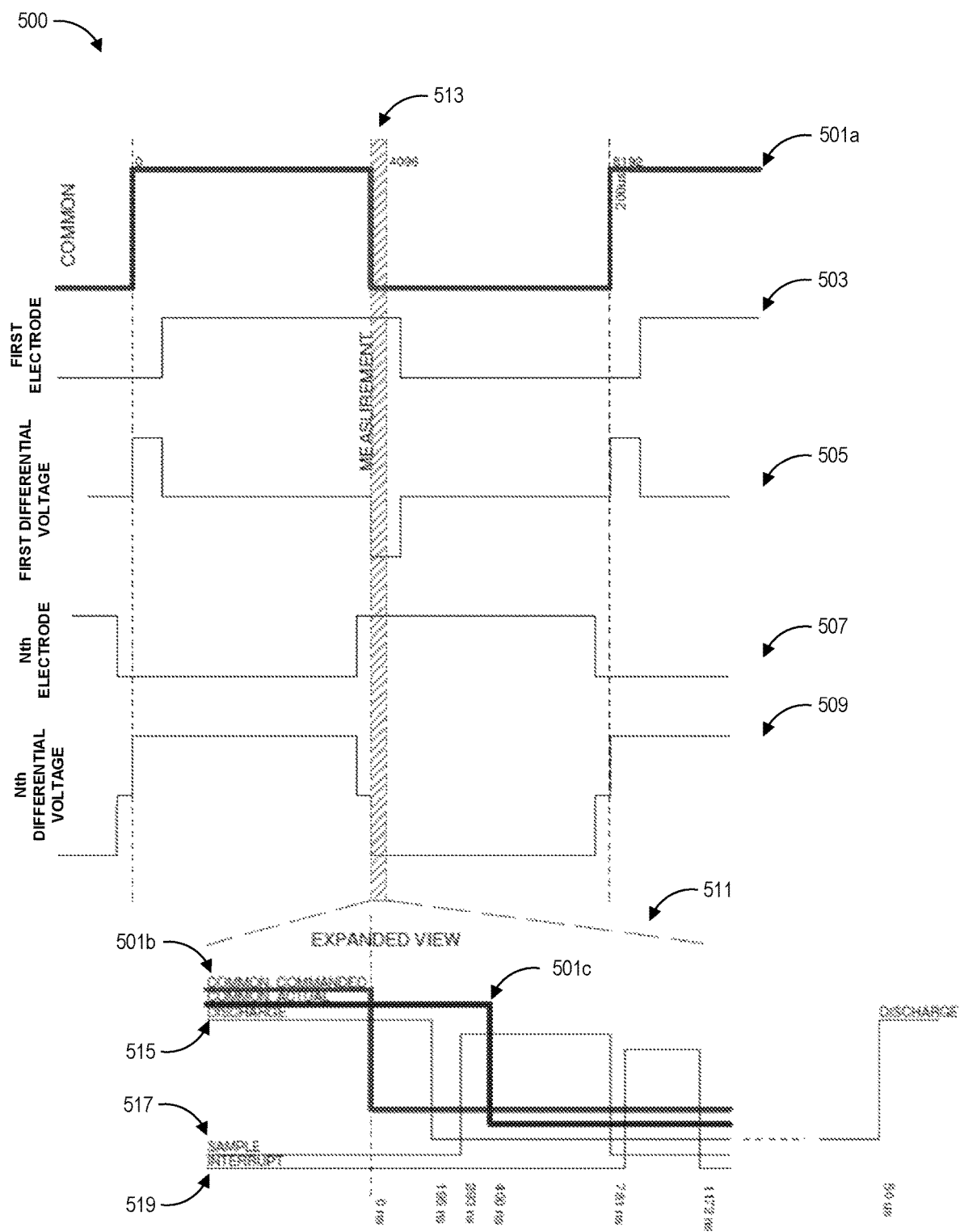
FIG. 5 shows an example timing diagram of signals in a feedback and control system.

FIG. 5 shows an example timing diagram of signals in a feedback and control system. The timing diagram includes a common waveform 501A, a first voltage signal 503 provided to a first electrode, a first differential voltage 505 between the first electrode voltage signal 503 and the common signal 501A, an Nth electrode voltage signal 507 provided to an Nth electrode, and an Nth differential voltage 509 between the Nth voltage signal 507 and the common signal 501A. An expanded view 511 shows signals during a section of time 513 sampling of an indication of a charge on a lens. The position of time section 513 can be selected so that the voltage is low enough to avoid using a high voltage analog stage to measure capacitance. The expanded view includes a common command signal 501B, an actual common voltage 501C, a discharge signal 515, a sample signal 517, and an interrupt signal 519.

The signal control scheme shown in FIG. 5 can be applied to, for example, the charge sensor 421 in FIG. 4A. However, various embodiments can use other signal controls schemes, and different charge sensors can be controlled differently. The common waveform 501A shows a periodic pulse waveform with a period of 200 microseconds (frequency of 5 kHz). The common wave form 501A can be provided, for example, to the common node 407 in FIG. 4A. The first voltage signal 503 is also a period pulse waveform with a period of 200 microseconds. However, the first voltage signal 503 is phase shifted with a delay compared to the common waveform 501A. The first voltage signal 503 can be provided to, for example, one of the electrodes in FIG. 4A such as electrode 417a. A first different voltage 505 shows the differential voltage between first the voltage signal 503 and the common signal 501A resulting from the phase delay. The Nth voltage signal 507 is also a period pulse waveform with a period of 200 microseconds. However, the Nth voltage signal 507 is phase shifted compared to the common waveform 501A. The Nth voltage signal 507 can be provided to, for example, one of the electrodes in FIG. 4A such as electrode 417d. An Nth different voltage 509 shows the differential voltage between first the voltage signal 509 and the common signal 501A resulting from the phase delay.

In the expanded view 511, a common command signal 501B is reduced at a reference time 0 ns, causing the actual common waveform 501C to drop from a high signal to a low signal. The actual common waveform 501C makes the transition after a small delay.

A discharge signal 515 can be provided to control a discharge switch, such as discharge switch 419 in FIG. 4A, to couple/decouple a sampling capacitor to ground, such as sampling capacitor 418 of FIG. 4A, thereby discharging the sampling capacitor when the discharge switch is closed. The discharge signal 515 can initially cause the discharge switch to be closed at 0 ns. In response to the common command signal 51B switching and/or before the actual common waveform 501C responds, the discharge signal 515 can toggle and open the discharge switch. After the sample measurement has been taken, the discharge signal 515 can toggle to cause the discharge switch 419 to close, for example to thereby discharge the sampling capacitor 418 before the next measurement.

A sampling signal 517 can be provided to control a sampling switch, such as sampling switch 416 in FIG. 4A, to couple/decouple a sampling capacitor, such as sampling capacitor 418 of FIG. 4A, from sampling a mirror of a current provided to the lens. The sampling signal 517 can initially cause the sampling switch to be open at 0 ns. In response to the common command signal 501B switching, and/or after the discharge switch is opened, the sampling signal 517 can toggle and close the sampling switch 416 to provide charge to the sampling capacitor 418.

The sampling signal 517 can return to an initial state after a sampling period of time, to open the sampling switch 416. After the sampling period, the interrupt signal 519 can be provided to cause a reading of the voltage from the sampling capacitor 418 (e.g., using an ADC to take a reading of the voltage stored on the sampling capacitor 418). After the reading is complete, the sampling capacitor can be discharged.

In the example shown in FIG. 5, the period is 200 microseconds such that the sampling occurs about 5,000 times per second (5 KHz). However, the period can be faster or slower. In various embodiments, the sampling can occur for different amounts of time, even longer than one period. In various embodiments, the charge/discharge/sampling can be responsive to other signals or occur at various times during each period. The charge/discharge/sampling can occur responsive to a rising edge of the common signal, a falling edge of the common signal, or at other times, with appropriate changes.

Example Methods

Figure 6:
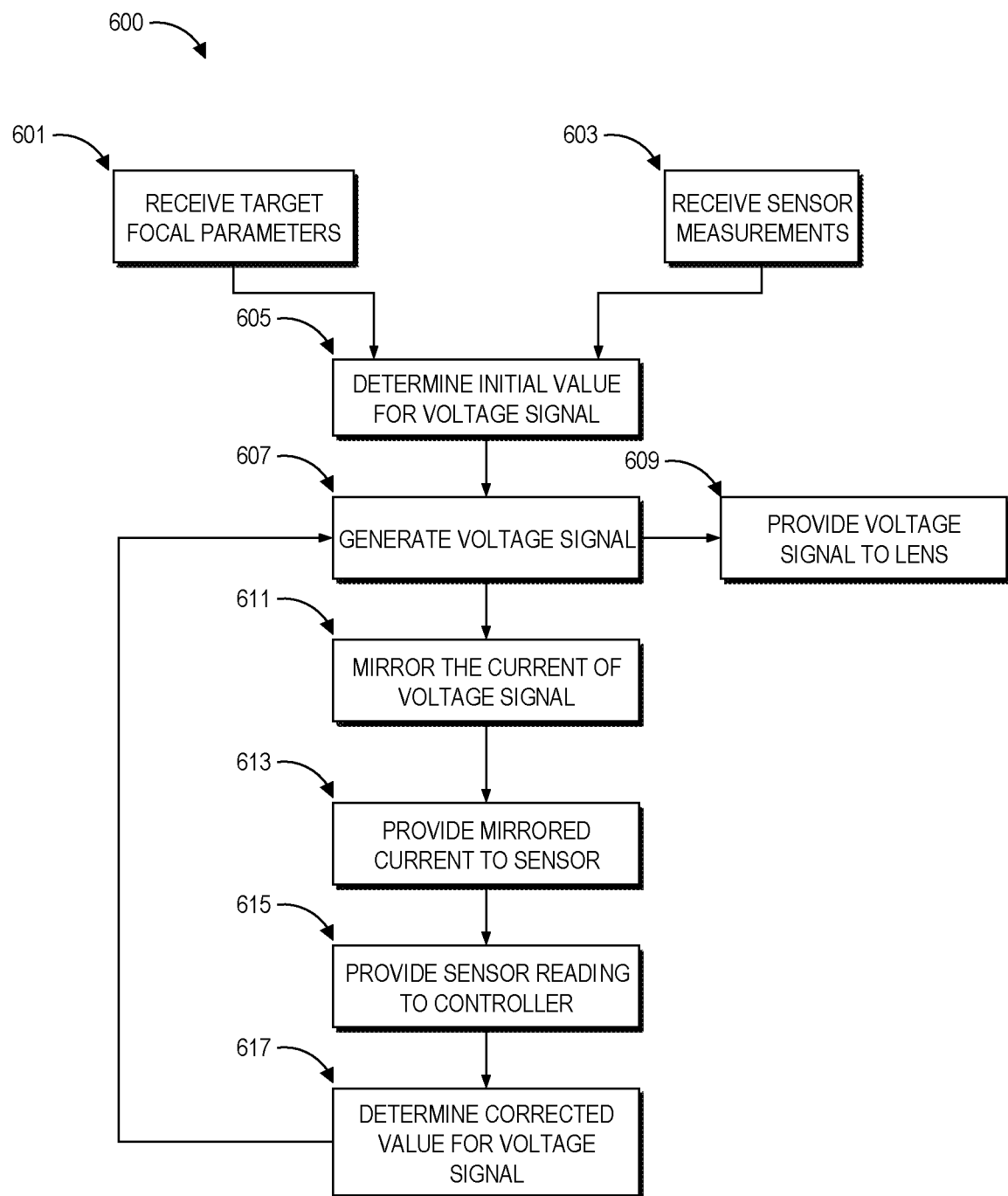
FIG. 6 shows an example method for controlling focal parameters of a lens.

FIG. 6 shows an example method 600 for controlling focal parameters of a lens. The lens can be, for example, a liquid lens. At block 601, target focal parameters can be determined. These can be determined, for example, in response to a user selected focus set via inputs to a camera, such as buttons or a touchscreen selection. As another example, a user can select an autofocus function to automatically determine a focus target. The target focal parameters can be determined, for example, by a microcontroller. In some embodiments, an optical image stabilization system can contribute to the target focal parameters, such as to compensate for vibrations experienced by the camera system.

At block 603, sensor measurements can be received. Example sensors can include thermometers, gyroscopes, accelerometers, distance sensors, etc. The sensors can make readings of variables affecting the response of a lens to a voltage.

At block 605, an initial value for a voltage signal is determined. A microprocessor can determine the initial value, for example, by referring to a lookup table of voltage values associated focus targets. The lookup table can also include lookups relating to other variables, such as distance, humidity, temperature, acceleration, etc. Alternatively or in addition to lookup tables, the initial value can be determined and/or adjusted by an algorithm or formula. For example, a microprocessor may receive a target focal length of 5 meters when the temperature of the lens is 100° F., and determine a 30V RMS as the initial value of a voltage signal for a first electrode affecting the lens in a first direction, and adjust the 30V RMS by +5 V RMS to 35V RMS to induce focal tilt, e.g., to compensate for movement of the camera.

At block 607, the voltage signal is generated. The voltage signal can have the initial value for the initial voltage. In some embodiments, the voltage signal can be a differential signal with respect to a periodic signal. At block 609, the voltage signal can be provided to a lens. The voltage signal can be applied to an electrode positioned in a liquid lens to affect the shape and/or position of the lens. The electrode and one or more parts of the lens (such as a first liquid) can have an effective capacitance that varies with the shape and/or position of the liquid lens.

At block 611, a current of the voltage signal can be mirrored. This can be done, for example, by a current mirror such as current mirror 415 in FIG. 4A. At block 613, the mirrored current can be provided to a sensor. Where the shape and/or position of the fluid interface in the lens affects the capacitance of the effective capacitor, the sensor can be configured to sense an indication of the capacitance such as an amount of charge. The sensor can include, for example, a sampling capacitor configured to receive the mirrored current and an ADC configured to measure a voltage across the sampling capacitor. The sensor can also include, for example, a plurality of switches configured to cause the sampling capacitor to charge, discharge, and hold during charging, discharging, and sampling periods, respectively. At block 615, the sensor reading can be provided to the controller.

At block 617, a corrected value for the voltage signal can be determined. The corrected value can be determined based at least in part on the sensor reading. For example, if the sensor reading is too high, this can indicate that the capacitance of the effective capacitor is too high, which can indicate that the fluid interface is positioned too low on a sidewall, and in response, the controller can decrease the value of the voltage signal. For example, if the sensor reading is too low, this can indicate that the capacitance of the effective capacitor is too low, which can indicate that the fluid interface in the lens is positioned too high on a sidewall, and in response, the controller can increase the value of the voltage signal. The controller can perform the determination, for example, by comparing the value from the sensor reading to voltages associated with focus targets in a lookup table or other similar structure stored in the memory, or by using a formula or algorithm. The controller can additionally or alternatively account for other variables previously described (e.g., temperature, camera movement, etc.) via tables, formula, and/or algorithms. In some embodiments, additional measurements from sensors can be used at block 617 when determining a new voltage signal. In some cases, a new measurement (e.g., a temperature measurement) can be taken each time a new voltage is determined, or measurements can be taken less frequently. The process of FIG. 6 can be performed for more than one electrode, such as for independently driving the four electrodes 22*a-d* of FIGS. 2A-2B or the four electrodes 417*a-d* of FIG. 4A.

Block 617 can loop back to block 607, and the voltage signal can be generated with the corrected value. The feedback loop can repeat in order to keep the focus on the focus target, even when factors such as temperature, acceleration, orientation, etc. change. The feedback loop can continue until a new focus target is received.

In some embodiments, the initial value for the voltage signal (block 6050 and/or the corrected value for the voltage signal (block 617) can initially be overdriven for a short period to cause the lens to more quickly move toward the desired shape and/or position before settling on the actual corrected value.

Testing Results

Figure 7:
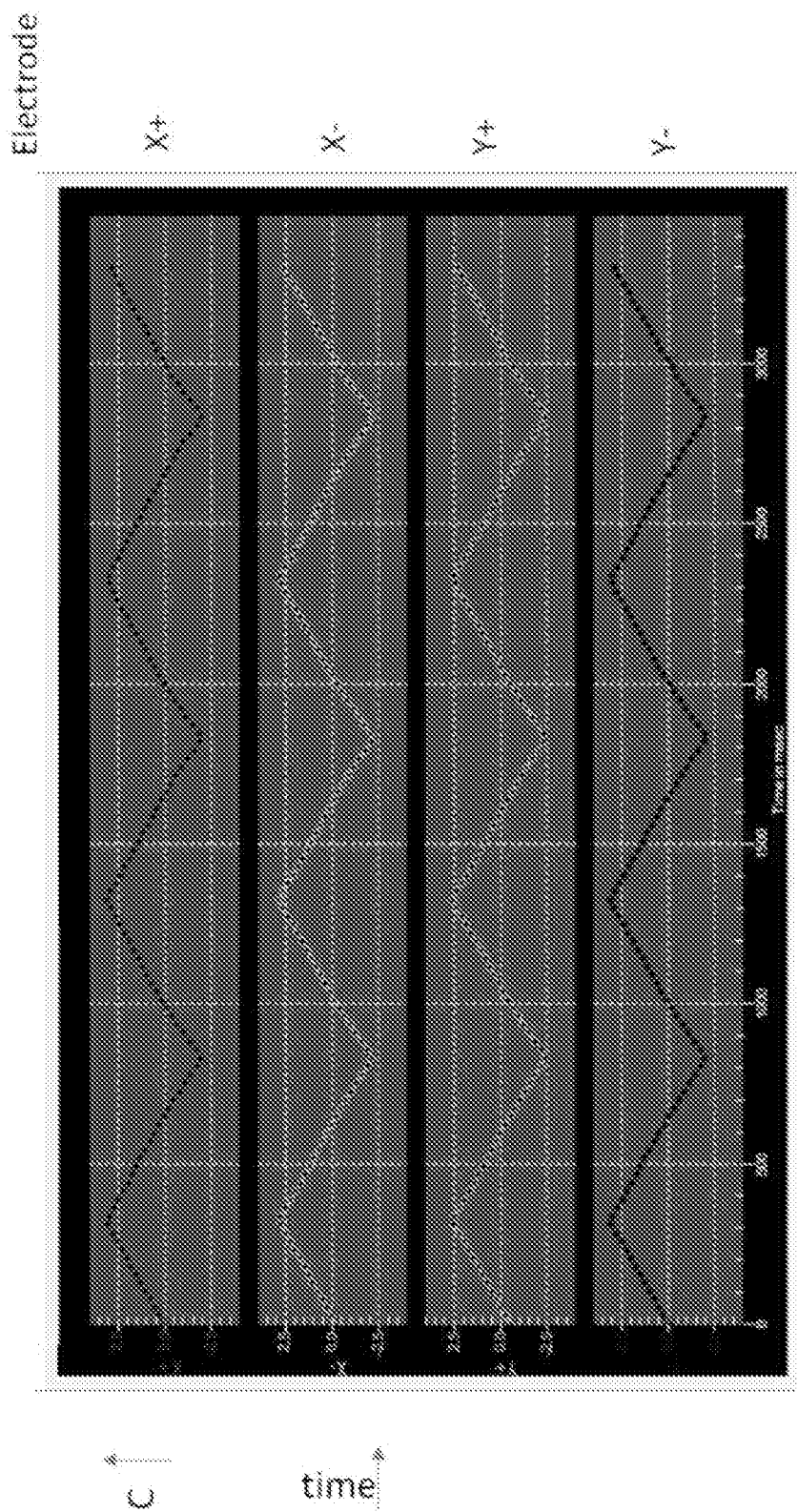
FIG. 7 shows a graph of voltage measurements from charge sensors coupled to a liquid lens.

FIG. 7 shows a graph of voltage measurements from charge sensors coupled to a liquid lens. The results of FIG. 7 were taken using the system of FIG. 4A. Each charge sensor is coupled to one of four electrodes (X+, X−, Y+, Y−) of a liquid lens such that the voltage output from the charge sensor is indicative of a capacitance of an effective capacitor formed between the electrode and a fluid of the liquid lens, which indicates a position of the fluid interface of the liquid lens at the electrode. In FIG. 7, the output voltage is taken from an ADC and plotted as an offset from a reference of 0V. In FIG. 7, the four electrodes of the liquid lens were provide with input voltages ramping between 24V RMS and 67V RMS at 1 Hz, and the four electrodes were driven in phase with each other. The output voltage from the ADC reflects the position of the lens changing with the voltage ramp at 1 Hz. The output voltages deviated by about +/−2.5V from the reference value of 0V, reflecting capacitances between the electrodes and the fluid of the liquid lens from about 10 pF to about 60 pF. The output voltages associated with the four electrodes are in phase with each other in FIG. 7.

Figure 8:
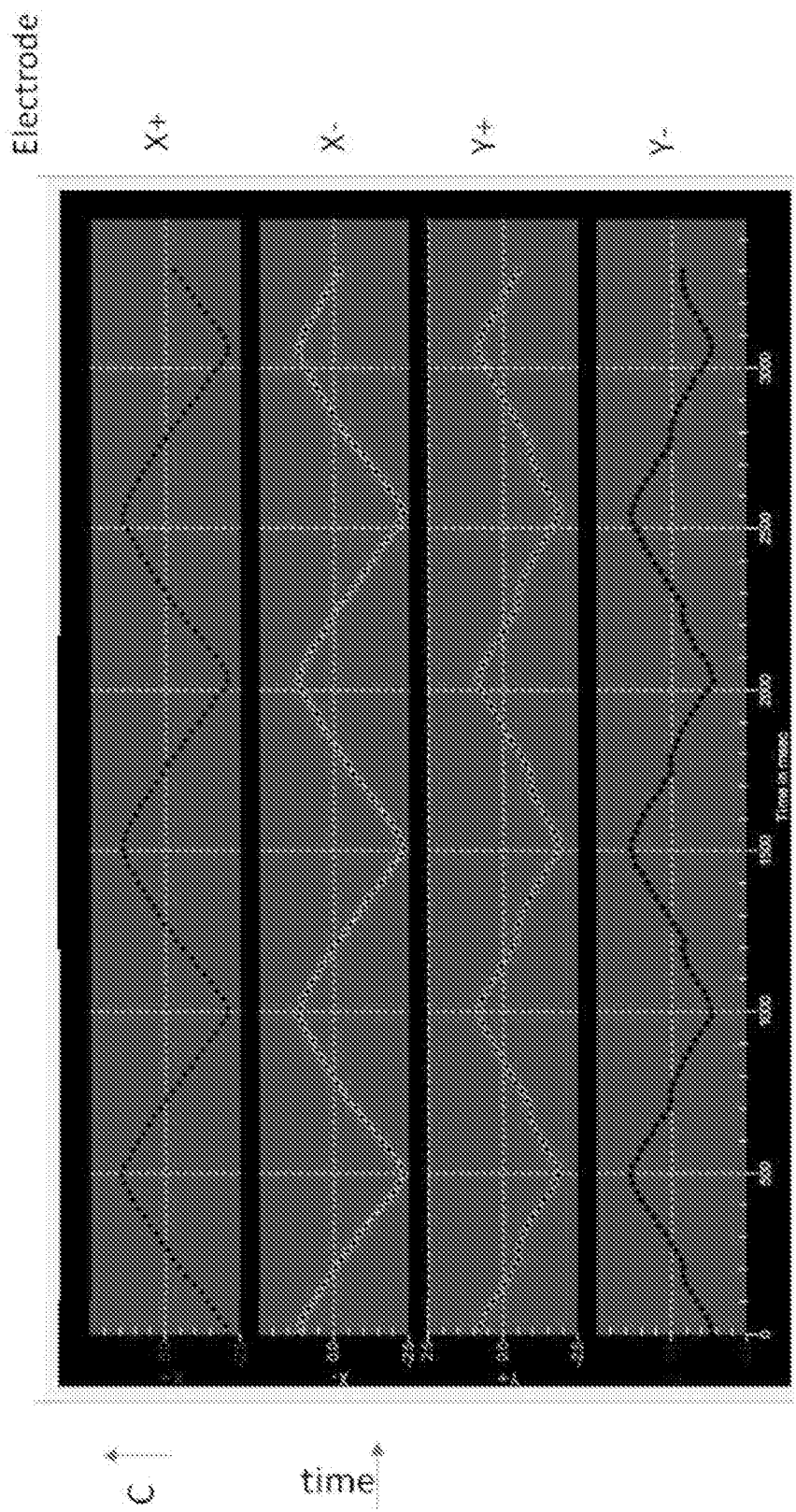
FIG. 8 shows another graph of voltage measurements from charge sensors coupled to a liquid lens.

FIG. 8 shows a graph of voltage measurements from charge sensors coupled to a liquid lens. The results of FIG. 7 were taken using the system of FIG. 4A. In the example of FIG. 8, a target focal length for the liquid lens was fixed to a constant value. The electrodes were driven to induce tilt sweep for the fluid interface at +/−1.2° at 1 Hz by driving the X− and Y+ electrodes in phase with each other, and the X+ and Y− electrodes in phase with each other, but the X− and Y+ electrodes out of phase with the X+ and Y− electrodes. The output voltages from the ADCs for the X− and Y+ electrodes were in phase with each other, and the output voltages from the ADCs for the X+ and Y− electrodes were in phase with each other, and the output voltages for the X− and Y+ electrodes were out of phase with the X+ and Y− electrodes.

Figure 9:
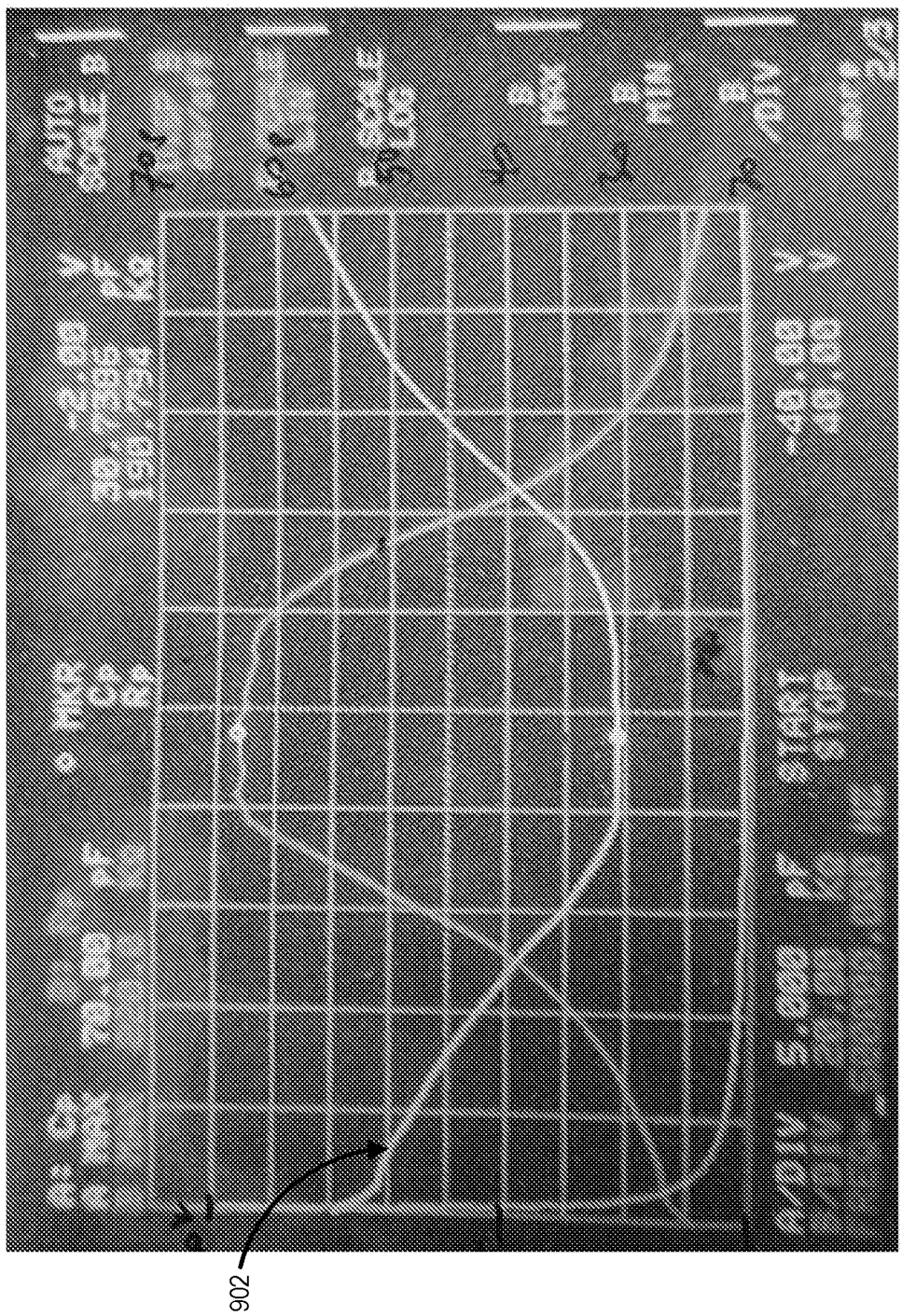
FIG. 9 shows a graph of an example relationship of measured capacitance and an input DC voltage used to drive a liquid lens.

FIG. 9 shows an example graph of a relationship of the measured capacitance and an input DC voltage used to drive a liquid lens. The y-axis indicates a measured capacitance of the capacitor that is effectively formed between an electrode and a part of a liquid lens (e.g., the conductive fluid). The x-axis indicates relative DC voltages applied to the electrode. As the voltage ranges from −40V to 0V to +40V, the measured capacitance values follow a plot having the shape of curve 902 of FIG. 9. Such a relationship can be used in order to determine what voltages to apply in order to achieve which capacitances indicative of shapes and/or positions of the lens. Voltage adjustments within a first range near 0V have a very small effect on the measured capacitance. Similar adjustments at higher voltages away from 0V may cause a greater change in the measured capacitance.

Calibration

Liquid lenses can be calibrated after they are manufactured. Some properties (e.g., sizes) of manufactured components may vary within a tolerance range. For example the thickness of an insulating layer (e.g., parylene) can vary from a target thickness due to manufacturing tolerances. These variations may affect the capacitance between the electrodes and the first fluid of the liquid lens during operation and can affect an optical power of the liquid lens. For example, two liquid lenses that have slightly different thicknesses of insulating layers (e.g., parylene layers) can have different fluid interface positions—and therefore different focal lengths—even when the same voltage is applied to both liquid lenses. Calibration of the liquid lenses can account for the effects of such manufacturing variations so that desired optical power or focal length can be achieved despite differently sized components.

Some calibration techniques use analysis of images produced using the liquid lens to calibrate the liquid lens. One such example method for calibrating a camera with a liquid lens includes positioning the camera at a reference distance away from a target. The target can include, for example, fine lines, contrasted colors, and other visual indicators that can be analyzed in a resulting image of the target to evaluate the camera focus. Automated image processing can be used to evaluate the focus of the camera. For example, when the camera is properly focused on the target, well defined contrasts between portions of the target can be identified in the resulting image of the target. One or more settings of the camera (e.g., voltage applied to the liquid lens) can be adjusted until the image comes into focus. In some embodiments, this process can be repeated with imaging the target at a plurality of different distances in order to calibrate the liquid lens at different distances.

Figure 10A:
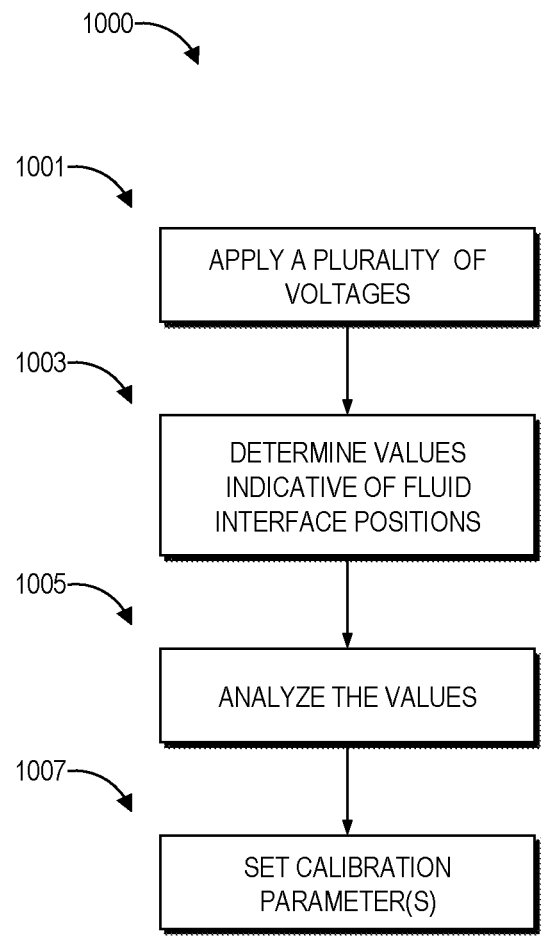
FIG. 10A shows a flowchart of an example method for calibrating a liquid lens.

Some calibration techniques disclosed herein can calibrate the liquid lens using an electrical control system (e.g., without imaging a target and/or without performing image processing). In some embodiments, the liquid lens can be calibrated independent of the camera module that may be eventually used with the liquid lens. FIG. 10A shows a block diagram of an example method 1000 for calibrating a liquid lens. The method 1000 can include setting one or more calibration parameters based on electrical tests. These electrical tests can be based on an analysis of the determined capacitance that indicates the shape and/or position of the fluid interface in the liquid lens as a function of voltage, as discussed herein. In some embodiments, these electrical tests can be more easily automated and can be performed faster than tests based on image analysis.

At block 1001 a plurality of voltages can be applied to the liquid lens, such as to produce voltage differentials between electrodes of the liquid lens. The liquid lens can be the same as, or similar to, the liquid lenses of FIGS. 1A, 1B, 2A, 2B, 4A, and 4B, disclosed herein. In some embodiments, the liquid lens can include multiple electrodes (e.g., electrodes 22*a-d* of FIG. 2A), which can correspond to multiple areas on the liquid lens. The same voltages can be applied to each of the multiple electrodes (e.g., electrodes 22*a-d* or 417*a-d*) during calibration. The voltage applied to the liquid lens can be a direct current (DC) voltage or an alternating current (AC) root mean square (RMS) voltage (e.g., using pulse width modulation (PWM), as discussed herein. In some embodiments, a range of voltages can be swept across the liquid lens. The range can include, for example, −40V to +40V, 0V to 45V, 10V to 75V, etc. In some embodiments, the voltages can be swept from high voltage to low voltage (e.g., scaled from 75V down to 10V) or from low voltage to high voltage (e.g., scaled from 10V up to 75V) or otherwise varied. The voltage can be continuously varied across a range, or the voltage can be incrementally increased across the range. In some embodiments, a voltage can be changed until an analysis property is determined. In some embodiments, the voltage can begin increasing and can stop in response to a determination that a capacitance response has reached a saturation point. At least some of the applied voltages can cause the focal length of the liquid lens to change (e.g., by driving the position of the fluid interface).

At block 1003, values indicative of the fluid interface positions at a plurality of voltages are determined. For example, an indication of an amount of charge on the liquid lens electrode can be measured or monitored, as discussed herein. In some embodiments, a lens sensor can output a voltage value that is indicative of a capacitance between a fluid and an electrode in the liquid lens, as discussed herein (e.g., in connection with FIGS. 4A-4B). The values indicative of the fluid interface positions can be determined, for example, using the systems shown in FIG. 4A and/or FIG. 4B.

At block 1005, analysis can be performed on the values indicative of the fluid interface positions. This analysis can include any combination of: determining a slope, determining a transition voltage value, determining a substantially linear region, and/or determining a saturation voltage value. These analysis properties are discussed further herein with respect to FIG. 11A-11B.

At block 1007, one or more calibration parameters can be set. The calibration parameters can be determined based at least in part on the analysis in block 1005. The calibration parameters can be determined based at least in part on the plurality of voltages applied at block 1001 and/or the values determined at block 1003 (e.g., block 1005 can be omitted). In some embodiments, setting the one or more calibration parameters can include populating a lookup table (e.g., of voltages to apply to the liquid lens in order to cause the liquid lens to provide target focal lengths). For example, the lookup table can be populated such that the voltage value associated with a transition point (e.g., as discussed herein) corresponds to a first diopter value or first focus length (e.g., a minimum diopter value or a zero diopter value). In some embodiments, setting a calibration parameter can include setting an offset voltage to be added or subtracted from an uncalibrated voltage amount. Setting one or more calibration parameters can include altering one or more control algorithms for controlling the focus of the lens, or setting a formula (e.g., that maps requested focal lengths to driving voltages for the liquid lens). Then, during operation, when the liquid lens is requested to provide a designated focal length (e.g., by a camera module), the formula can be applied to determine a voltage to drive the liquid lens at to achieve the designated focal length. In some embodiments, a lookup table can operate more quickly than applying an algorithm to determine driving voltages of the liquid lens. In some embodiments, the one or more calibration parameters can include a starting and/or ending point of an operational range (e.g., operational voltage range) for the liquid lens. The one or more calibration parameters can be set in order to account for manufacturing variations that affect the focal length of the liquid lens. In some embodiments, a gain and/or an offset can be set based at least in part on the determined values indicative of capacitance at a transition point and/or a saturation point and or a determined slope, as discussed in connection with FIGS. 11A-11B. In some embodiments, a slope determined using the values indicative of the fluid interface (e.g., based on capacitance response) can be used to determine which voltages will cause which focal lengths to result for the liquid lens being calibrated.

Figure 10B:
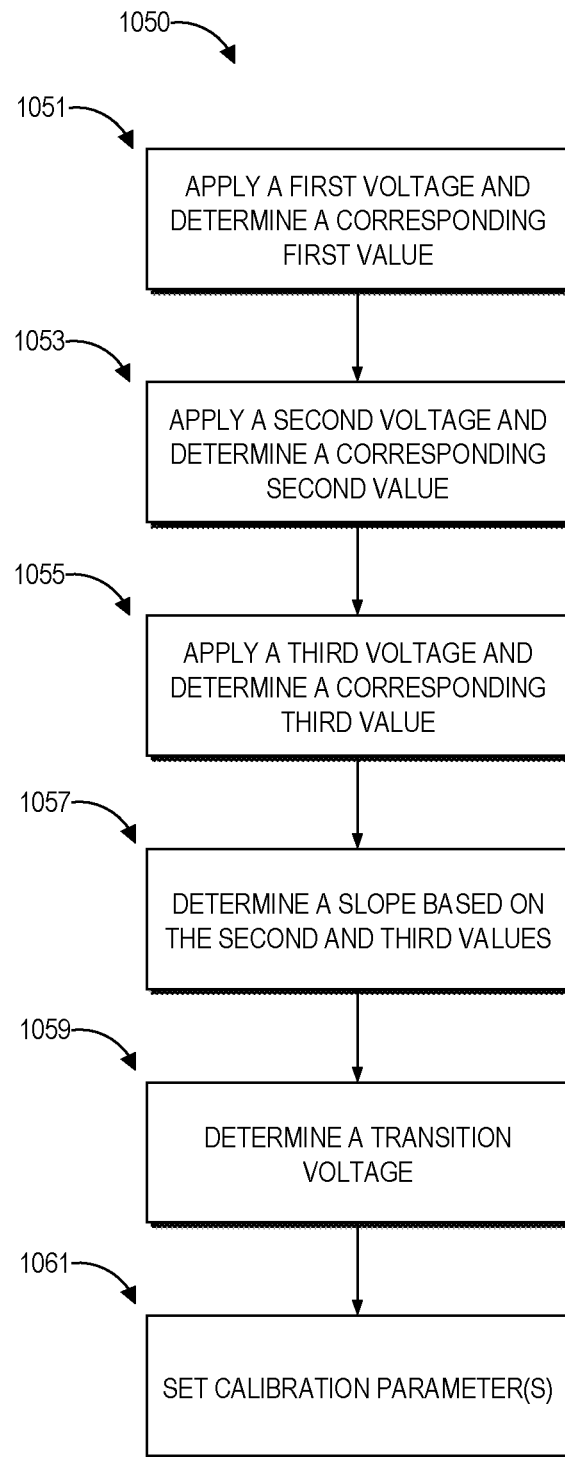
FIG. 10B shows a flowchart of another example method for calibrating a liquid lens.
Figure 11A:
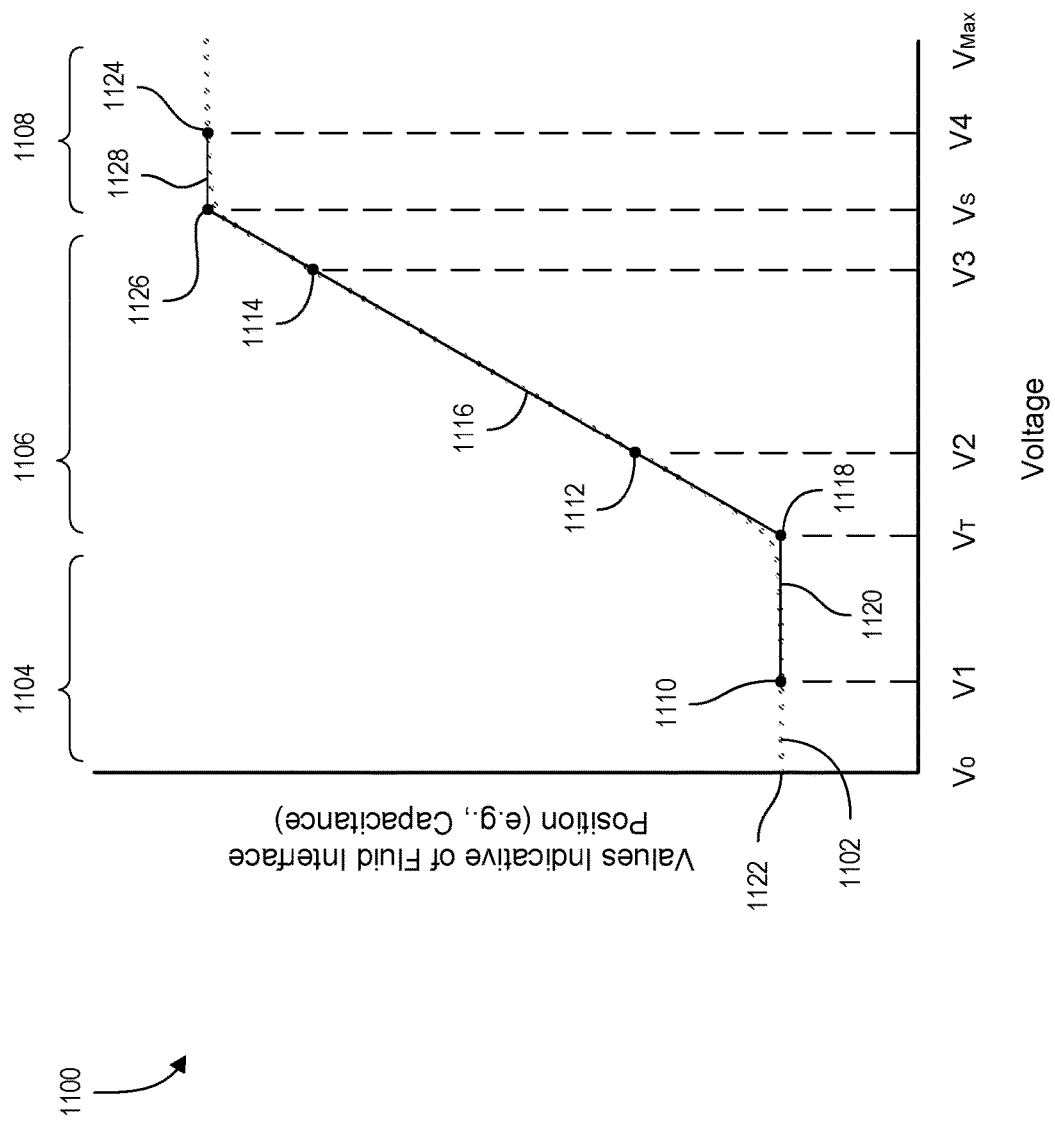
FIG. 11A shows an example graph showing values indicative of the fluid interface position in a liquid lens (Y-axis) at various applied voltages (X-axis).

FIG. 10B shows a flowchart of an example method 1050 for calibrating a liquid lens. Reference will be made to FIG. 11A, which shows an example graph 1100 showing values indicative of the fluid interface position in a liquid lens (Y-axis) at various applied voltages (X-axis). The Y-axis values can be voltages output from a lens sensor, where the output voltages are indicative of the capacitance between the electrode and fluid in the liquid lens, as discussed herein. Curve 1102 shows an example set of values indicative of the fluid interface (e.g., based on determined capacitance) when the voltage is swept from $V_0$ to $V_{Max}$. The curve 1102 is shown in a dotted line. In some instances, the voltage can be incremented by discrete voltage intervals (e.g., similar to the dots used to illustrate curve 1102). In some instances, the voltage can be varied continuously across the range. In a first region 1104, the curve 1102 is generally flat. Varying the voltage applied to the liquid lens in region 1104 does not substantially change the determined capacitance on the liquid lens. In a second region 1106, the curve is generally linear. Varying the voltage applied to the liquid lens in region 110 causes a generally linear response in the position of the fluid interface (e.g., and a corresponding generally linear response in the determined capacitance on the liquid lens). In a third region 1108, the curve 1102 is generally flat. Varying the voltage applied to the liquid lens in region 1104 does not substantially change the determined capacitance on the liquid lens (e.g., because the effective capacitor formed by the electrode and fluid is substantially saturated). Applying more voltage in region 1108 does not substantially move the fluid interface in the liquid lens, because it has reached a saturation limit. The transition from the first region 1104 to the second region 1106 can correspond to a resting position of the fluid interface of the liquid lens. In some embodiments, the transition from the first region 1104 to the second region 1106 can correspond to a state of the liquid lens having no optical power (e.g., a zero diopter state), and the optical power can increase linearly as more voltage is applied across the second region 1106. Then a maximum optical power can be reached at the transition between the second region 1106 and the third region 1108.

With reference to FIGS. 10B and 11A, at block 1051, a first voltage V1 can be applied to the liquid lens (e.g., in the first region 1104), and a corresponding first value can be determined, which can be indicated by point 1110 in FIG. 11A. At block 1053, a second voltage V2 can be applied to the liquid lens (e.g., in the second region 1106), and a corresponding second value can be determined, which can be indicated by point 1112 in FIG. 11A. At block 1055, a third voltage V3 can be applied to the liquid lens (e.g., in the second region 1106), and a corresponding third value can be determined, which can be indicated by point 1114 in FIG. 11A. At block 1157, a slope can be determined based on the second and third values, and the slope can be represented in FIG. 11A by line 1116.

At block 1159, a transition voltage $V_T$ can be determined. The transition voltage $V_T$ can be the voltage at the transition between the first region 1104 and the second region 1106. For example, a transition point 1118 can be determined based on the determined slope and the first value. The transition point 1118 can be located at the intersection between the line 1116 having the determined slope and a horizontal line 1120 that passes through the first value. The voltage that corresponds to the transition point 1118 can be determined to be the transition voltage $V_T$. Calculations can be performed to determine the transition voltage $V_T$ without actually plotting the transition point 1118. For example, mathematical equations can be used to represent lines 1116 and 1120, and the voltage value for the intersection can be calculated. In some embodiments, the transition voltage $V_T$ can be determined by sweeping the voltage across at least part of the range and monitoring the values to identify the location where the transition between the generally flat first region 1104 and the generally linear inclined second region 1106. For example, starting at $V_0$, the voltage can be ramped up, and a number of values for voltages in the first region 1104 can establish a floor value 1122. The transition voltage $V_T$ can be determined to be the voltage that produces a corresponding value that is above the floor value 1122 by a threshold amount. In some embodiments, additional values for additional nearby voltages can be used to confirm that the value that is above the threshold is not a result of noise or error. Various other methods of determining the transition voltage $V_T$ can be used.

At block 1061, one or more calibration parameters can be set. The one or more calibration parameters can be determined based at least in part on the determined slope and/or the determined transition voltage $V_T$ or transition point 1118. For example, the determined slope can be used as a gain calibration for the liquid lens and/or the transition voltage $V_T$ can be used as an offset calibration for the liquid lens. In some embodiments, setting the one or more calibration parameters can include populating a lookup table with values, or determining a formula, or modifying an algorithm, as discuss herein. The transition voltage $V_T$ can be set in the lookup table as the minimum voltage for driving the liquid lens, or can be used to determine a minimum driving voltage for the liquid lens.

In some embodiments, additional values can be determined for additional applied voltages to determine or confirm that the voltages and values used in the calibration are in the expected regions. The slope can be determined based on 3 or more points, rather than 2. In some embodiments, a curve fitting operation can be performed to determine a mathematical equation (e.g., a polynomial equation) that fits at least a portion of the points of curve 1102. The curve fitting operation can be beneficial for implementations where the liquid lens response in the second region 1106 is non-linear, or to better fit the transition portions at the ends of the second region 2206.

In some embodiments, a saturation voltage $V_S$ can be determined, similar to the transition voltage $V_T$. A fourth voltage V4 can be applied to the liquid lens and a corresponding fourth value can be determined, which can be represented by point 1124 in FIG. 11A. A saturation transition point 1126 can be determined to be at the location where the line 1116 having the slope intersects a horizontal line 1128 that extends through the point 1124. The saturation voltage $V_S$ can be the driving voltage value that corresponds to the saturation transition point 1126. The saturation voltage $V_S$ can be used as (or used to determine) a maximum driver voltage for driving the liquid lens.

Figure 11B:
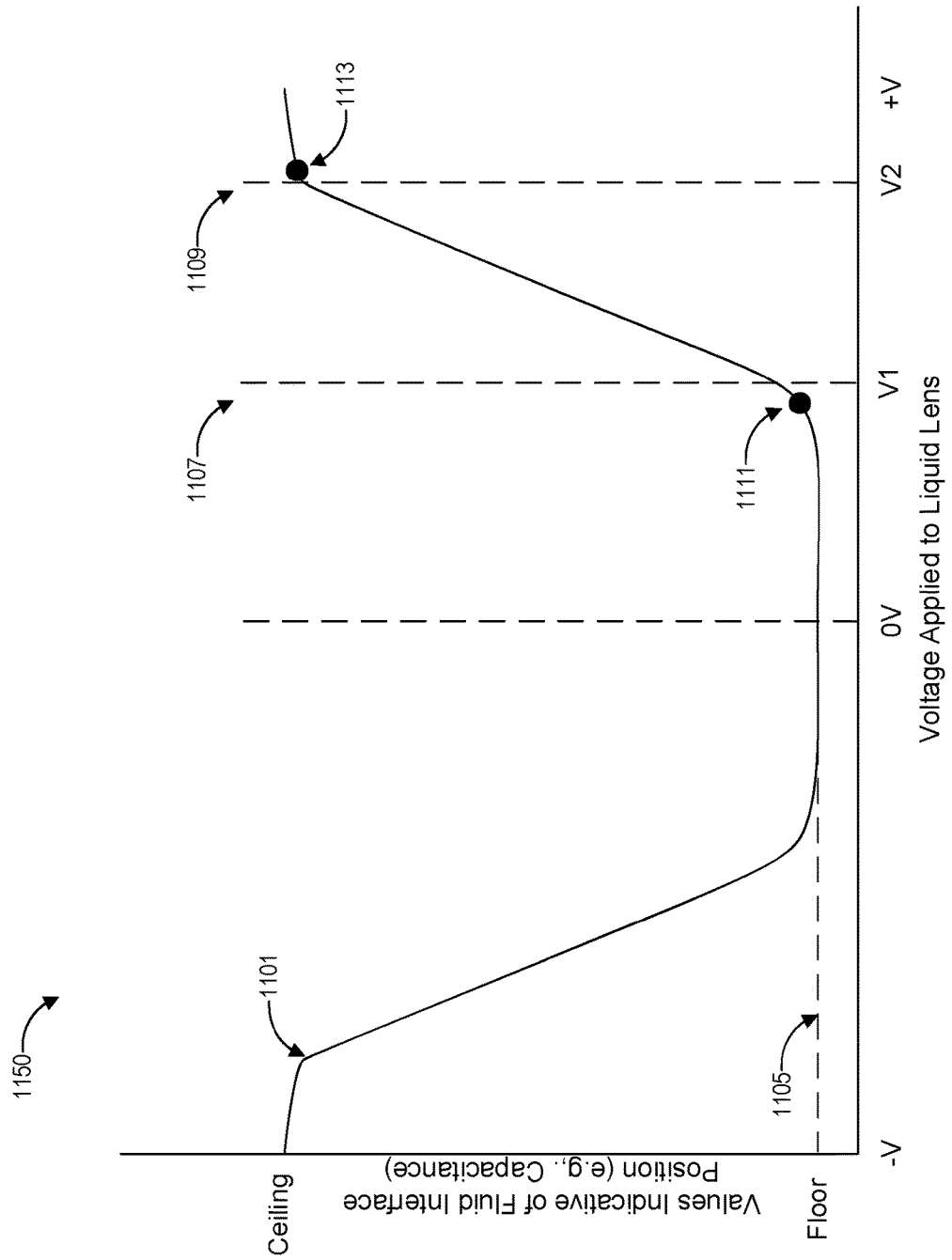
FIG. 11B shows an example graph of values that indicate positions of the fluid interface (e.g., using determined capacitance) as a response to an input voltage used to drive a liquid lens.

FIG. 11B shows an example graph of values that indicate positions of the fluid interface (e.g., using determined capacitance) as a response to an input voltage used to drive a liquid lens. The X-axis indicates a voltage that is applied, which can be a direct current (DC) voltage, for example. The Y-axis can indicate values output by a sensor that correspond to capacitance between an electrode and fluid in the liquid lens, which can be indicative of the fluid interface position. Curve 1101 shows the indications of capacitance that are determined when the voltage applied to the liquid lens ranges from a negative voltage −V to a positive voltage +V.

Variations in manufactured parts can affect one or more properties of the curve 1101 of FIG. 11B and the curve 1102 of FIG. 11A. For example, some or all of the curve can shift to the left or to the right, the slope of certain parts of the curve can change, and/or different parts of the curve can be shifted left, right, up, or down relative to other parts. By way of example, a thicker insulating layer (e.g., parylene layer) can cause the transition voltage $V_T$ to increase, such that additional voltage is needed to drive the liquid lens. A thicker insulating layer can shift the second region 1106 or the entire curve 1102 to the right. The features discussed in connection with FIG. 11A can generally apply to FIG. 11B as well. In some embodiments, a liquid lens can be driven with positive voltage or with negative voltage, and calibrations can be performed for both positive voltages and for negative voltages.

Dotted line 1105 indicates the floor or minimum indication of capacitance. In the embodiment of FIG. 11B, the floor indication of capacitance can occur across a range of voltages near the 0V point. In the example embodiment, the midpoint of the floor region happens to coincide with the zero voltage location. However, in other embodiments, manufacturing variations can cause the midpoint of the floor region to occur at locations other than at zero volts. Accordingly, the floor can be used in order to determine calibration values. Similar principles can be applied to the ceiling (e.g., to determine a maximum driver voltage, as discussed herein). In some embodiments, a camera user interface can display an indication to a user when a requested focal length is beyond the maximum optical power provided by the liquid lens. The camera can use the maximum driver voltage value to avoid wasting electrical power, which could occur if the driver were to try to drive the liquid lens with voltages higher than the maximum driver voltage. Also, the control resolution can be better allocated to the usable voltage range if the maximum driver voltage is known, as discussed herein.

In FIG. 11B, dotted lines 1107 and 1109 indicate a range of voltages (V1 to V2) across which the curve 1101 behaves substantially linearly. In some embodiments, these values V1 and V2 can be used in order to set minimum and maximum operational ranges for adjusting the lens. There can be advantages to designing control systems to operate in the linear region, especially for ease of implementation. In some embodiments, V1 can be associated with a first indication of capacitance and/or a first focal length, and V2 can be associated with a second indication of capacitance and/or a second focal length. These measurements can be used in order to calibrate one or more controllers, lookup tables, offset amounts, or other calibration values. Manufacturing variations (e.g., differences in the thickness of the parylene layer) can cause the linear region to shift left or right.

The linear region of curve 1101 has a slope. In some cases, manufacturing variations can affect the slope. The slope value represents how the focal length changes in response to a change in voltage. Accordingly, one or more calibration values (e.g., a gain) can be determined based, at least in part, on the slope of the linear region.

In some embodiments, a floor value can be determined by providing a voltage that is close to 0V and measuring the indication of capacitance. In some embodiments, the slope can be determined by providing two or more different voltages anywhere within the linear region, measuring the corresponding indications of capacitance, and determining the slope. Accordingly, the floor and slope can be determined by providing three or more different voltages.

Point 1111 indicates a transition point. The transition point 1111 can indicate where the capacitance (and corresponding focal length) begins to substantively respond to increasing voltages. In some embodiments, point 1111 can be determined, for example, when the curve 1101 goes beyond a threshold difference amount from the floor or when the curve has a slope that exceeds a threshold slope amount, or when the curve has a slope that has stabilized to identify a start of a substantially linear portion of the curve 1101.

Point 1113 indicates a saturation point. The saturation point is where the capacitance begins to asymptotically saturate, and changes in the focal length from increased voltage are asymptotically reduced. This can happen, for example, when the effective capacitor saturates. The saturation point can be determined, for example, when the slope of the line changes by a certain amount as compared to the slope of the linear region, when the slope of the line falls below a minimum slope amount, and/or when the curve 1101 falls within a minimum range of the ceiling value.

Manufacturing variations can affect the locations of the transition point 1111 and saturation point 1113. In some embodiments, the points 1111 and/or 1113 can be used to calibrate a liquid lens similarly to how the dotted lines 1107 and 1109 can be used. For example, the corresponding applied voltage values (e.g., V1 for line 1107 and V2 for line 1109) can be used to define driver voltage boundaries for the liquid lens calibration. In some embodiments, the points 1111 and 1113 can lie on the respective lines 1107 and 1109.

In some embodiments, a maximum lens curvature is determined when the capacitance of the liquid lens no longer substantially changes with increasing voltage applied to an electrode (e.g., the response asymptotically approaches a ceiling value with increasing voltage applied to the liquid lens). Accordingly, a maximum voltage to apply to achieve a maximum lens curvature can be determined based at least in part on any one or any combination of the curve at V2, point 1113, a point between the curve V2 and point 1113, and the ceiling.

Although the points in FIG. 11B are labeled for the positive side of the graph, the points can be determined and analyzed in the negative side of the graph in addition or instead of the calibration for the right side.

In some embodiments, a processor (such as microprocessor 315 and/or settings & feedback controller 303 in FIG. 3B) can cause the liquid lens to perform a calibration. The processor can initiate a calibration for example, after the liquid lens is assembled, during production testing, on demand, whenever a system that includes the liquid lens is activated (e.g., upon turning on or activating a camera system that includes the liquid lens), periodically (e.g., every few minutes, hours, days), after an amount of time of use (e.g., after a set number of hours of camera use), or at other times. For example, in some embodiments, the settings & feedback controller 303 in FIG. 3B can generate control signals that cause a differential voltage signal to sweep across a voltage range, analyze output voltages, and set calibration settings (e.g., in a lookup table, a gain, an offset) based on the analysis. In some cases, aspects of the liquid lens can change over time, such that a calibration can become outdated. For example, as the insulating layer (e.g., parylene) ages its dielectric properties can change over time, which can affect the position of the fluid interface that results from an applied voltage. Accordingly, it can be advantageous to recalibrate the liquid lens (e.g., periodically). The controller that operates the liquid lens can also be configured to calibrate the liquid lens. The recalibration can be automated without requiring input from the user.

In some embodiments, an external test device can be used to perform calibration and testing. For example, voltages supplied by an external test device supply inputs to the timing controller 305, signal generator 307, amplifier 309, and/or electrodes as shown in FIG. 3B. in some embodiments, the charge sensor 313, settings & feedback controller 303, and/or an external test device can also be used to measure and analyze the indication of capacitance. The calibration can be performed based on the analysis. In some embodiments, test devices can be coupled to any part of the system shown in FIG. 3B in order to provide inputs or read outputs. Using a calibration system to perform the liquid lens calibration that is distinct from the controller used to operate the liquid lens product can enable more simply operating controllers to be used.

Control Resolution

In some implementations, a liquid lens can be configured to operate within an operational voltage range. For example, the physical features of the liquid lens (e.g., thickness of an insulation material, such as parylene, liquid lens size, electrode materials, chamber shape, fluids used, etc.) can affect how the fluid interface responds to different applied voltages. Liquid lenses having different physical features can have different operating voltage ranges. For example, a first liquid lens may be configured such that the focal length of the liquid lens varies as the voltage is varied between operational voltage range of 10V and 50V. However, the focal length of the liquid lens does not substantially respond to voltage changes outside that operational voltage range. For example, if the voltage were raised from 50V to 60V, the fluid interface would not substantially move in response. Continuing the example, a second liquid lens can have a different configuration (e.g., a different insulating layer thickness) causes the focal length of the liquid lens to vary as the voltage is adjusted within a range of 20V to 80V, but the focal length of the second liquid lens does not substantially respond to voltage changes outside that operational range.

Liquid lenses can be used with a controller that has a defined amount of control resolution. For example, a controller can have 8 bits, 10 bits, 12 bits, 14 bits, 16 bits, etc. of control resolution. The control resolution can determine how finely the controller is able to adjust the voltage for driving the liquid lens. In some cases, a controller can be configured to apply its control resolution across a voltage range that is different than the operational voltage range of the liquid lens. Continuing the Example from above, a controller may have a range of 0V to 100V, with a control resolution of 12 bits. If this example controller were used with the first liquid lens of this example (e.g., having an operational voltage range of 10V to 50V), then the control bits allocated to adjusting the voltage between 0V and 10V and between 50V and 100 V would be wasted. The controller would have an effective control resolution that is much lower than 12 bits. If the second liquid lens of this example were used with this controller, the effective control resolution would be somewhat better than for the first liquid lens, but the control resolution that is below 20V and above 80V would be wasted such that the effective control resolution for the second liquid lens would also be lower than the 12 bits capacity of the controller.

Some embodiments disclosed herein relate to calibrating a liquid lens system such that the control resolution of the controller is more closely mapped onto the operational voltage range of the liquid lens. In some embodiments, the controller can have a plurality of operational ranges, and the controller can be calibrated to select one of the operational ranges to be used. Continuing with the example from above, a controller can have 12 bits of control resolution and four selectable operational ranges: 1) 0V to 30V; 2) 10V to 50V; 3) 25V to 75V; and 4) 20V to 100V. For the first liquid lens (e.g., having an operational voltage range of 10V to 50V), the controller range number 2 can be selected. The 12 bits of control resolution would be allocated to the voltage range of 10V to 50V. Because the liquid lens operational voltage range is the same as the selected controller range, the full 12 bits of control resolution would be usable for controlling the liquid lens.

For the second liquid lens none of the 4 selectable controller ranges of this example match the operational voltage range of 20V to 80V. Here, the controller range number 3 or number 4 can be selected for use with the second liquid lens. If controller range number 3 is selected, the 12 bits of control resolution would be allocated to the voltage range of 25V to 75V. Accordingly, the controller would not be able to use the 20V to 25V and 75V to 80V portions of the operational voltage range of the second liquid lens. But the full 12 bits of control resolution would be useable for controlling the liquid lens, although only between 25V and 75V. Alternatively, if controller range number 4 were selected for use with the second liquid lens, then the 12 bits of resolution would be allocated to the voltage range of 20V to 100V. Then the full operational voltage range of 20V to 80V could be used by the controller, but the usable control resolution would be somewhat lower than 12 bits because the control resolution allocated to 80V to 100V would not be usable. Thus, in this example, the user can select between control range 3, which would provide more precise control of the liquid lens, but across a narrower range, and control range 4, which would make use of the full range of the liquid lens but with less granularity.

In some embodiments, the controller can have a discrete number of predefined control ranges that can be selected, such as in the example above. A controller can have 2, 3, 4, 6, 8, 12, 16, 20, 30, 50, or more selectable ranges, or any value therebetween, or any ranges bounded by any combination of these values, although values outside these ranges can be used in some implementations.

In some embodiments, the control range of the controller can be specified, rather than selected. For example, a minimum voltage and a maximum voltage can be specified, and the controller can allocate its control resolution across that specified range. Using the first liquid lenses from the example above, the controller can be given a minimum voltage of 10V and a maximum voltage of 50V, and the controller would allocate its control resolution (12 bits in this example) across that range from 10V to 50V. For the second liquid lens from the example above, the controller can be given a minimum voltage of 20V and a maximum voltage of 80V, and the controller would allocate its control resolution (12 bits in this example) across that range from 20V to 80V. In some cases, the controller can be configured to accept specified voltage ranges that are within an acceptable range. For example, the controller can be configured to accept any specified voltage range that falls within the acceptable range of 0V to 100V. Accordingly, in this example, the specified ranges of 10V to 50V and 20V to 80V would be usable by the controller, but a specified range of 40V to 120V would not be usable by the controller.

In some embodiments, the specified range can compensate for manufacturing variations, such as those discussed elsewhere herein. For example, a liquid lens can be manufactured having a target insulating layer thickness of 1.7 microns. However, due to manufacturing tolerances, the actual insulating layer thickness can vary from this target thickness by different amounts for different liquid lenses. As discussed herein, the liquid lens can be calibrated to empirically determine a minimum operational voltage and a maximum operational voltage that take into account manufacturing variations, such as variations in the parylene or other insulating layer (e.g., as discussed in connection with at least FIGS. 10B and 11A). Those minimum and maximum operating voltage values can be provided to the controller to specify the controller operating range.

In some embodiments, only one of the minimum operating voltage and the maximum operating voltage can be specified, and the other is set and unchangeable in the controller. In some embodiments, the controller operating range can be dynamic. For example, if a system is configured to perform periodic calibration procedures, the operating range of the controller can be updated (such as if the dielectric constant of the insulating layer changes over time such that the minimum and/or maximum operating voltage changes for the liquid lens.

Figure 12A:
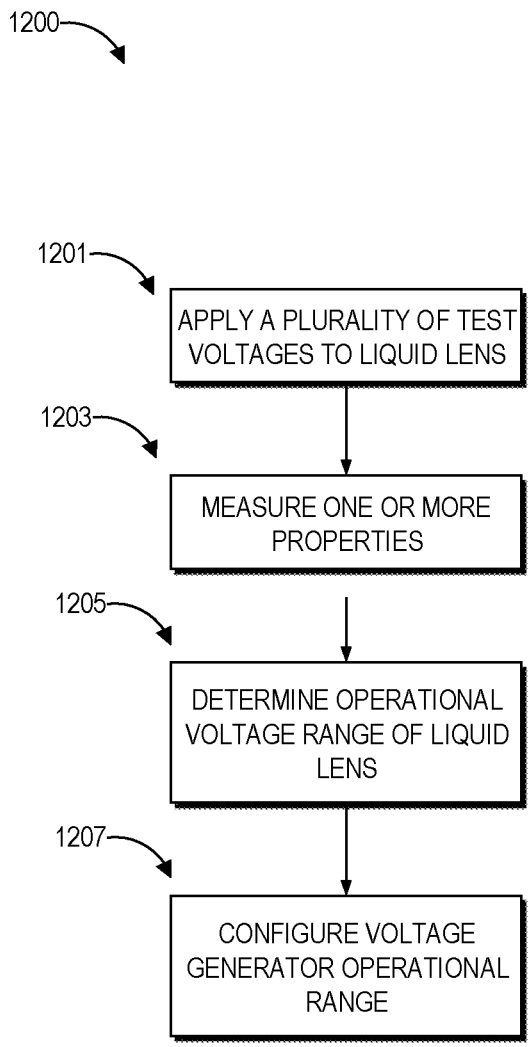
FIG. 12A shows a flowchart of an example method for calibrating a liquid lens system.

FIG. 12A shows an example method 1200 for calibrating a liquid lens system. The liquid lens can be, for example, the liquid lens shown in FIG. 1A, FIG. 1B, FIG. 2A, FIG. 2B, FIG. 4A, and/or FIG. 4B, or any other suitable liquid lens.

At block 1201, a plurality of calibration test voltages are applied to the liquid lens.

At block 1203, one or more properties of the liquid lens can be measured, the properties responsive to the calibration voltages and affected by component size variations.

At block 1205, an operational voltage range can be determined based, at least in part, on the one or more properties. The operational voltage range can range from a first voltage value to a second voltage value. In some embodiments, the first voltage value can be the transition voltage $V_T$ of FIG. 11A, the voltage V1 of FIG. 11B, the voltage associated with point 1111, and/or any transitional voltage. In some embodiments, the second voltage value can be the saturation voltage $V_S$ of FIG. 11A, the voltage V2 of FIG. 11B, the voltage associated with point 1113, and/or any transitional voltage. The voltage ranges can be different based on differences in design and/or manufacturing variances. In some embodiments, blocks 1201, 1203, and 1205 can be implemented similarly to parts of method 1000 and/or method 1050.

At block 1207, a voltage generator can be configured, such as to generate voltages across the operational voltage range of the liquid lens. A voltage range can be specified to a controller (e.g., the same operational voltage range that was determined for the liquid lens at block 1205). In some embodiments, one of a plurality of predefined voltage operational ranges can be selected (e.g., that best fits the operational range of the liquid lens). The voltage generator can include, for example, signal generator 307 and/or amplifier 309 as shown in FIG. 3B. In some embodiments, the timing controller 305 in FIG. 3B acts as a part of the voltage generator when the timing controller generates the phase shift control signal to the signal generator. In some embodiments, a voltage generator receives an input signal (e.g., of different bits) and generates different (nonzero) voltage outputs based on different input signals (e.g., different permutations of the bits). In some embodiments, the voltage generator and/or lookup table can be configured to select from among a plurality of preset calibration profiles.

In some implementations of block 1207, the voltage generator provides a set range of outputs in response to a set range of control signals. A controller (e.g., microprocessor 315 in FIG. 3B) provides the range of control signals to the voltage generator that will cause the voltage generator to generate voltages within the operational range. The controller can limit the range of the control signals to those signals that cause the voltage generator to generate voltages within the operational range.

In some implementations of block 1207, the full control range of the signal generator is configured to correspond to the operational range. For example, the signal generator is controlled by a control signal, where the control signal has a range of control values. The signal generator is configured such that a minimum value for the control signal causes the voltage generator to generate the first voltage and a maximum value for the control signal causes the voltage generator to generate the second voltage. This can be implemented by, for example, adding an offset voltage such that one of the minimum or maximum voltage output by the voltage generator becomes the first or second voltage, and adjusting a gain of the voltage generator such that the other of the minimum or maximum voltage output becomes the other of the first or second voltage. Such implementations make more efficient use of output resolutions when the voltage generator responds to control signals of limited resolutions. Where the voltage generator generates a voltage based on a control signal limited to a control range, the full control range (e.g., a full bit resolution in digital implementations) causes the voltage generator to generate the operational range.

Figure 12B:
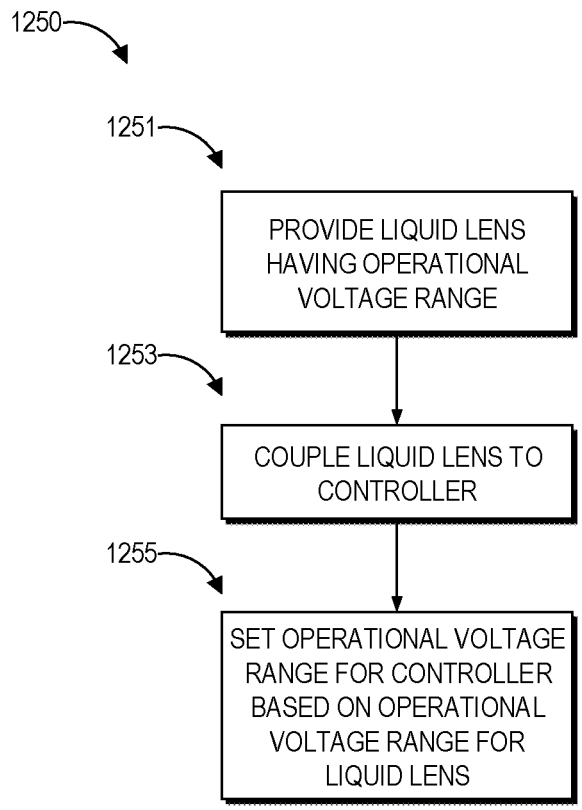
FIG. 12B shows a flowchart of another example method for calibrating a liquid lens system.

FIG. 12B shows an example method 1250 for calibrating a liquid lens system. At block 1251, a liquid lens is provided, and the liquid lens can have an operational voltage range. For example a liquid lens may be designed to have an operational range of 25V to 60V, but because of manufacturing tolerances (e.g. variations in the parylene or other insulating layer) it may have an operational range of 26V to 58V. In some embodiments, the operational voltage range can be empirically determined, as discussed herein. In some embodiments, the operational voltage range used in this method can be based on the design parameters and not take into consideration the manufacturing variations. For example, using the example above, the operational range used can be 25V to 60V.

At block 1253, the liquid lens can be coupled to a controller. The controller can include a driver, signal generator, etc. to operate the liquid lens. At block 1255, an operational voltage range for the controller can be set (e.g., selected or specified) based on the operational voltage range of the liquid lens, as discussed in the examples herein. The controller can allocate its control resolution (e.g., 8 bits, 16 bits, etc.) to the set operational range. As discussed herein, the range can be selected from a number of preset ranges, or the range can be specified (e.g., to be the same as the liquid lens voltage operational range). Accordingly, the operational voltage range for the controller can be determined based at least in part on a thickness of the insulating layer (e.g., parylene layer) in the liquid lens.

The calibration methods disclosed herein disclose methods that include applying a plurality of voltages. These voltages can be applied to an electrode in the liquid lens. In some embodiments, these voltages can be applied to a plurality of electrodes simultaneously, sequentially, or in different combinations.

The calibration methods disclosed herein can be performed by an external testing device, or a camera can be configured with built-in hardware to perform the tests. In various embodiments, calibration can be performed during production, in response to a camera powering on, or periodically after a certain amount of use (e.g., a designated number of use hours).

Calibration Examples

Figure 13A:
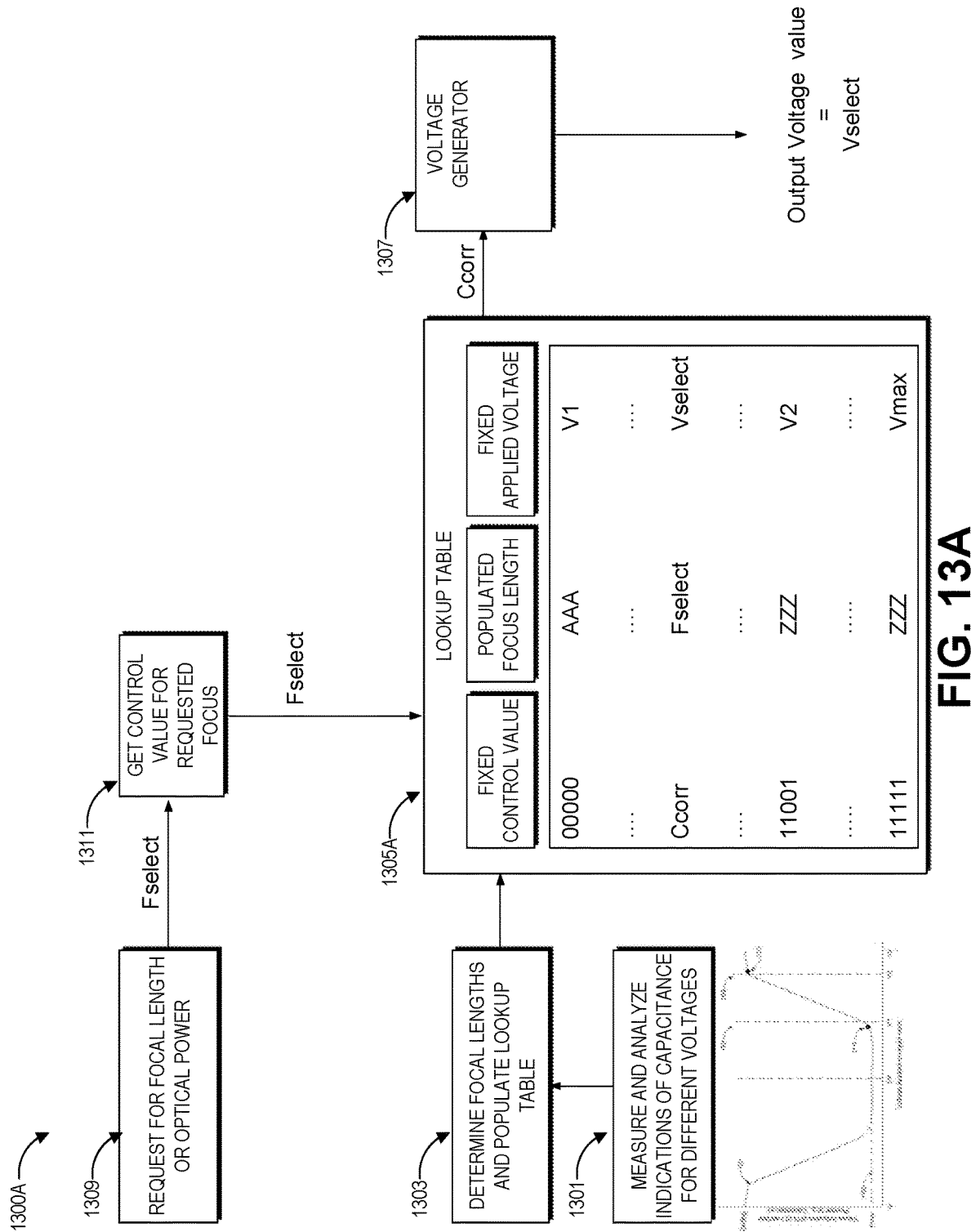
FIG. 13A shows an example system related to calibration of a variable focus lens.
Figure 13B:
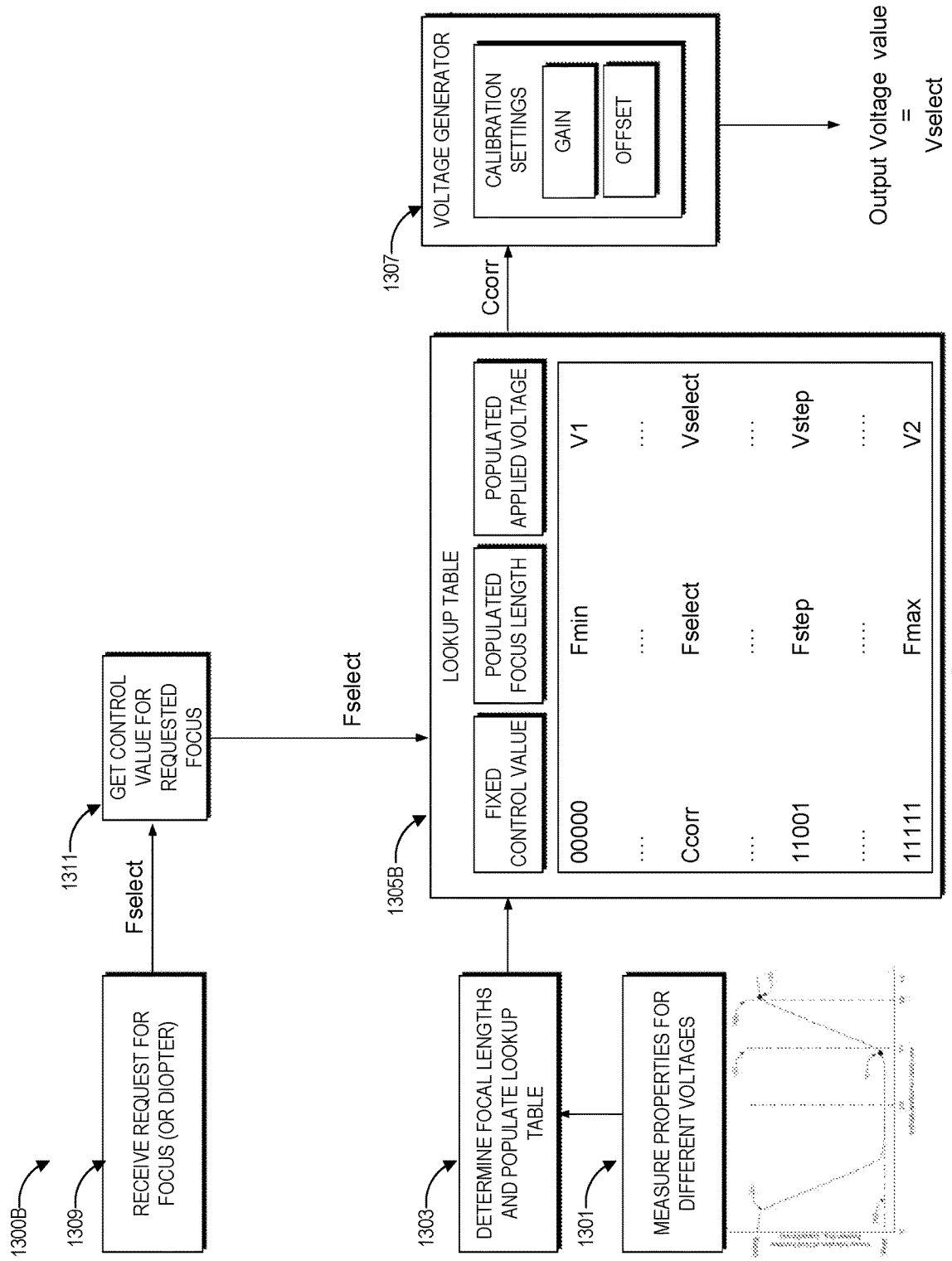
FIG. 13B shows another example system related to calibration of a variable focus lens.

Two more exemplary methods to calibrate a system with a lookup table and voltage generator are disclosed in connection with FIGS. 13A and 13B. FIG. 13A shows an example diagram 1300A of a system related to calibration. At block 1301, indications of capacitance that result from the application of different voltages are measured and analyzed. Example analysis is described with respect to FIGS. 11A-11B and FIG. 12A-12B.

At block 1303, focus lengths (in some embodiments, the focus length can be represented as a diopter value) are determined based on the analysis, and a lookup table is populated. In the example embodiment of FIG. 13A, the focus lengths are populated in lookup table 1305A. Various other types of lookup tables can be used, which can be different than the illustrated example lookup table 1305A. For example, in some embodiments, the lookup table can include a listing of optical powers and voltages that were determined during calibration to provide the optical powers listed.

Lookup table 1305A shows three corresponding values: a control value, a focus length, and an applied voltage. The control value indicates the value of a control signal that will cause a corresponding voltage to be generated by voltage generator 1307. For example, voltage generator 1307 will generate an output signal having a voltage value of V1 when provided with a control signal having value 00000, generate an output signal having a voltage value V2 when provided with a control signal having value 11001, generate an output signal having a voltage value of Vmax when provided with a control signal having value 11111, etc.

Based on the analysis of the indications of capacitance for different voltages (e.g., as described with respect to FIGS. 11A-11B and 12A-12B), the focus length of the lookup table can be populated and/or adjusted. For example, it can be determined that applying a voltage value of V1 to an electrode will cause a focus length of AAA, applying a voltage value of V2 will cause a focus length of ZZZ, and that applying even higher voltage values of Vmax will still cause focus lengths that are effectively ZZZ (for example, due to asymptote effects).

The example three column lookup table 1305A is provided to aid clarity and understanding. Some embodiments can implement lookup tables with two columns. For example, the voltage column in the lookup table can be omitted in some embodiments of the lookup table. Furthermore, the example lookup table 1305A uses a digital control signal (e.g., a digital control signal provided by settings and feedback controller 303 in FIG. 3B that are easily represented with a discrete number of bits, but other examples can use analog control signals (e.g., a phase shifted signal as discussed with respect to FIG. 3B). Furthermore, it shall be recognized that in some embodiments, the focus length can be represented as a corresponding diopter value.

At block 1309, a request for a selected focal length or optical power (e.g., Fselect) can be received. The focal length can be selected, for example, by a user through a control interface, or by a camera module based on a target being imaged, a distance signal received from a ranging device, etc. The focal length can be selected, for example, by an autofocus sensor.

At block 1311, a control value for the selected focus can be obtained by referencing the lookup table 1305A. The control function can be performed, for example, by microprocessor 315 or settings and feedback controller 303 as shown in FIG. 3.

The selected focus length Fselect can be referenced in the lookup table. The associations in the lookup table indicate that the corresponding control signal, Ccorr, will cause a voltage generator to generate the voltage Vselect and apply Vselect to an electrode, thereby causing the fluid interface of the liquid lens to bend into a shape that achieves the selected focus length.

The corresponding control signal, Ccorr, is provided to the voltage generator. In some embodiments, the control signal is generated by a microprocessor 315 such as shown in FIG. 3, for example.

It should be noted that the focus lengths in lookup table 1305A in FIG. 13A are populated to correspond to the voltages that cause the liquid lens to achieve each respective focus length. For example, a voltage generator may be configured to output voltages having values ranging from V1 to Vmax. However, based on the analysis at block 1301, it can be determined that the focus lengths may change substantially linearly upon application of voltages ranging from V1 to V2, and that beyond V2, the focus length is effectively saturated. Accordingly, any control values from 11011 to 11111 will cause the same or substantially similar focus length of ZZZ. This configuration can be easier to program. However, the full 5-bit resolution of the example voltage generator is not fully used.

FIG. 13B shows an example diagram 1300B of a system related to calibration. Blocks 1301, 1309, and 1311 are similar to those shown in FIG. 13A. In FIG. 13B, block 1303 causes lookup table 1305B to be populated differently and causes voltage generator 1307 to be configured differently. The lookup table 1305B can be populated such that the applied voltages for an operational range V1 to V2 span the whole resolution of the control values. This can enable, for example, finer resolution in embodiments where voltage generators have a fixed output resolution.

Control value 00000 will cause the voltage generator to generate a lowest voltage V1, thereby causing a minimum focus length of Fmin to be set by the liquid lens. A control value of 11111 will cause the voltage generator to generate a highest voltage V2, thereby causing a maximum or near-asymptotic focus length of Fmax to be set by the liquid lens. The voltage generator will step through the entire resolution of voltage outputs at $1/(\text{total\_bits}^2)$ increments. Accordingly, improved focus resolutions can be achieved.

The example three column lookup table 1305B is provided to aid clarity. Some embodiments can implement lookup tables with two columns. For example, the control value in the lookup table is provided to aid clarity and understanding, but can be omitted in an actual memory implementation of a lookup table. Furthermore, the example uses a digital control signal that is easily represented with a discrete number of bits, but other examples can use analog control signals (e.g., a phase shifted signal as discussed with respect to FIG. 3B). Furthermore, it shall be recognized that in some embodiments, the focus length can be represented as a diopter value.

The voltage generator 1307 can be calibrated with a gain and an offset, or using other suitable calibration parameters. For example, calibrating the voltage generator can cause the minimum output voltage value to be V1 in response to control signal 00000, the maximum output voltage value to be V2 in response to control signal 11111, and output voltages between V1 and V2 based on corresponding control signals between 00000 and 11111. The entire resolution of the voltage generator can be used. The gain and the offset can be based, at least in part, on the analysis performed in block 1303 and/or the settings in the lookup table 1305B.

In some embodiments, the gain of the voltage generator can be calibrated based at least in part on the slope of the linear region. In some embodiments, one or more offsets of the voltage generator can be calibrated based on a floor indication of capacitance. In some embodiments, the minimum and maximum voltage values V1 and V2 can be based on the V1 and V2 (and/or similar transition points) shown in FIG. 11.

In some embodiments, the gain can be configured, for example, by setting a gain of an amplifier such as amplifier 309. In some embodiments, a gain can be configured by providing a different bias or supply voltage. In some embodiments, an offset can be configured using a voltage divider, a voltage adder, a variable resistor, etc.

Reduced Power Consumption

A liquid lens system can use pulse width modulation (PWM) to drive a liquid lens. For example, in the embodiment of FIG. 4A, the voltage pulses are applied to the electrodes 417a-d and to the common electrode (e.g., that can be in electrical communication with a fluid in the liquid lens). Phase delays can be introduced to modulate the pulse widths of the voltages that are applied between the common electrode and the four quadrant electrodes 417a-d, as discussed herein. Other suitable PWM techniques can be used. Various different numbers of electrodes can be used. Thus, the controller and/or signal generator can use pulse width modulation to apply different RMS voltages to the liquid lens (e.g., to control a fluid interface of the liquid lens).

In the example embodiment of FIG. 4A, a carrier frequency (e.g., a switching frequency) of 5 kHz can be used. The waveform generator 403 can produce a signal of voltage pulses that repeats 5,000 times each second. Various other suitable carrier frequencies (e.g., switching frequencies) can be used, such as in the range of 0.5 kHz to 50 kHz, 1 kHz to 20 kHz, or 2 kHz to 10 kHz, although values outside of this range can be used in some implementations. The carrier frequency can be faster than the response time of the liquid lens, for example such that the liquid lens is driven by the resulting RMS voltage rather than by the voltage pulses that are used for pulse width modulation.

In some cases, a faster carrier frequency can result in better image quality for images made using the liquid lens. The control system can use feedback control information based on the carrier frequency, as discussed herein. Therefore, the faster the carrier frequency, the more often the feedback control system will provide information that can be used to adjust the voltages to accurately position the fluid interface in the liquid lens. This can be especially useful for optical image stabilization. The voltages on the electrodes (e.g., on electrodes 22a-d) can be controlled to angle the optical axis of the fluid interface by an offset angle from a longitudinal axis 28, as discussed for example in connection with FIG. 2B. The optical image stabilization feature can operate better using a faster carrier frequency. By way of example, a carrier frequency of 10 kHz as compared to 2 kHz can provide feedback to the controller 5 times faster, allowing the 10 kHz embodiment to respond more quickly to shaking or other movement of the liquid lens. This can result in improved image quality for faster carrier frequencies, especially for imaging during shaking or other movement.

Systems that use higher carrier frequencies can consume more electrical power. For example, increasing a switching rate can result in higher power losses. One source of switching power loss is that a small amount of current can be directed to ground when a transistor switch changes states. Especially in systems where electrical power is limited (e.g., a device operating with a battery as the power supply), it can be advantageous to use lower carrier frequencies to reduce power consumption. For some mobile electronic devices, such as mobile phones and tablets, it can be especially important to conserve battery power. Thus, in some systems that include liquid lenses there can be tension between using high carrier frequencies to produce higher quality images and using lower carrier frequencies to reduce power consumption.

Some embodiments disclosed herein relate to liquid lens systems that can vary the carrier frequency that is used for PWM. For example, the system can use higher carrier frequencies when high-quality imaging is performed and/or when electrical power is plentiful (e.g., when a mobile electronic device is receiving power from an external power supply). The system can also use lower carrier frequencies when low-quality imaging is performed and/or when electrical power is scarce (e.g., when batter capacity is low or power conservation mode is enabled).

Figure 14:
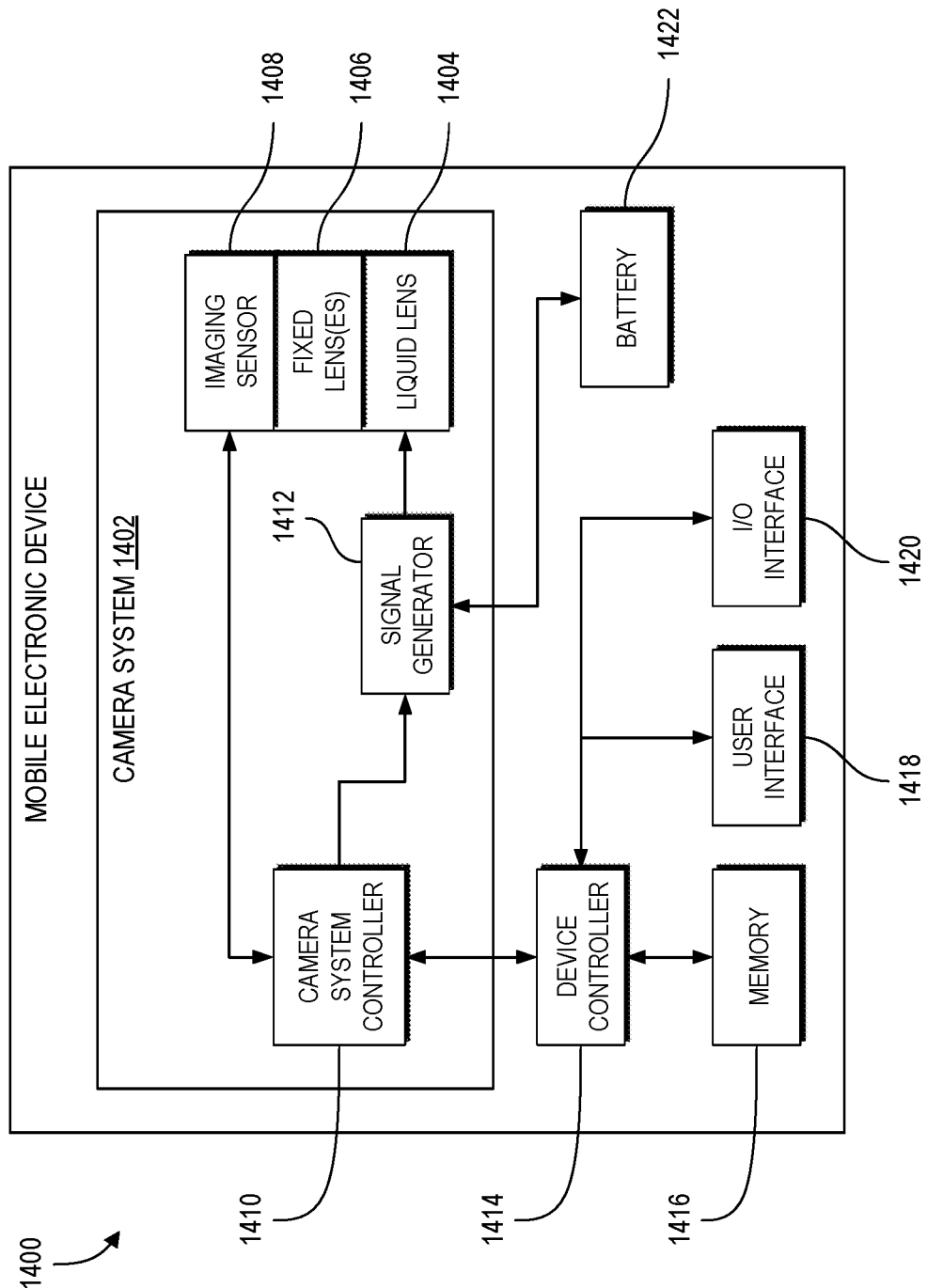
FIG. 14 is a block diagram showing an example embodiment of a mobile electronic device that incorporates a camera system having a liquid lens.

FIG. 14 is a block diagram showing an example embodiment of a mobile electronic device 1400 that incorporates a camera system 1402 having a liquid lens 1404. The mobile electronic device can be a mobile phone, a tablet computing device, a laptop computer, etc. The camera system 1402 can have a liquid lens 1404, one or more fixed lenses 1406, and an imaging sensor 1408. A camera system controller 1410 can operate the camera system 1402. For example, the controller 1410 can use a signal generator 1412 to drive the liquid lens 1404 as discussed herein. The controller 1410 can operate the imaging sensor 1408 and/or other components of the camera system to produce images. In some embodiments, the controller 1410 can have multiple controller element or multiple processors, such as a liquid lens controller element or processor and an imaging sensor controller element or processor.

The mobile electronic device 1400 can have a device controller 1414, which can be configured to operate the mobile electronic device 1400. The device controller can communicate with the camera system controller 1410, such as to provide imaging requests and/or imaging parameters to the camera system controller 1410, or to receive captured images from the camera system 1402. In some embodiments, the controllers 1410 and 1414 use the same processor or multiple processors can be used. The mobile electronic device 1400 can have memory 1416, which can be used to store captured images, to store computer-executable instructions that can be executed by a processor to operate the device 1400 and to implement the methods and features disclosed herein. A user interface 1418 can be used to receive input from a user and/or to output information to the user. The user interface 1418 can include one or more of a display, a touchscreen, a button, a switch, a dial, a speaker, a microphone, a keyboard, or other user input elements configured to receive input from a user. The device 1400 can also have an input/output interface 1420 for receiving and/or outputting information from external sources. The input/output interface can include a wireless communication device (e.g., WiFi, Bluetooth, Cellular Communication, etc.) or a port for wired communication (e.g., a USB port). The mobile electronic device can include a power supply, such as a battery 1422. The battery can provide power to the mobile electronic device 1400, including the camera module 1402. The signal generator 1412 can receive electrical power from the battery 1422 for driving the liquid lens 1404. In some embodiments, the mobile electronic device 1400 can be coupled to an external power supply (not shown), which can be used to power the mobile electronic device 1400 and/or to recharge the battery 1422.

Figures 15, 16:
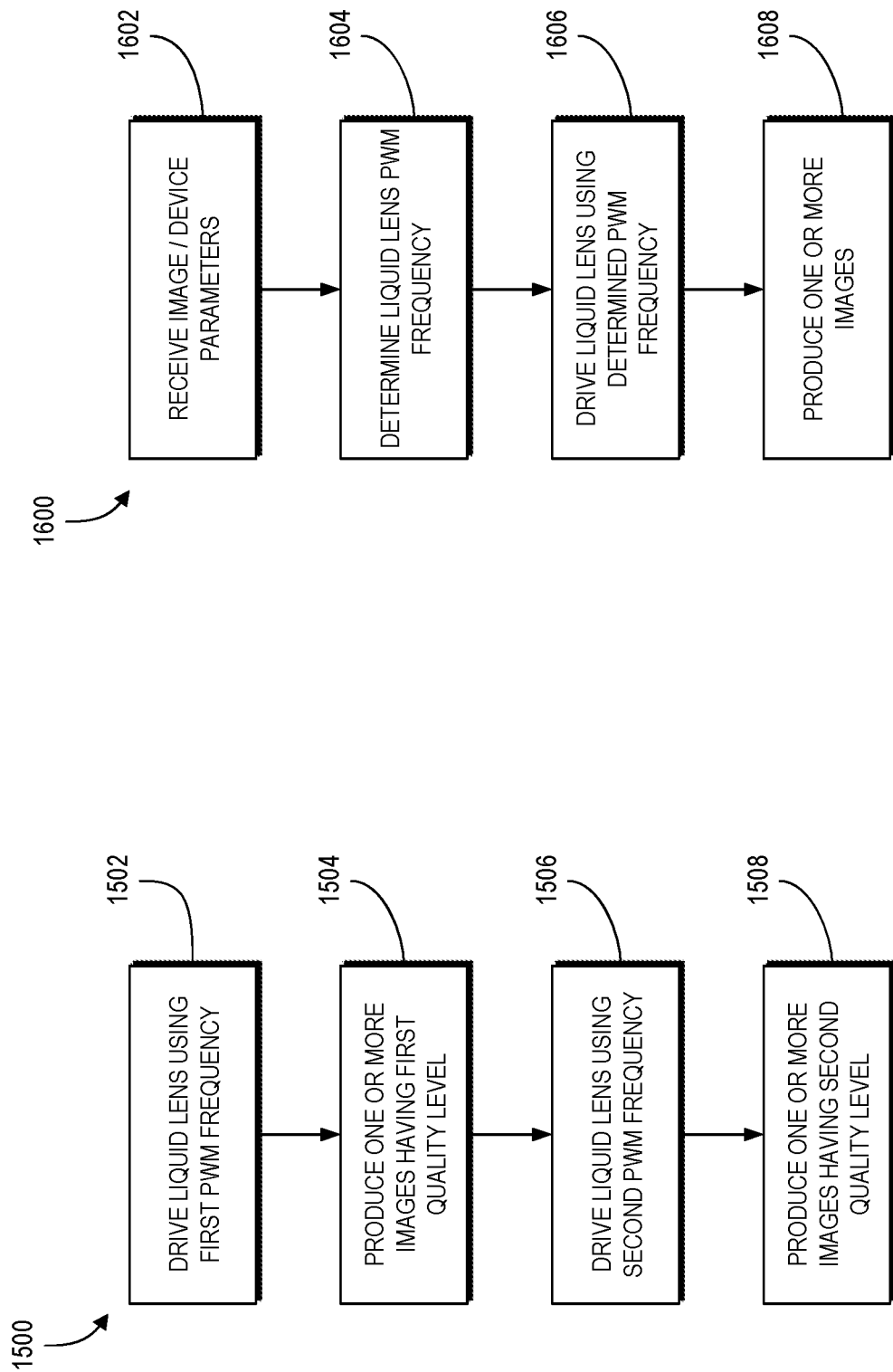
FIG. 15 is a flowchart of an example method for producing images of different quality levels.
FIG. 16 is a flowchart of an example method for producing one or more images.

FIG. 15 is an example embodiment of a method 1500 for producing images of different quality levels. At block 1502 the liquid lens is driven using a first PWM frequency (e.g., a carrier frequency or switching frequency). At block 1504, one or more images having a first quality level are produced. For example, the camera system 1410 can receive a request for one or more images of a high quality level. For example, a mobile phone can be used to take a still image at full resolution. The controller 1410 can drive the liquid lens 1404 at the first PWM frequency, which can be a relatively fast carrier frequency in order to provide the high level imaging quality. At block 1506, the liquid lens is driven at a second PWM frequency, which is different than the first PWM frequency. The second PWM frequency can be slower than the first PWM frequency. At block 1508, one or more images having a second quality level can be produced. The second quality level can be a lower quality level than the first quality level. For example, a mobile phone can be used to produces images for a video chat function. In some embodiments, the camera system 1410 can receive a request for video images. In some embodiments, the mobile phone can have a front facing camera configured to produce lower-quality images (e.g., having a lower image resolution than images from the back-facing camera). In some embodiments, the request for images can include image parameters indicating the lower quality imaging is permitted or desired (e.g., for images that are to be compressed, or streamed).

In some embodiments, a lower carrier frequency can be in the range from 0.5 kHz to 5 kHz or from 1 kHz to 3 kHz, although values outside these ranges can be used in some cases. In some embodiments, a higher carrier frequency can be in the range of from 3 kHz to 50 kHz or from 5 kHz to 15 kHz., although values outside these ranges can be used in some cases.

FIG. 16 is an example method 1600 for producing one or more images. At block 1602, the system can receive image parameters and/or device parameters associated with a request for one or more images. At block 1604, a PWM frequency (e.g., carrier frequency or switching frequency) can be determined for the liquid lens, based at least in part on the image parameters and/or the device parameters. Example image parameters and device parameters and example frequency determinations are discussed herein, at least in connection with FIG. 17. At block 1606, the system can drive the liquid lens using the determined PWM frequency, and one or more images can be produced at block 1608. The method 1600 of FIG. 16 can be performed repeatedly for many different images or groups of images, and different PWM frequencies can be determined and used for the different images or groups of images.

Figure 17:
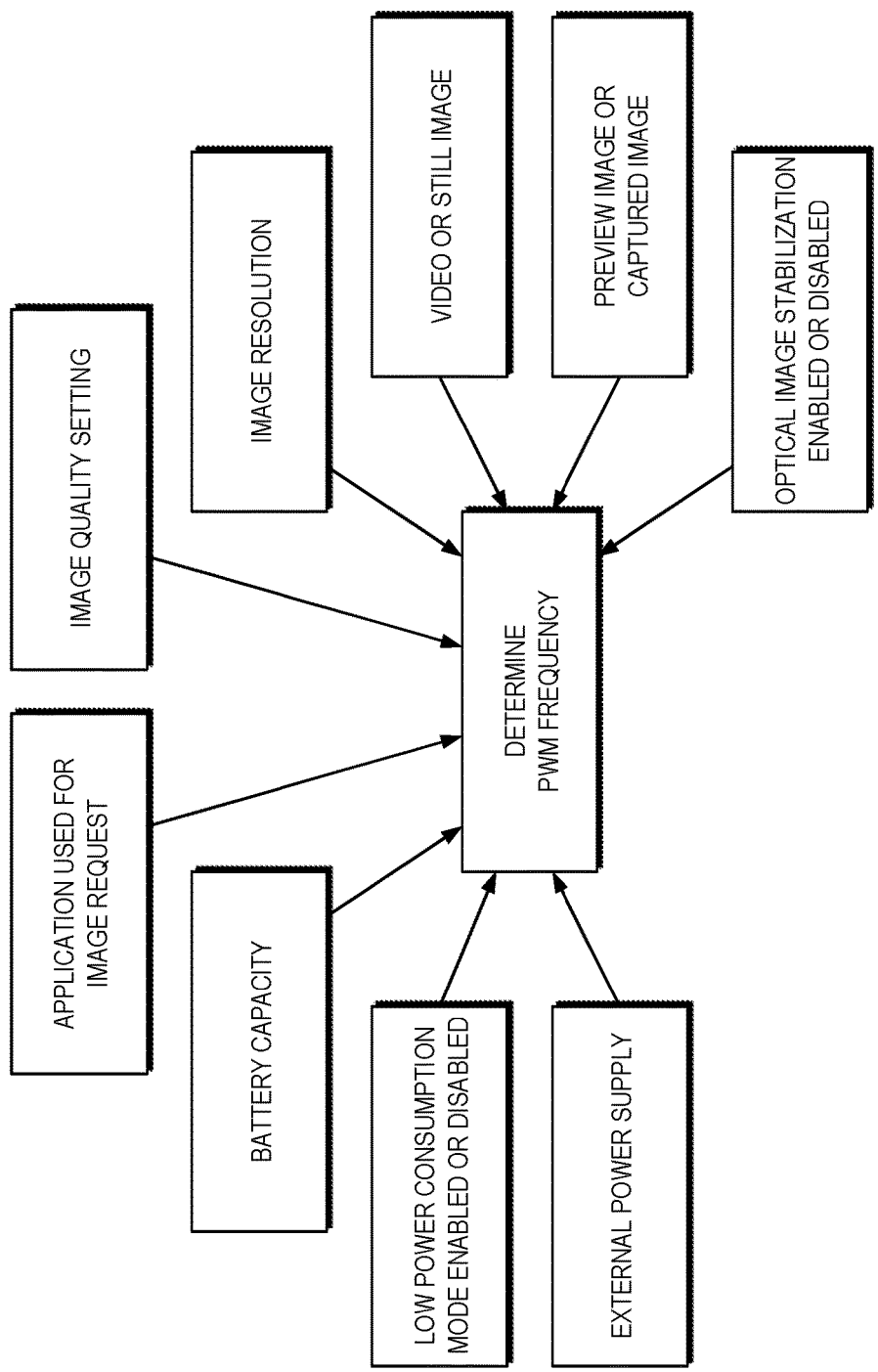
FIG. 17 shows example image parameters, device parameters, and other considerations that can be used to determine a PWM frequency, such as for a liquid lens.

FIG. 17 shows example image parameters, device parameters, and other considerations that can be used to determine a PWM frequency (e.g., a carrier frequency or switching frequency). Any combination of these factors can be used to determine a PWM frequency. The system, and make a calculation based on various inputs to determine a PWM frequency to use. In some cases, some factors may dictate a higher PWM frequency while others dictate a lower PWM frequency (e.g., capturing a high resolution image when battery capacity is low). The system can use an algorithm, formula, lookup table, or other technique to determine a PWM frequency based on one or more factors.

In some embodiments, an image quality setting can be used in determining a PWM frequency. For example, an image request can include an image parameter indicating that the image should have the highest possible image quality, or a low image quality, or some value therebetween. In some instances a lower quality image can be desirable. For example, a lower quality image can be smaller in size, which can be easier to store, to send via a limited bandwidth channel (e.g., via a text message or streaming, etc.). In some instances an image is going to be compressed, so high image quality would be lost anyway, so a lower-quality image is adequate. When a lower-quality image quality setting is designated, that can influence the system to select a lower PWM frequency, and when a higher-quality image quality setting is designated that can influence the system to select a higher PWM frequency. In some embodiments, the device controller can determine the image quality setting, e.g., based on the intended use of the image, and can deliver that setting to the camera system along with the imaging request. In some embodiments, the camera system can determine an image quality setting. In some embodiments, the user can specify an image quality setting (e.g., using a user interface on the mobile device).

In some embodiments, an image resolution can be used in determining a PWM frequency. For example, an image request can include an image resolution parameter, such as a full resolution setting, a reduced resolution setting, a pixel count size, a percentage of full resolution, etc. When a lower resolution image is being captured, a lower PWM frequency can be selected. For example, at a reduced resolution the captured image can lose some or all of the additional image quality that would result from using a higher PWM frequency. In some cases video images can use a lower image resolution than still images. Also, a single frame from of a video can have lower image quality than a captured still image. In some embodiments lower PWM frequencies can be applied for video imaging than for capturing still images. An image can be produced that has a full resolution setting, but has a low image quality setting, such as if a lossy compression is applied to the image.

In some embodiments, images can be produced to be used as a preview (e.g., to display on a display screen to assist the user in aiming the camera). The preview images are typically not stored long term in memory. In some embodiments, the preview images can have reduced resolution or reduced image quality, e.g., since they are not going to be captured for later use, and/or because they are to be displayed quickly to facilitate aiming of the camera in real time. Preview images can influence the system to apply a slower PWM frequency, whereas images that are going to be stored (e.g., for later use or viewing) can influence the system to apply a higher PWM frequency.

In some cases, optical image stabilization can be enabled or disabled for particular image requests. For example, a user can enable and disable this feature for some systems. If optical image stabilization is disabled for an image, that can influence the system to reduce the PWM frequency. In some embodiments, the system can determine whether to enable to disable optical image stabilization, such as based on an imaging type, based on information from an accelerometer (e.g., indicating the presence or absence of shaking or movement of the camera).

In some embodiments, determining the PWM frequency can be based at least in part on the application that was used to make the image request, or based on an intended use of the image. For example, an image request from a video chatting application can trigger a low PWM frequency and a still image from the camera app on a phone can trigger a higher PWM frequency.

In some embodiments, the amount of available electrical power can be used in determining the PWM frequency. If a battery is nearly depleted, or electrical power is otherwise scarce, that can influence the system to use a lower PWM frequency. If the battery capacity is near full, or electrical power is otherwise plentiful (e.g., device is receiving power from an external power source, such as a wall outlet) that can influence the system to apply a higher PWM frequency. If the device is in a lower power consumption mode that can influence the system to use a low PWM frequency.

In some embodiments, the controller 1010 and/or the signal generator 1012 can be configured to drive the liquid lens with either a high PWM frequency (e.g., 10 kHz) or a low PWM frequency (e.g., 2 kHz), and the system can select between the high and low frequencies. In some embodiments, the controller 1010 and/or the signal generator 1012 can be configured to provide various PWM frequencies across a range. For example, the system could determine a PWM frequency of 5.5 kHz for a first image, a PWM frequency of 2.6 kHz for a second image, a PWM frequency of 3.1 kHz for a third image, etc.

Figure 18A:
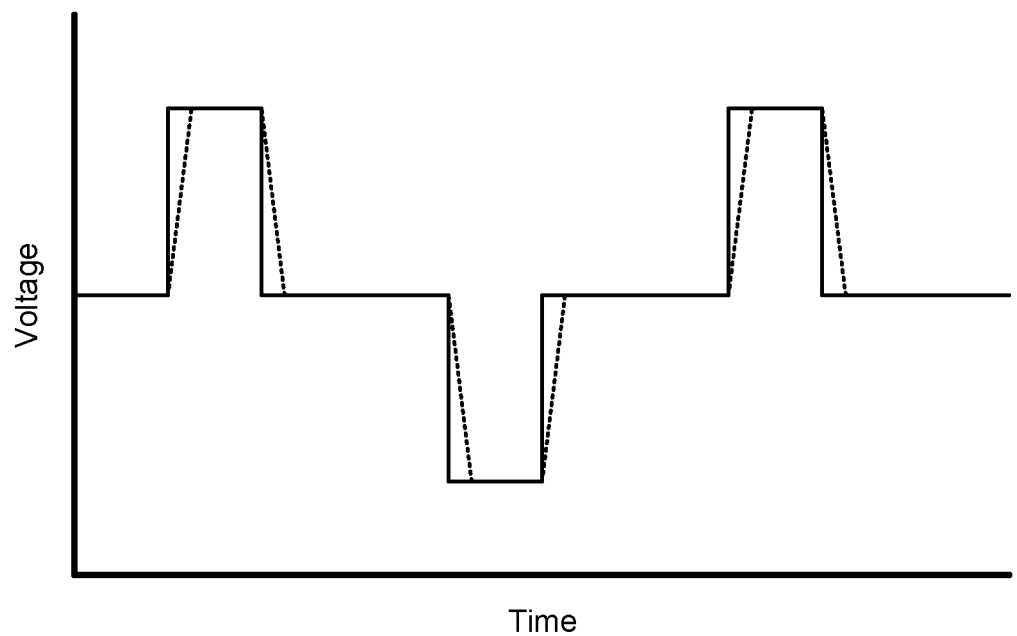
FIG. 18A shows a PWM signal having a first PWM frequency and a first slew rate.
Figure 18B:
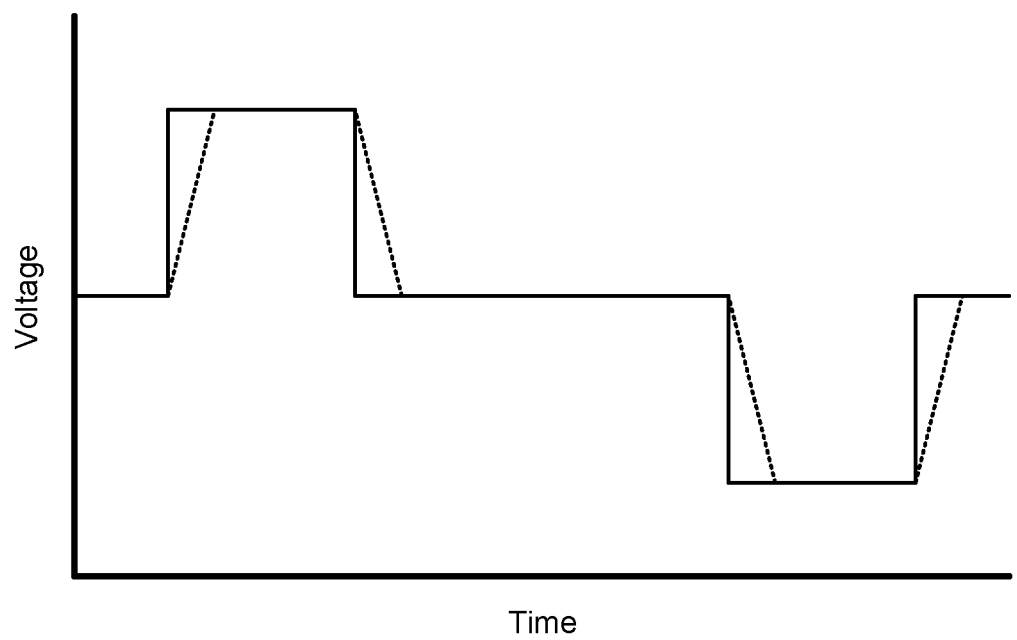
FIG. 18B shows a PWM signal having a second PWM frequency and a second slew rate.

In some embodiments, the system can be configured to change the slew rate for the PWM signals, which can be used to further reduce power consumption. FIG. 18A shows a PWM signal having a first PWM frequency, and FIG. 18B shows a PWM signal having a second PWM frequency that is slower than the first PWM frequency. In this example, the second PWM frequency is half the first PWM frequency. The second PWM signal of FIG. 18B can consume less power than the first PWM signal of FIG. 18A. In FIGS. 18A and 18B, the slew rate is seen in dotted lines. The actual transition from low to high or from high to low voltages does not occur instantaneously. Rather the voltage adopts a somewhat trapezoidal wave shape because of the slew rate, or the rate at which the voltage changes from a first voltage level to a second voltage level. In the embodiments of FIGS. 18A and 18B, the second PWM signal has a slew rate that is half of the slew rate of the first PWM signal. The system can be configured to scale the slew rate proportionally to changes in the PWM frequency. In some embodiments, the PWM frequency can be adjusted without changing the slew rate. The same considerations of FIG. 17 and the same methods of FIGS. 15 and 16 can be applied to reducing the slew rate to conserve power.

In some embodiments, a driver of the system can be configured to provide an adjustable slew rate for the driver signals. A desired slew rate can be delivered as a parameter to the driver, and the driver can output a signal having the desired slew rate (assuming the desired slew rate is within the capabilities of the driver being used). The slew rate can be adjusted using current limiting, using a variable resistor, using other active electrical component(s), or any other suitable manner.

Additional Disclosure

In the disclosure provided above, apparatus, systems, and methods for feedback and control of a lens are described in connection with particular example embodiments. It will be understood, however, that the principles and advantages of the embodiments can be used for any other systems, apparatus, or methods with a need for feedback and control responsive to an indication of capacitance. Although certain embodiments are described with reference to an example sample and hold voltage sensor, it will be understood that the principles and advantages described herein can be applied to other types of sensors. While some of the disclosed embodiments may be described with reference to analog, digital, or mixed circuitry, in different embodiments, the principles and advantages discussed herein can be implemented for different parts as analog, digital, or mixed circuitry. Moreover, while some circuits schematics are provided for illustrative purposes, other equivalent circuits can alternatively be implemented to achieve the functionality described herein. In some figures, four electrodes are shown. The principles and advantages discussed herein can be applied to embodiments with more than four electrodes or fewer than four electrodes.

The principles and advantages described herein can be implemented in various apparatuses. Examples of such apparatuses can include, but are not limited to, consumer electronic products, parts of the consumer electronic products, electronic test equipment, etc. The principles and advantages described herein relate to lenses. Examples products with lenses can include a mobile phone (for example, a smart phone), healthcare monitoring devices, vehicular electronics systems such as automotive electronics systems, webcams, a television, a computer monitor, a computer, a hand-held computer, a tablet computer, a laptop computer, a personal digital assistant (PDA), a refrigerator, a DVD player, a CD player, a digital video recorder (DVR), a camcorder, a camera, a digital camera, a copier, a facsimile machine, a scanner, a multi-functional peripheral device, a wrist watch, a clock, etc. Further, apparatuses can include unfinished products.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The program instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessor or controllers described herein can be coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed by microprocessors 315 of FIG. 3A, feedback and settings controller 303 of FIG. 3A and FIG. 3B, timing controller 305 of FIG. 305, and/or other controllers in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A method of calibrating a liquid lens identifying an operational range of a focal length of a fluid interface of the liquid lens, the method comprising:
   applying a plurality of applied voltages to a liquid lens, the plurality of applied voltages comprising a first applied voltage and a second applied voltage, the first applied voltage being different than the second applied voltage, wherein the liquid lens comprises:
      a chamber;
      a first fluid contained in the chamber;
      a second fluid contained in the chamber, wherein the first fluid and the second fluid are substantially immiscible to form the fluid interface between the first fluid and the second fluid;
      a first electrode;
      an insulating material that insulates the first electrode from the first and second fluids; and
      a second electrode in electrical communication with the first fluid;
   applying the first applied voltage between the first electrode and the second electrode;
   positioning the fluid interface at a first position;
   determining a first value indicative of the first position of the fluid interface, the first value indicating an amount of a charge of the liquid lens resulting from the first applied voltage;
   applying the second applied voltage to the liquid lens;
   positioning the fluid interface at a second position;
   determining a second value indicating the amount of the charge of the liquid lens resulting from the second applied voltage, the second value being indicative of the second position of the fluid interface, wherein the second value is different than the first value;
   determining a slope of the operational range of a fluid interface based on the first voltage, the first value, the second voltage, and the second value; and
   calibrating the liquid lens by
      setting one or more calibration parameters based at least in part on the slope, the slope value representing how the focal length changes in response to the change in voltage.

2. The method of claim 1, wherein:
   the first value is indicative of a first capacitance between the first fluid and the first electrode in response to the first applied voltage applied to the liquid lens; and
   the second value is indicative of a second capacitance between the first fluid and the first electrode in response to the second applied voltage applied to the liquid lens; and
   the amount of the charge indicated by the first value and the second value is derived from a measured voltage indicative of the first capacitance and the second capacitance.

3. The method of claim 1, wherein setting the one or more calibration parameters comprises setting one or more lookup table values.

4. The method of claim 1, wherein the one or more calibration parameters comprise a gain value.

5. The method of claim 1, further comprising:
   applying a third applied voltage to the liquid lens; and
   determining a third value indicative of a third position of the fluid interface in response to the third applied voltage applied to the liquid lens.

6. The method of claim 5, further comprising:
determining an offset value based at least in part on the first applied voltage, the first value, the second applied voltage, the second value, the third applied voltage, and the third value; and
setting the one or more calibration parameters based at least in part on the offset value and the slope.

7. The method of claim 5, further comprising determining a transition voltage value associated with a transition point on a plot having a first axis that has the first applied voltage, the second applied voltage, and the third applied voltage and a second axis that has the first value, the second value, and the third value;
wherein the transition point is at the intersection between a first linear plot line and a second linear plot line;
wherein the first linear plot line extends through a first point representing the first applied voltage and the first value and through a second point representing the second applied voltage and the second value;
setting a calibration parameter to associate the transition voltage value for the transition point with a resting state for the fluid interface of the liquid lens; and
wherein the second linear plot line is parallel to the first axis and extends through a third point representing the third applied voltage and the third value.

8. The method of claim 5, further comprising determining a transition voltage value associated with a transition point by:
varying the plurality of applied voltages applied to the liquid lens;
monitoring values indicative of the capacitance between the first fluid and the first electrode; and
identifying the transition voltage value where the values indicative of the capacitance transition between substantially equal values to substantially linearly changing values.

9. The method of claim 1, further comprising:
applying an additional voltage to the liquid lens, wherein the additional voltage causes a substantially saturated capacitance between the first fluid and the first electrode when the additional voltage is applied to the liquid lens; and
determining an additional value indicating the substantially saturated capacitance exists between the first fluid and the first electrode when the third voltage is applied to the liquid lens.

10. The method of claim 1, wherein the liquid lens comprises a plurality of first electrodes insulated from the first fluid and the second fluid, wherein the plurality of first electrodes are disposed at a corresponding plurality of locations in the liquid lens.

11. The method of claim 1, wherein the plurality of applied voltages are applied as a direct current (DC) voltage or an alternating current (AC) root means square (RMS) voltage.

12. A liquid lens system comprising a liquid lens and a controller configured to calibrate the liquid lens by performing the method of claim 1, wherein the controller is configured to operate the liquid lens system and to calibrate the liquid lens at least once upon an initialization of the liquid lens system, upon a start-up of the liquid lens system, upon a setting change, upon a user command, or periodically.

13. A liquid lens system comprising a liquid lens and a controller configured to calibrate the liquid lens by performing the method of claim 1, wherein the controller that is configured to calibrate the liquid lens as part of a dedicated calibration system configured to calibrate liquid lenses to be used with separate controllers for operating the liquid lens systems.

\* \* \* \* \*